United States Patent
Prasad et al.

(10) Patent No.: US 12,501,324 B2
(45) Date of Patent: Dec. 16, 2025

(54) TIMING ADVANCE FOR MOBILITY

(71) Applicant: Ofinno, LLC, Reston, VA (US)

(72) Inventors: Gautham Prasad, Herndon, VA (US); Ali Cagatay Cirik, Chantilly, VA (US); Esmael Hejazi Dinan, McLean, VA (US); Hua Zhou, Vienna, VA (US); Hyoungsuk Jeon, Centreville, VA (US); Taehun Kim, Fairfax, VA (US); Kyungmin Park, Vienna, VA (US); Ryan Keating, Chicago, IL (US); Mohammad Ghadir Khoshkholgh Dashtaki, Reston, VA (US); Fasil Abdul Latheef, Dresden (DE)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/899,474

(22) Filed: Sep. 27, 2024

(65) Prior Publication Data

US 2025/0106706 A1 Mar. 27, 2025

Related U.S. Application Data

(60) Provisional application No. 63/540,801, filed on Sep. 27, 2023.

(51) Int. Cl.
*H04W 36/00* (2009.01)
(52) U.S. Cl.
CPC ............................... *H04W 36/0072* (2013.01)
(58) Field of Classification Search
CPC ................................................ H04W 36/0072
See application file for complete search history.

(56) References Cited

U.S. PATENT DOCUMENTS

| | | | | |
|---|---|---|---|---|
| 2023/0045905 | A1* | 2/2023 | Lim | H04W 52/365 |
| 2023/0388871 | A1* | 11/2023 | Guo | H04W 36/0069 |
| 2024/0007913 | A1* | 1/2024 | Kim | H04W 36/0072 |
| 2024/0147321 | A1* | 5/2024 | Zhou | H04W 36/0064 |

(Continued)

FOREIGN PATENT DOCUMENTS

| | | | | | |
|---|---|---|---|---|---|
| WO | WO-2024076812 | A1 * | 4/2024 | | H04W 36/0055 |
| WO | 2024/095481 | A1 | 5/2024 | | |
| WO | WO-2024104732 | A1 * | 5/2024 | | H04W 36/0055 |

OTHER PUBLICATIONS

3GPP TS 38.212 V17.5.0 (Mar. 2023); Technical Specification; 3rd Generation Partnership Project; Technical Specification Group Radio Access Network; NR; Multiplexing and channel coding; (Release 17).

(Continued)

*Primary Examiner* — Parth Patel
(74) *Attorney, Agent, or Firm* — Peter Flanagan; Kavon Nasabzadeh; Jacob L. Mangan

(57) ABSTRACT

A method can include transmitting, by a wireless device, a capability message comprising a field indicating a time gap of the wireless device to complete a procedure of layer 1 or layer 2 triggered mobility (LTM). The method can also include receiving, in a time interval, a medium access control control element (MAC CE) indicating cell switch to a candidate cell of LTM. The method can further include transmitting, via the candidate cell and a time resource, an uplink transmission, wherein the time resource is after the time gap plus an offset from the time interval.

20 Claims, 26 Drawing Sheets

(56) References Cited

U.S. PATENT DOCUMENTS

| | | | |
|---|---|---|---|
| 2024/0147334 A1* | 5/2024 | Abraham | H04W 36/0058 |
| 2024/0179602 A1* | 5/2024 | Damnjanovic | H04W 36/362 |
| 2024/0187954 A1* | 6/2024 | Zhou | H04W 36/0077 |
| 2024/0284279 A1* | 8/2024 | Lin | H04W 36/008355 |
| 2024/0284282 A1* | 8/2024 | Akl | H04W 36/0058 |
| 2024/0284521 A1 | 8/2024 | Ryu et al. | |
| 2024/0297771 A1* | 9/2024 | Li | H04B 17/328 |
| 2024/0314651 A1* | 9/2024 | Kim | H04W 36/0072 |
| 2024/0333467 A1* | 10/2024 | Khoshnevisan | H04L 5/14 |
| 2024/0334267 A1* | 10/2024 | Bai | H04W 36/00837 |
| 2024/0340676 A1* | 10/2024 | Abraham | H04W 24/10 |
| 2024/0340720 A1* | 10/2024 | Hong | H04W 56/0045 |
| 2024/0340742 A1* | 10/2024 | Spapis | H04W 36/0085 |
| 2024/0349144 A1* | 10/2024 | Damnjanovic | H04W 36/0058 |
| 2024/0373311 A1* | 11/2024 | Bala | H04W 36/00725 |
| 2024/0373490 A1* | 11/2024 | Agiwal | H04W 76/27 |
| 2024/0381195 A1* | 11/2024 | Leng | H04B 17/328 |
| 2024/0381276 A1* | 11/2024 | Kakkavas | H04W 74/0858 |
| 2024/0406815 A1* | 12/2024 | Lin | H04W 36/0072 |
| 2024/0406919 A1* | 12/2024 | Niu | H04W 36/0088 |

OTHER PUBLICATIONS

3GPP TS 38.213 V17.6.0 (Jun. 2023); Technical Specification; 3rd Generation Partnership Project; Technical Specification Group Radio Access Network; NR; Physical layer procedures for control; (Release 17).
3GPP TS 38.321 V17.5.0 (Jun. 2023); Technical Specification; 3rd Generation Partnership Project; Technical Specification Group Radio Access Network; NR; Medium Access Control (MAC) protocol specification; (Release 17).
3GPP TS 38.331 V17.5.0 (Jun. 2023); Technical Specification; 3rd Generation Partnership Project; Technical Specification Group Radio Access Network; NR; Radio Resource Control (RRC) protocol specification; (Release 17).
R1-2300490; 3GPP TSG-RAN WG1 Meeting #112; Athens, Greece, Feb. 27-Mar. 3, 2023; Agenda Item: 9.12.2; Source: FGI; Title: Discussion on TA management for LTM; Document for: Discussion and Decision.
R1-2300057; 3GPP TSG RAN WG1 Meeting #112; Athens, Greece, Feb. 27-Mar. 3, 2023; Agenda Item: 9.12.2; Source: Futurewei; Title: Discussion of the merits of UE based RACH-less TA acquisition for LTM; Document for: Discussion and decision.
R1-2300129; 3GPP TSG-RAN WG1 Meeting #112; Athens, Greece, Feb. 27-Mar. 3, 2023; Agenda Item: 9.12.2; Source: Huawei, Southwest Jiaotong University, HiSilicon; Title: Timing advance management to reduce latency; Document for: Discussion and Decision.
R1-2300189; 3GPP TSG RAN WG1 Meeting #112; Athens, Greece, Feb. 27-Mar. 3, 2023; Source: ZTE; Title: Enhancements on TA management to reduce latency; Agenda Item: 9.12.2; Document for: Discussion and Decision.
R1-2300240; 3GPP TSG RAN WG1 #112; Athens, Greece, Feb. 27-Mar. 3, 2023; Agenda item: 9.12.2; Source: Spreadtrum Communications; Title: Discussion on timing advance management to reduce latency; Document for: Discussion and decision.
R1-2300312; 3GPP TSG RAN WG1 #112; Athens, Greece, Feb. 27-Mar. 3, 2023; Source: OPPO; Title: Discussions on Timing Advance Management; Agenda Item: 9.12.2; Document for: Discussion and Decision.
R1-2300385; 3GPP TSG RAN WG1 #112; Athens, Greece, Feb. 27-Mar. 3, 2023; Agenda item: 9.12.2; Source: Nokia, Nokia Shanghai Bell; Title: Timing Advance Management for L1/L2-triggered Mobility; Document for: Discussion and Decision.
R1-2300475; 3GPP TSG RAN WG1 #112; Athens, Greece, Feb. 27-Mar. 3, 2023; Source: vivo; Title: Discussion on TA management for L1/L2 Mobility; Agenda Item: 9.12.2; Document for: Discussion and Decision.
R1-2300518; 3GPP TSG RAN WG1#112; Athens, Greece, Feb. 27-Mar. 3, 2023; Agenda Item: 9.12.2; Source: Lenovo; Title: Timing advance management for L1/L2 mobility; Document for: Discussion.
R1-2300537; 3GPP TSG RAN WG1 #112; Athens, Greece, Feb. 27-Mar. 3, 2023; Agenda item: 9.12.2; Source: LG Electronics; Title: Enhancements on TA management for mobility; Document for: Discussion and Decision.
R1-2300558; 3GPP TSG RAN WG1 #112; Athens, Greece, Feb. 27-Mar. 3, 2023; Agenda Item: 9.12.2; Source: Xiaomi; Title: Discussion on Timing advance management; Document for: Discussion and Decision.
R1-2300663; 3GPP TSG RAN WG1 #112; Athens, Greece. Feb. 27-Mar. 3, 2023; Source: CATT; Title: Discussion on timing advance management to reduce latency; Agenda Item: 9.12.2; Document for: Discussion and Decision.
R1-2300968; 3GPP TSG RAN WG1 #112; Athens, Greece, Feb. 27-Mar. 3, 2023; Source: Intel Corporation; Title: On Timing Advance Management; Agenda item: 9.12.2; Document for: Discussion and Decision.
R1-2301025; 3GPP TSG RAN WG1 #112; Athens, Greece, Feb. 27-Mar. 3, 2023; Agenda item: 9.12.2; Source: CMCC; Title: Discussion on timing advance management to reduce latency; Document for: Discussion and Decision.
R1-2301035; 3GPP TSG RAN WG1 #112; Athens, Greece, Feb. 27-Mar. 3, 2023; Source: KDDI Corporation; Title: Discussion on TA management to reduce latency; Agenda Item: 9.12.2 Timing advance management to reduce latency; Document for: Discussion and Decision.
R1-2301095; 3GPP TSG-RAN WG1 Meeting #112; Athens, Greece, Feb. 27-Mar. 3, 2023; Agenda Item: 9.12.2; Source: Ericsson; Title: Timing advance management for L1/L2 Mobility; Document for: Discussion.
R1-2301168; 3GPP TSG RAN WG1 #112; Athens, Greece, Feb. 27-Mar. 3, 2023; Agenda Item: 9.12.2; Source: Google; Title: Discussion on timing advance management to reduce latency; Document for: Discussion.
R1-2301170; 3GPP TSG RAN WG1 #112; Athens, Greece, Feb. 27-Mar. 3, 2023; Agenda Item: 9.12.2; Source: InterDigital, Inc.; Title: Timing advance management to reduce latency; Document for: Discussion and Decision.
R1-2301288; 3GPP TSG RAN WG1 #112; Athens, Greece, Feb. 27-Mar. 3, 2023; Agenda item: 9.12.2; Source: Samsung; Title: Candidate cell TA acquisition for NR L1/L2 mobility enhancement; Document for: Discussion and Decision.
R1-2301370; 3GPP TSG RAN WG1 #112; Athens, Greece, Feb. 27-Mar. 3, 2023; Source: Apple Inc.; Title: Timing advance management for L1/L2 Mobility; Agenda item: 9.12.2; Document for: Discussion and Decision.
R1-2301437; 3GPP TSG RAN WG1 Meeting #112; Feb. 27-Mar. 3, 2023; Athens, Greece; Agenda item: 9.12.2; Source: Qualcomm Incorporated; Title: TA management to reduce latency for L1/L2 based mobility; Document for: Discussion/Decision.
R1-2301515; 3GPP TSG RAN WG1 #112; Athens, Greece, Feb. 27-Mar. 3, 2023; Source: NTT DOCOMO, Inc.; Title: Timing advance enhancement for inter-cell mobility; Agenda Item: 9.12.2; Document for: Discussion and Decision.
R1-2301583; 3GPPRAN1#112; Athens, Feb. 27-Mar. 3, 2023; Agenda item: 9.12.2; Source: MediaTek Inc.; Title: UL timing management to reduce handover latency; Document for: Discussion.
R1-2301893; 3GPP TSG RAN WG1 #112; Athens, Greece, Feb. 27-Mar. 3, 2023; Agenda item: 9.12.2; Source: Moderator (CATT); Title: Moderator summary on Timing advance management for LTM: Round 1; Document for: Discussion and Decision.
R1-2302016; 3GPP TSG RAN WG1 #112; Athens, Greece, Feb. 27-Mar. 3, 2023; Agenda item: 9.12.2; Source: Moderator (CATT); Title: Moderator summary on Timing advance management for LTM: Round 2; Document for: Discussion and Decision.
R1-2302075; 3GPP TSG RAN WG1 #112; Athens, Greece, Feb. 27-Mar. 3, 2023; Agenda item: 9.12.2; Source: Moderator (CATT); Title: Moderator summary on Timing advance management for LTM: Round 3; Document for: Discussion and Decision.

(56) References Cited

OTHER PUBLICATIONS

R1-2302165; 3GPP TSG RAN WG1 #112; Athens, Greece, Feb. 27-Mar. 3, 2023; Agenda item: 9.12.2; Source: Moderator (CATT); Title: Moderator summary on Timing advance management for LTM: Round 4; Document for: Discussion and Decision.

R1-2303728; 3GPP TSG RAN WG1 #112bis-e; e-Meeting, Apr. 17-Apr. 26, 2023; Source: NTT DOCOMO, Inc.; Title: Timing advance enhancement for inter-cell mobility; Agenda Item: 9.10.2; Document for: Discussion and Decision.

R1-230XXXX; 3GPP TSG RAN WG1 #114; Toulouse, France, Aug. 21-25, 2023; Agenda item: 9.10.2; Source: Moderator (CATT); Title: Moderator summary on Timing advance management for LTM: Round 1; Document for: Discussion and Decision.

R1-2307526; 3GPP TSG RAN WG1 #114; Toulouse, France, Aug. 21-25, 2023; Source: OPPO; Title: Discussions on Inter-cell beam management enhancement; Agenda Item: 9.10.1; Document for: Discussion and Decision.

R4-2306395; 3GPP TSG-RAN WG4 Meeting # 106-bis-e; Electronic Meeting, Apr. 17-Apr. 26, 2023; Title: WF on NR Mobility Enhancements RRM requirements (part 1); Agenda Item: 5.25.6; Source: MediaTek Inc.; Document for: Approval.

Extended European Search Report mailed Feb. 27, 2025 in EP Patent Application No. 24203395.9.

R1-2302316; 3GPP TSG RAN WG1 Meeting #112bis-e; e-Meeting, Apr. 17-26, 2023; Agenda Item: 9.10.2; Source: FUTUREWEI; Title: On TA acquisition schemes of UE based RACH-less and early RACH with RAR; Document for: Discussion and decision.

R1-2306938; 3GPP TSG RAN WG1#114; Toulouse, France, Aug. 21-25, 2023; Agenda Item: 9.10.1; Source: Lenovo; Title: Discussion on L 1 enhancements for inter-cell beam management; Document for: Discussion.

* cited by examiner

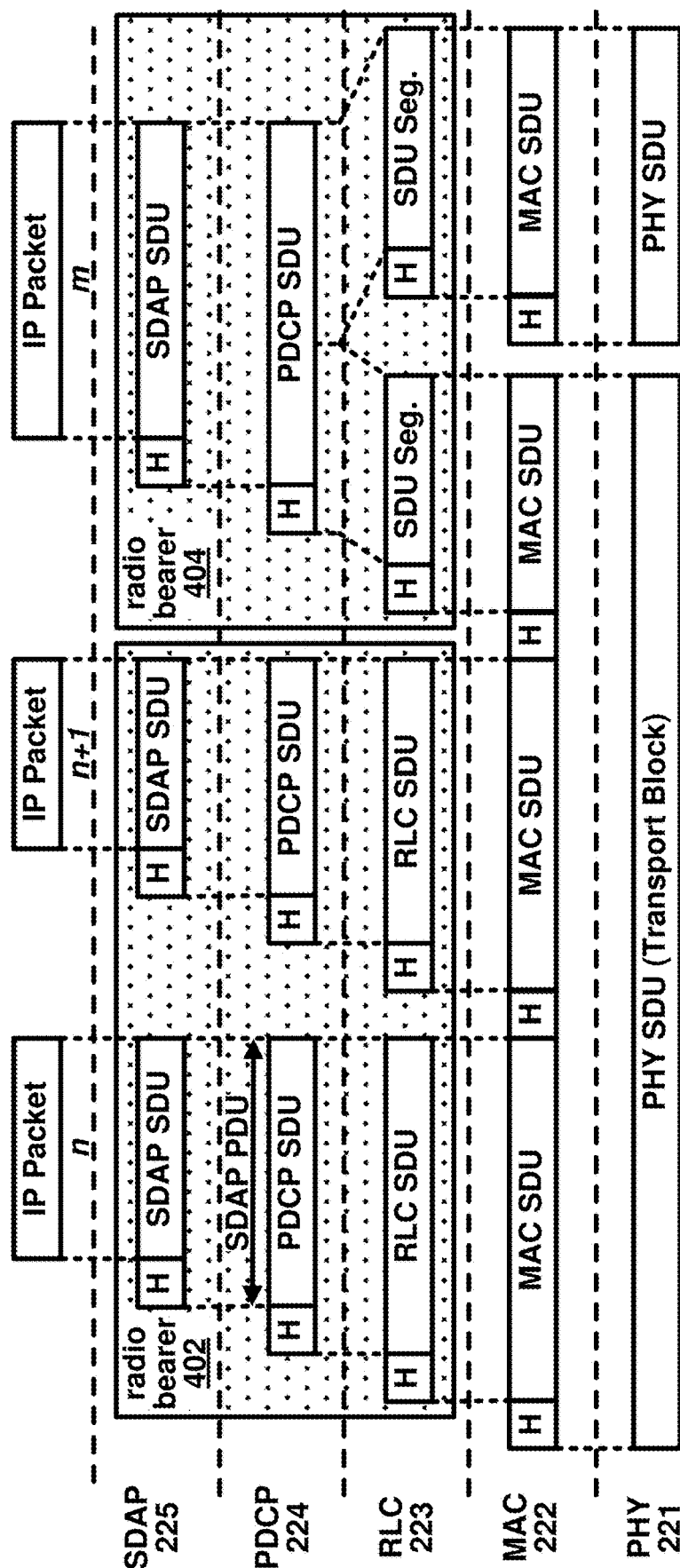
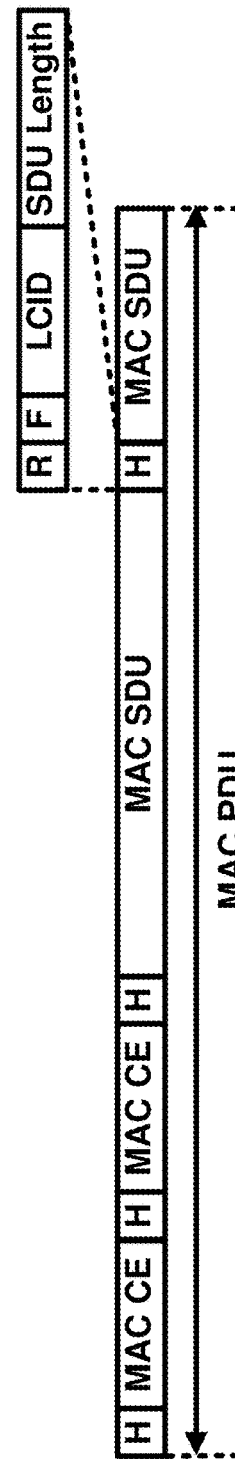
FIG. 4A
FIG. 4B

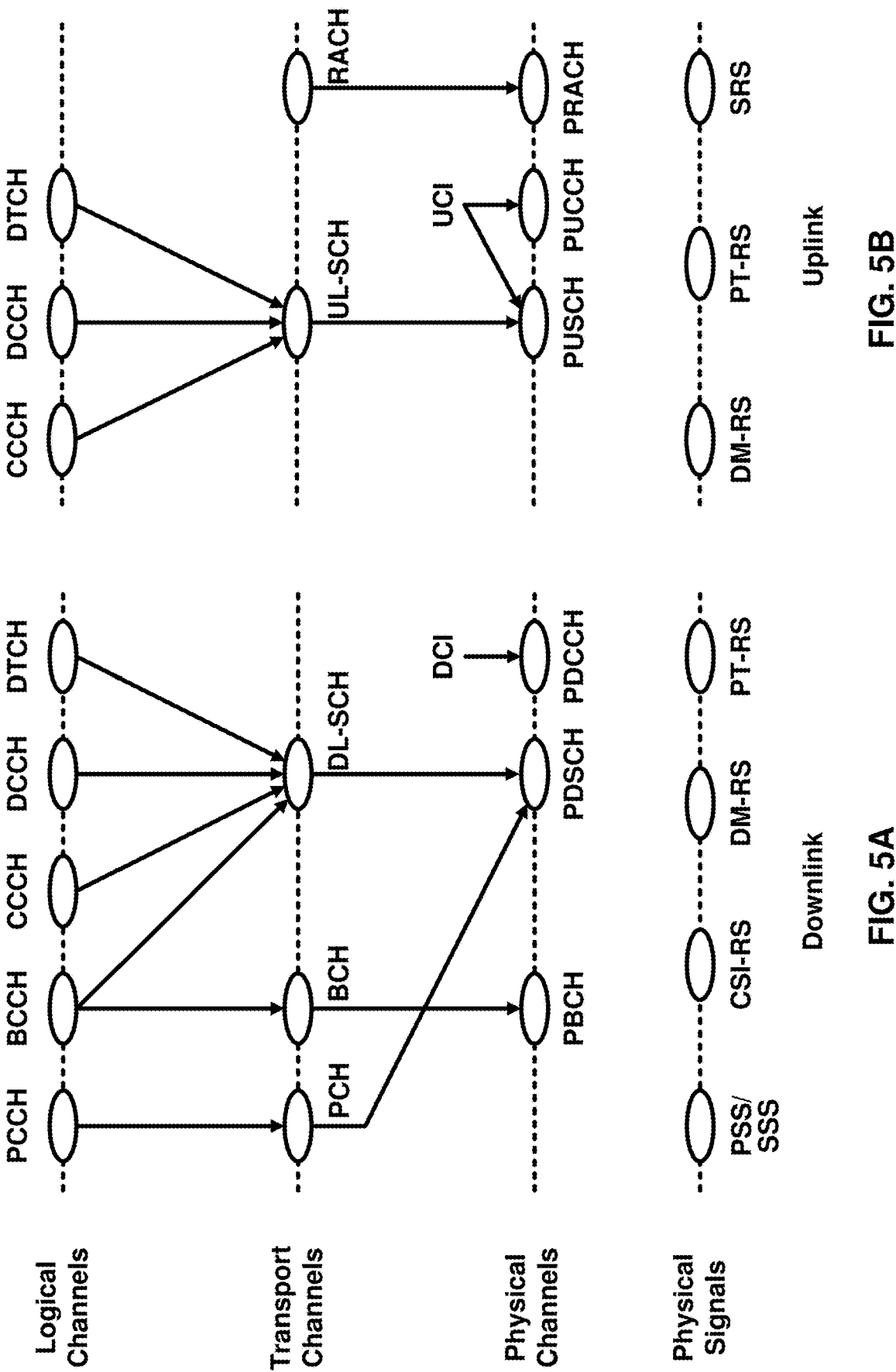

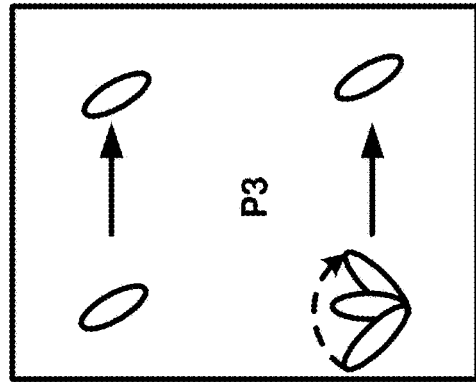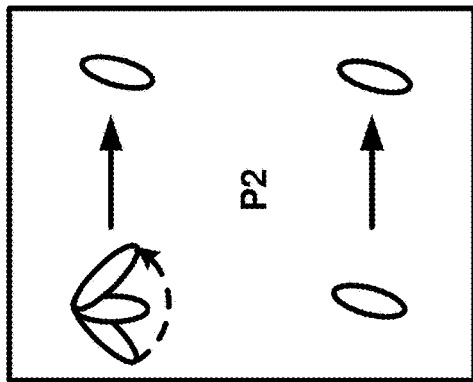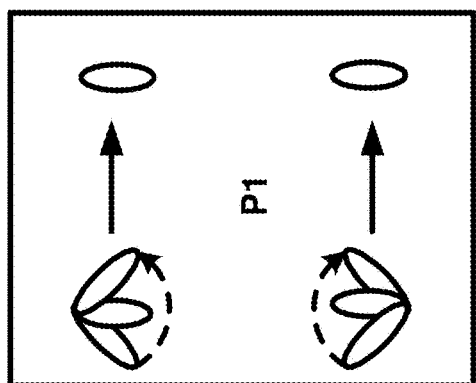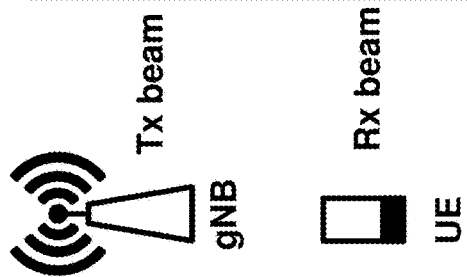
FIG. 12A
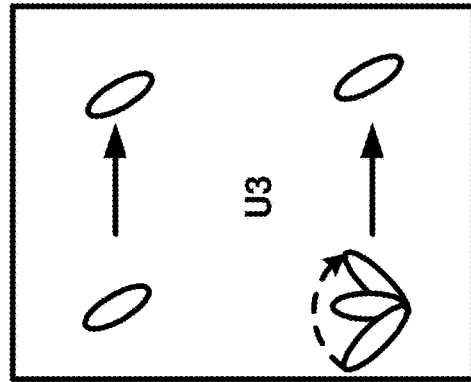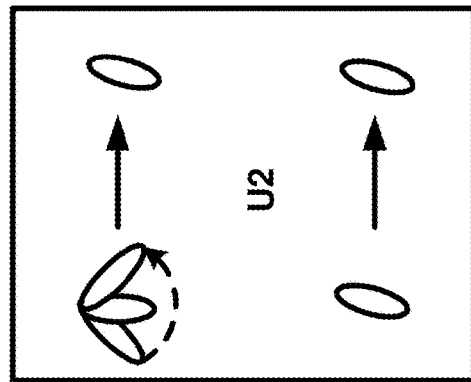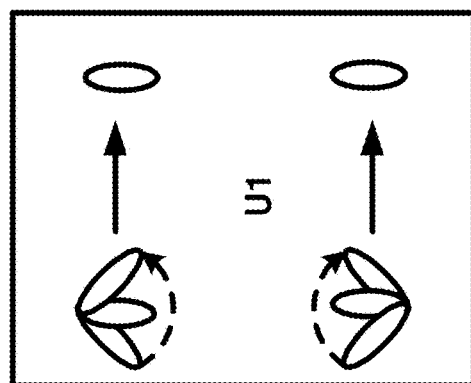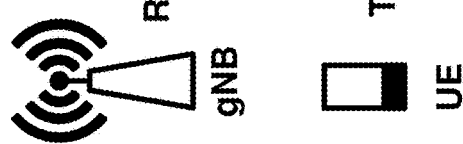
FIG. 12B

TIMING ADVANCE FOR MOBILITY

CROSS-REFERENCE TO RELATED APPLICATION

This application claims the benefit of U.S. Provisional Application No. 63/540,801, filed Sep. 27, 2023, which is hereby incorporated by reference in its entirety.

BRIEF DESCRIPTION OF THE DRAWINGS

Examples of several of the various embodiments of the present disclosure are described herein with reference to the drawings.

FIG. 4A illustrates an example downlink data flow through the NR user plane protocol stack of FIG. 2A.

FIG. 4B illustrates an example format of a MAC subheader in a MAC PDU.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

DETAILED DESCRIPTION

Figure 1A:
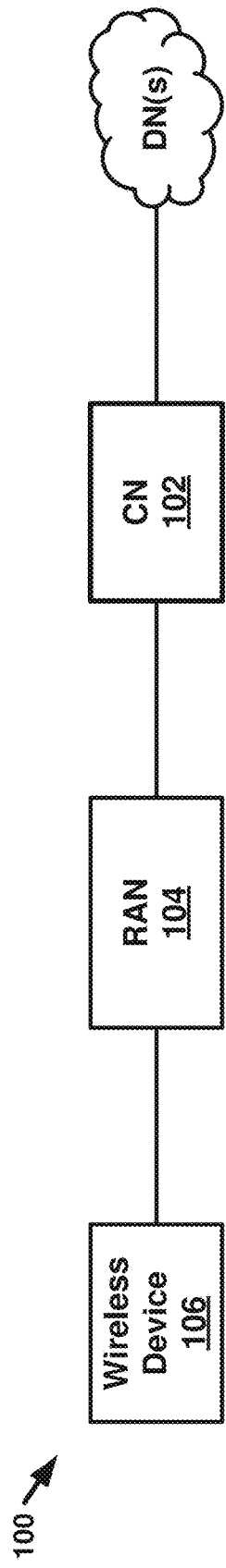
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNS), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
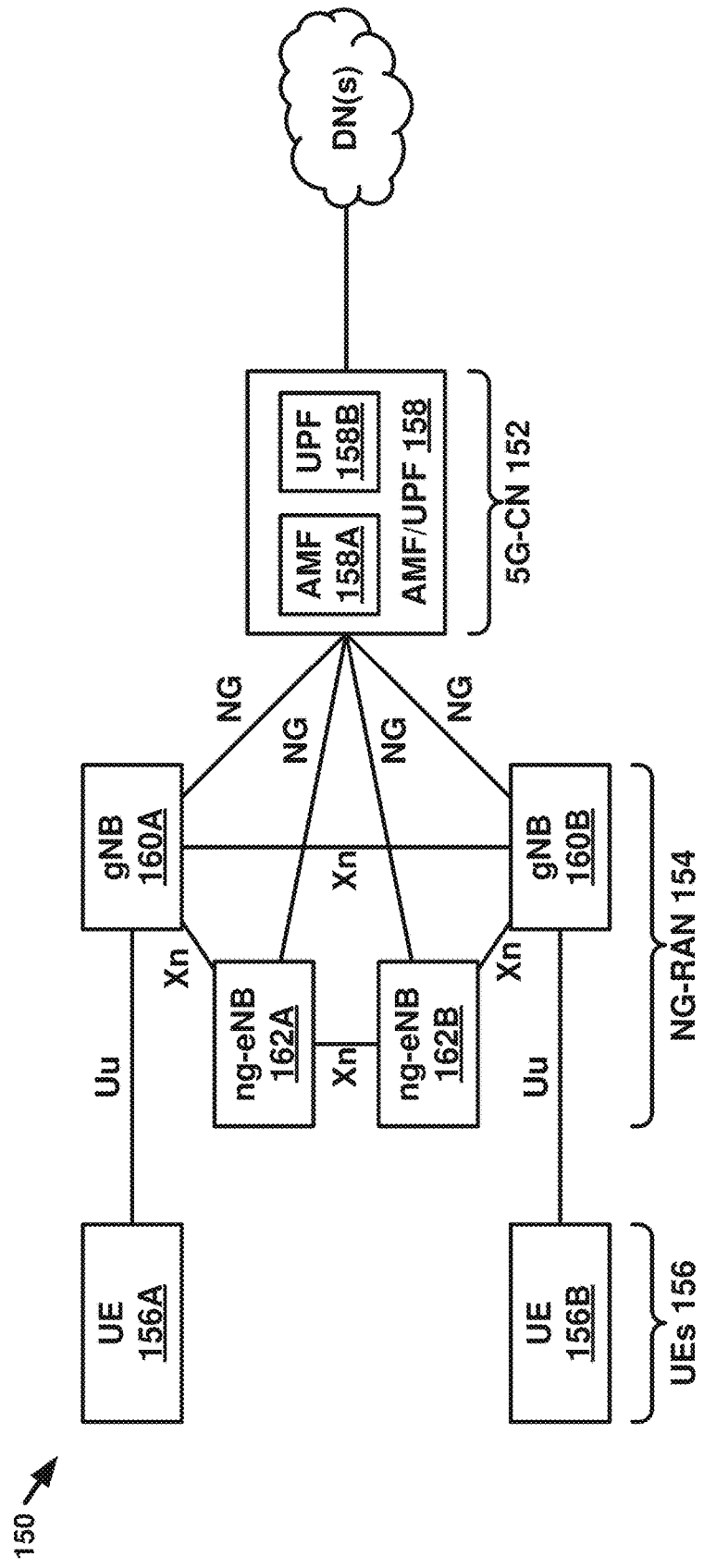

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
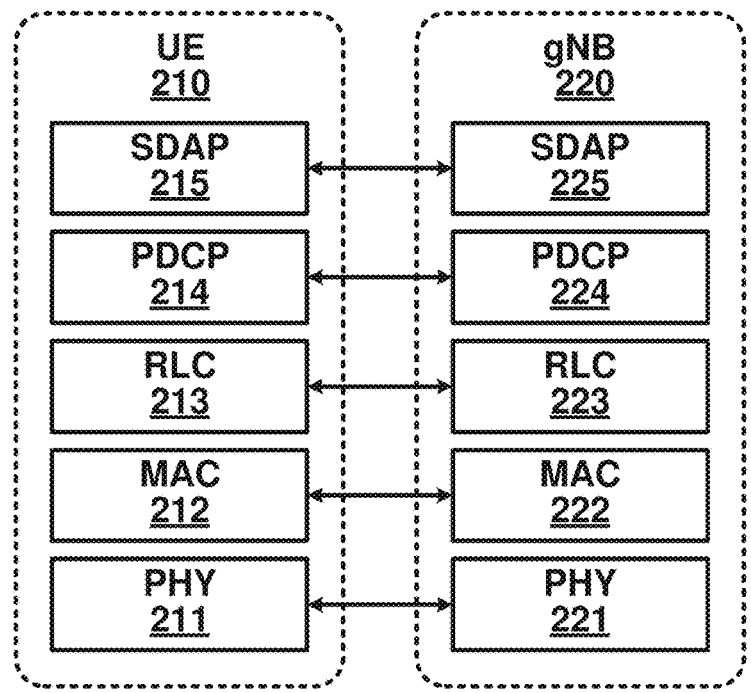
FIG. 2A and FIG. 2B respectively illustrate a New Radio (NR) user plane and control plane protocol stack.
Figure 2B:
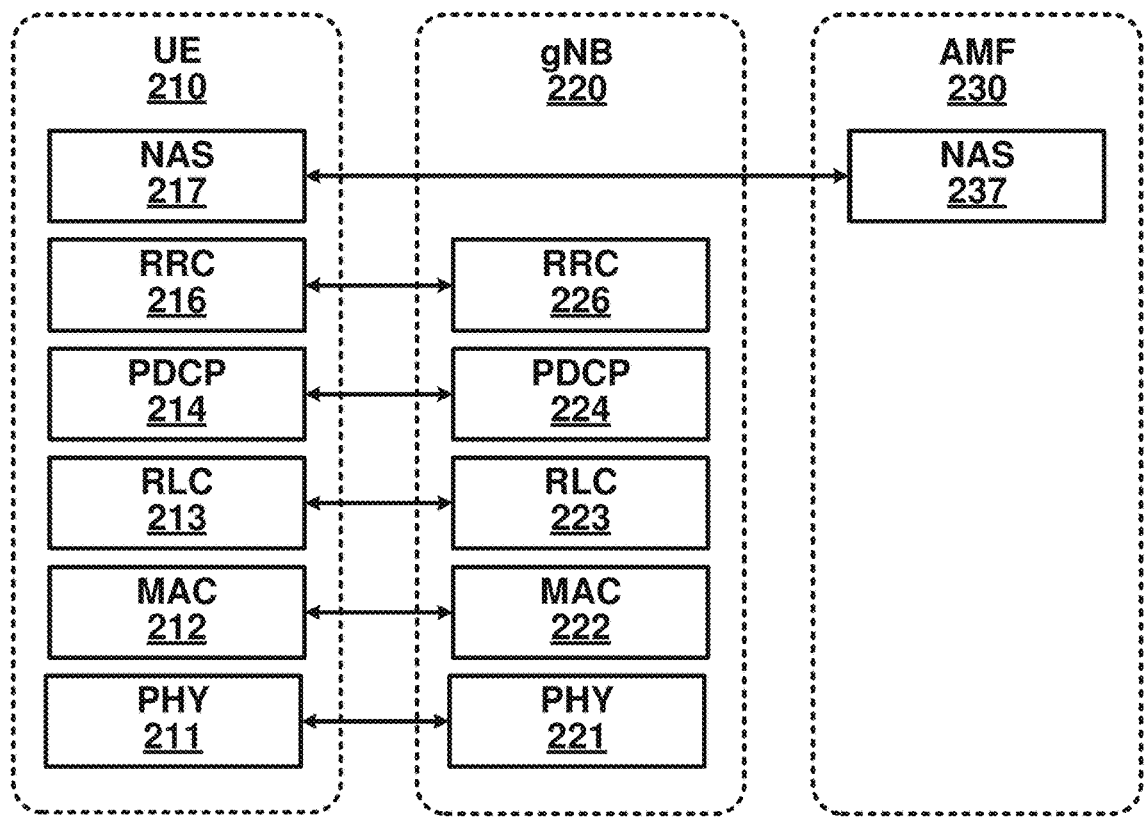

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
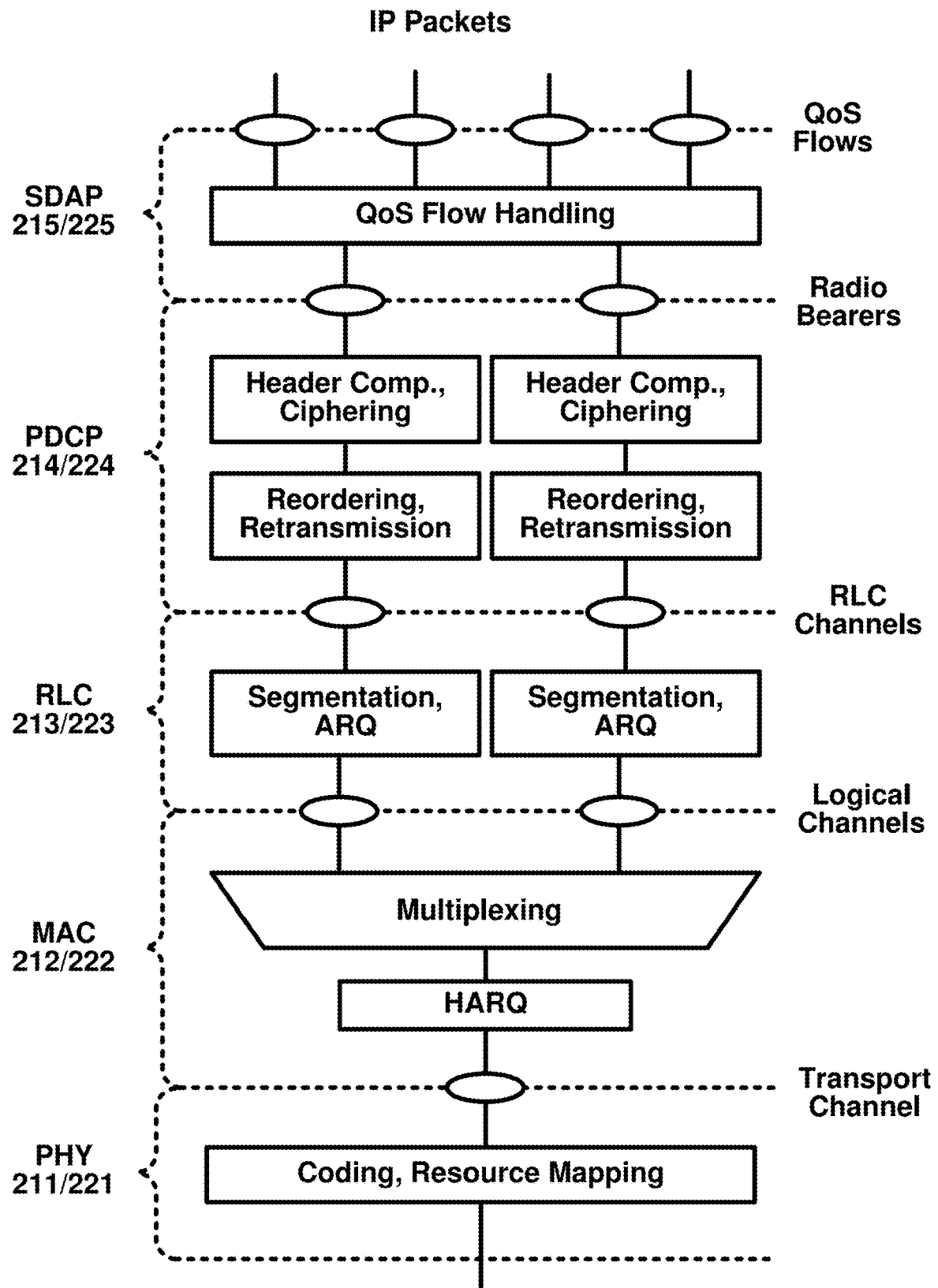
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A.

In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;
  a broadcast control channel (BCCH) for carrying system information messages in the form of a master information block (MIB) and several system information blocks (SIBs), wherein the system information messages may be used by the UEs to obtain information about how a cell is configured and how to operate within the cell;
  a common control channel (CCCH) for carrying control messages together with random access;
  a dedicated control channel (DCCH) for carrying control messages to/from a specific the UE to configure the UE; and
  a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;
  a broadcast channel (BCH) for carrying the MIB from the BCCH;
  a downlink shared channel (DL-SCH) for carrying downlink data and signaling messages, including the SIBs from the BCCH;
  an uplink shared channel (UL-SCH) for carrying uplink data and signaling messages; and
  a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;
  a physical downlink shared channel (PDSCH) for carrying downlink data and signaling messages from the DL-SCH, as well as paging messages from the PCH;
  a physical downlink control channel (PDCCH) for carrying downlink control information (DCI), which may include downlink scheduling commands, uplink scheduling grants, and uplink power control commands;
  a physical uplink shared channel (PUSCH) for carrying uplink data and signaling messages from the UL-SCH and in some instances uplink control information (UCI) as described below;
  a physical uplink control channel (PUCCH) for carrying UCI, which may include HARQ acknowledgments, channel quality indicators (CQI), pre-coding matrix indicators (PMI), rank indicators (RI), and scheduling requests (SR); and
  a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
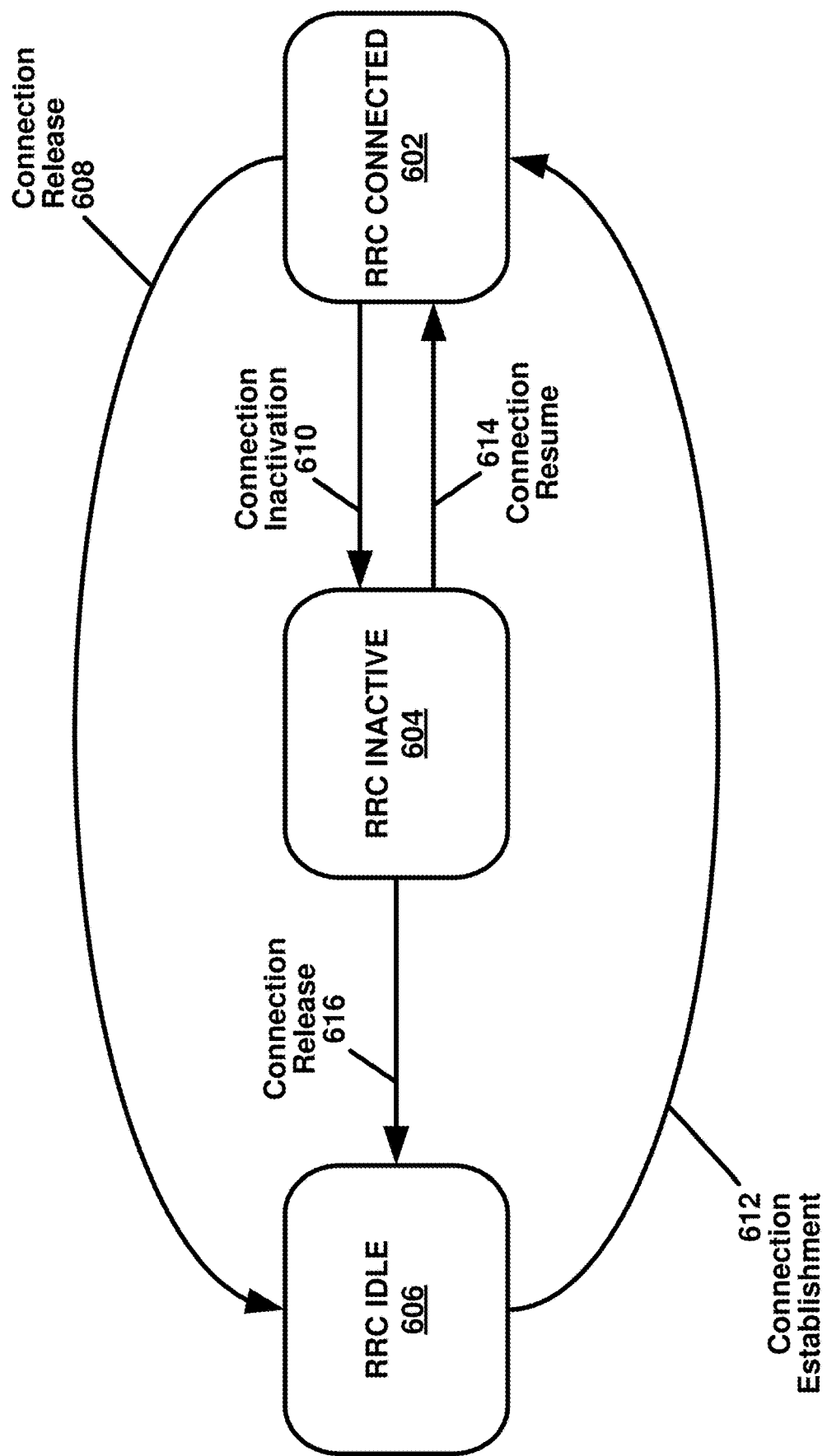
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
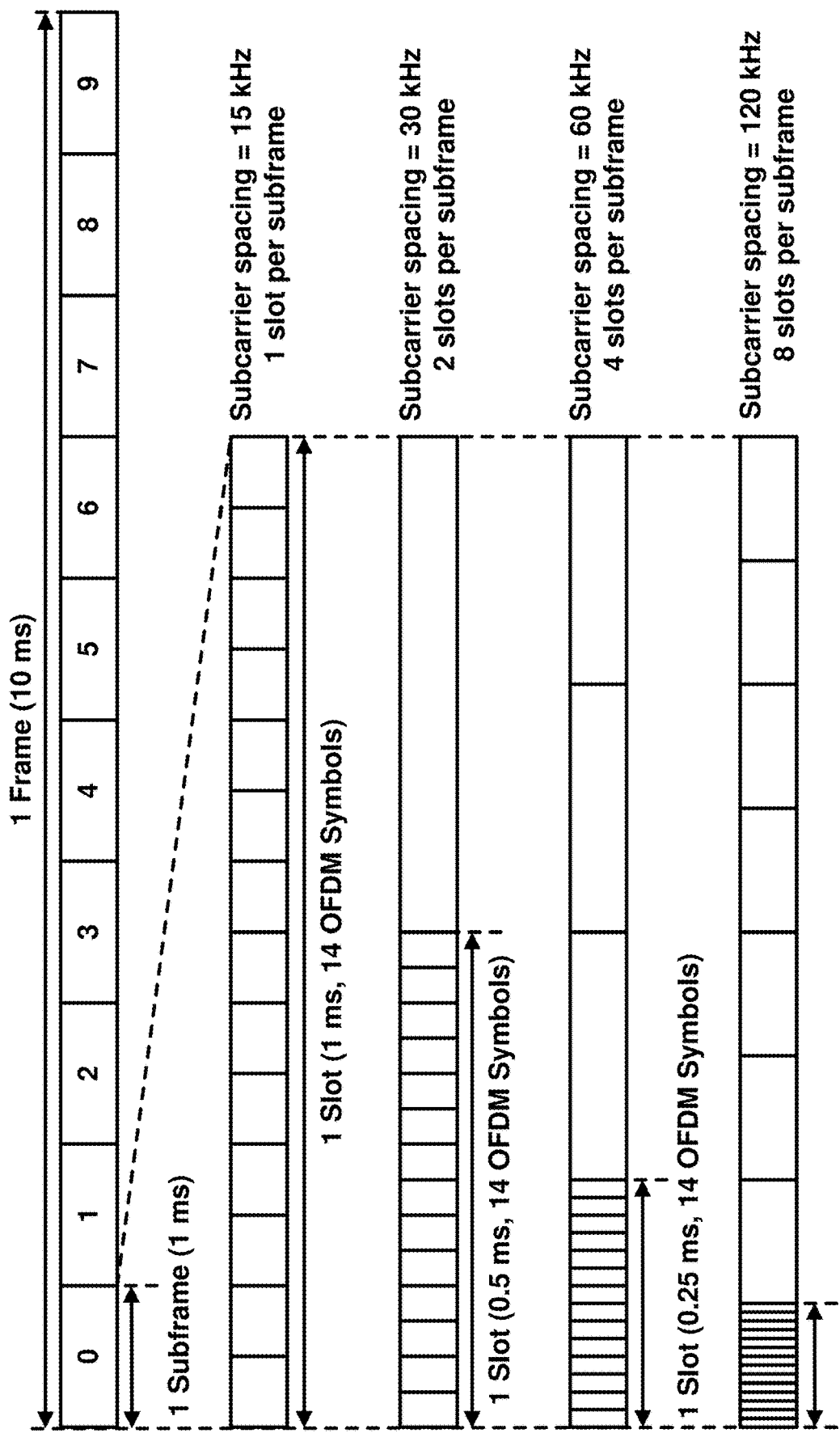
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/ cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
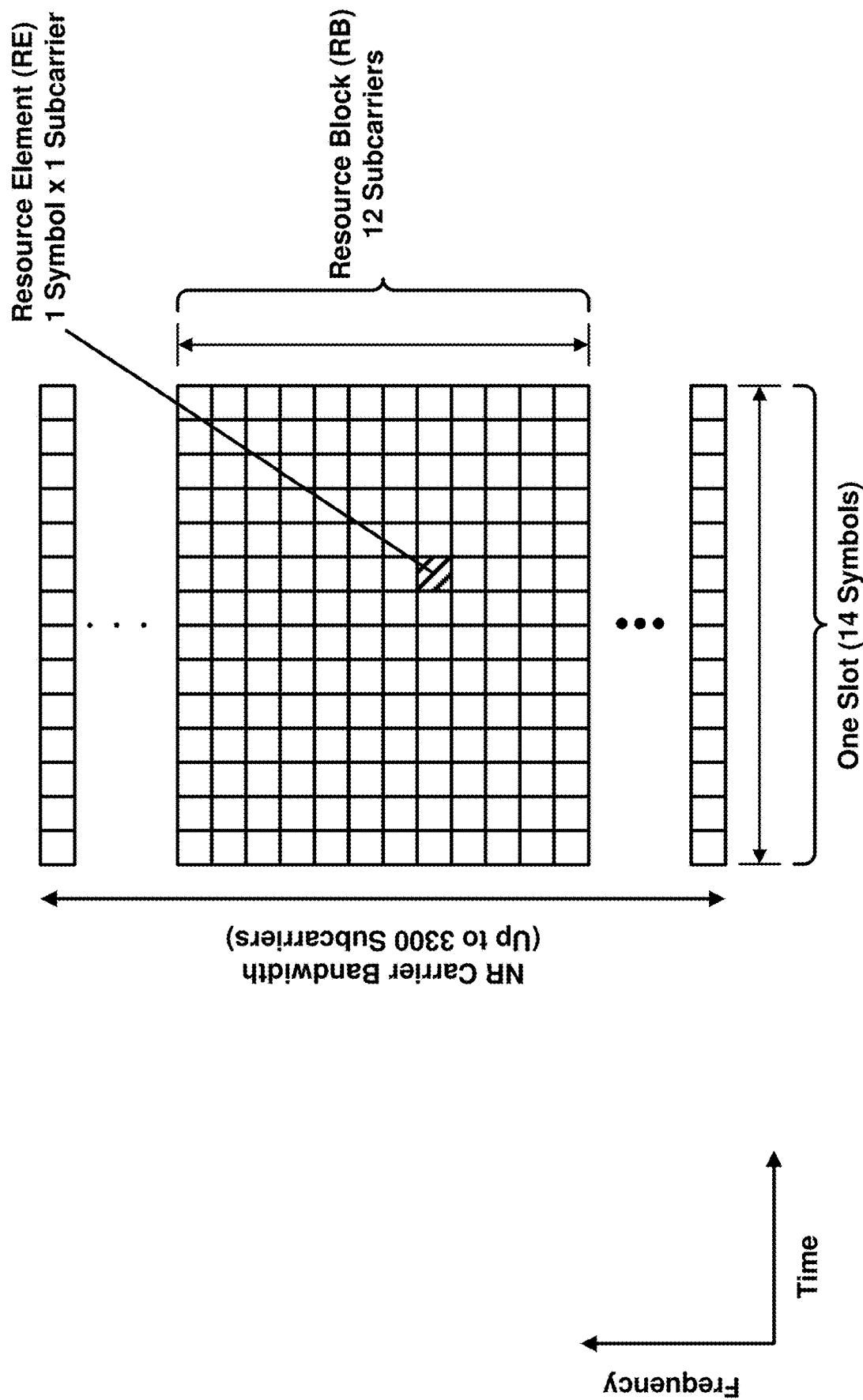
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
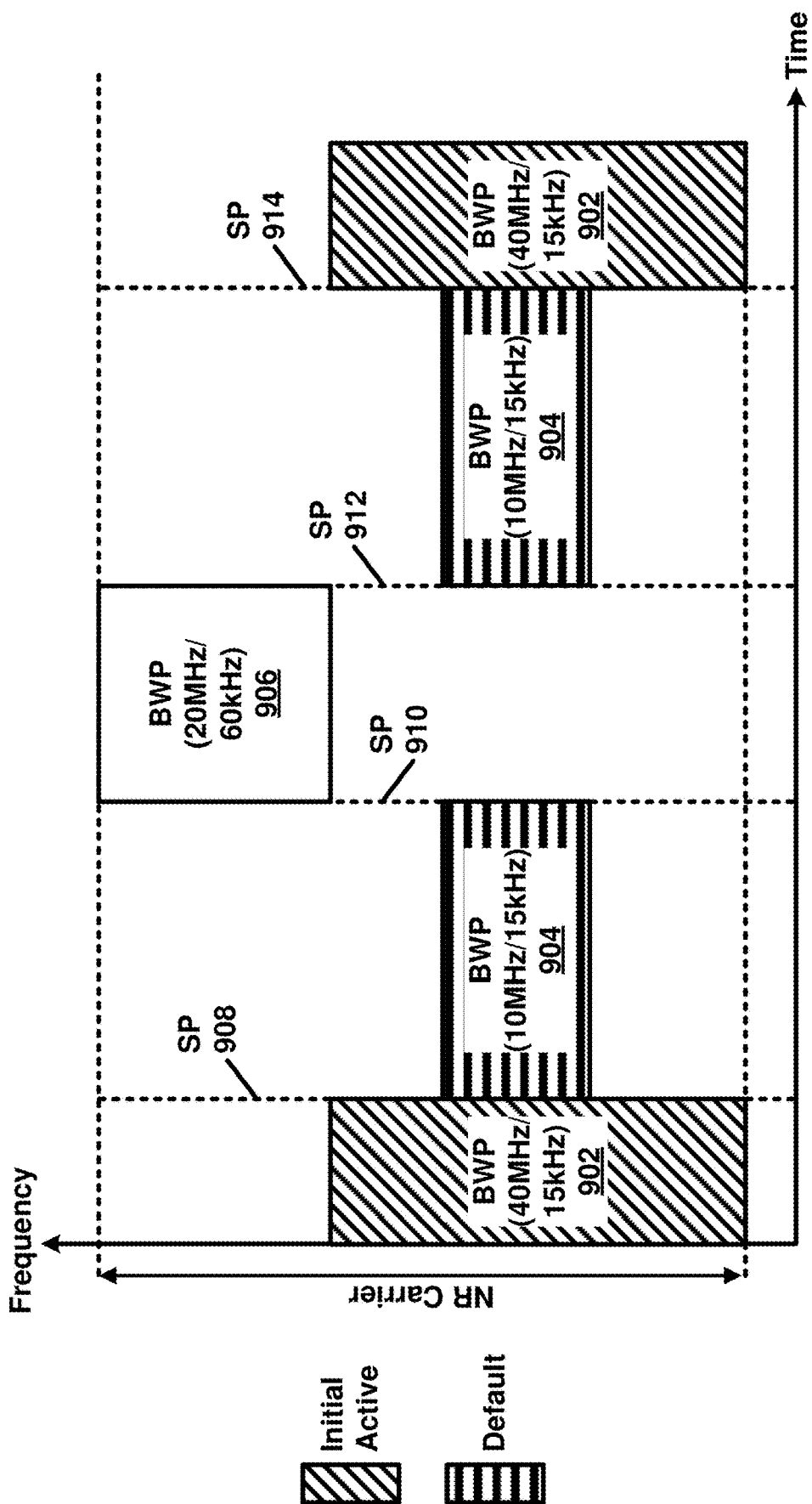
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
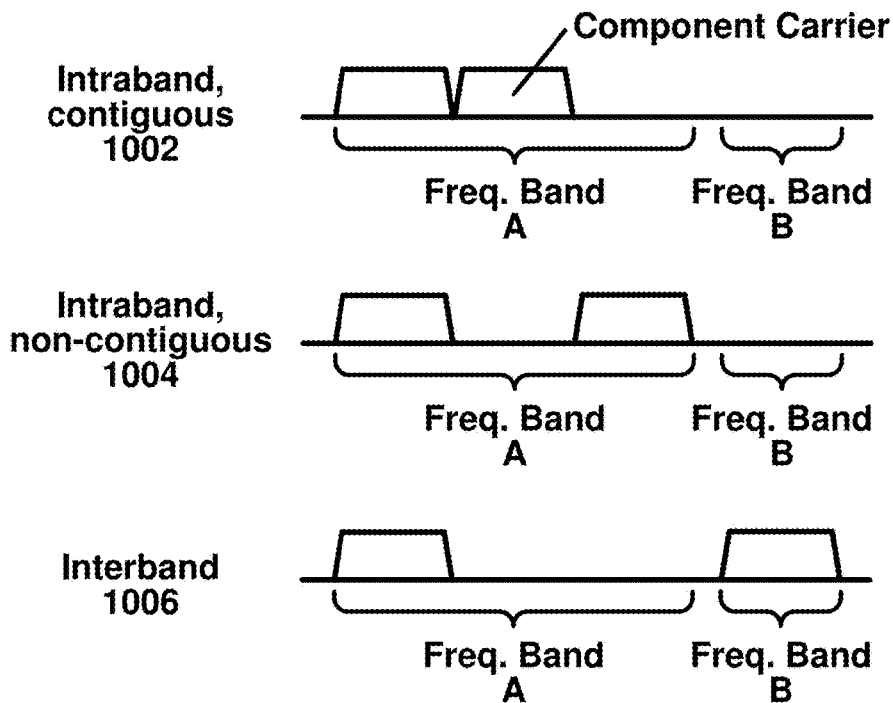
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
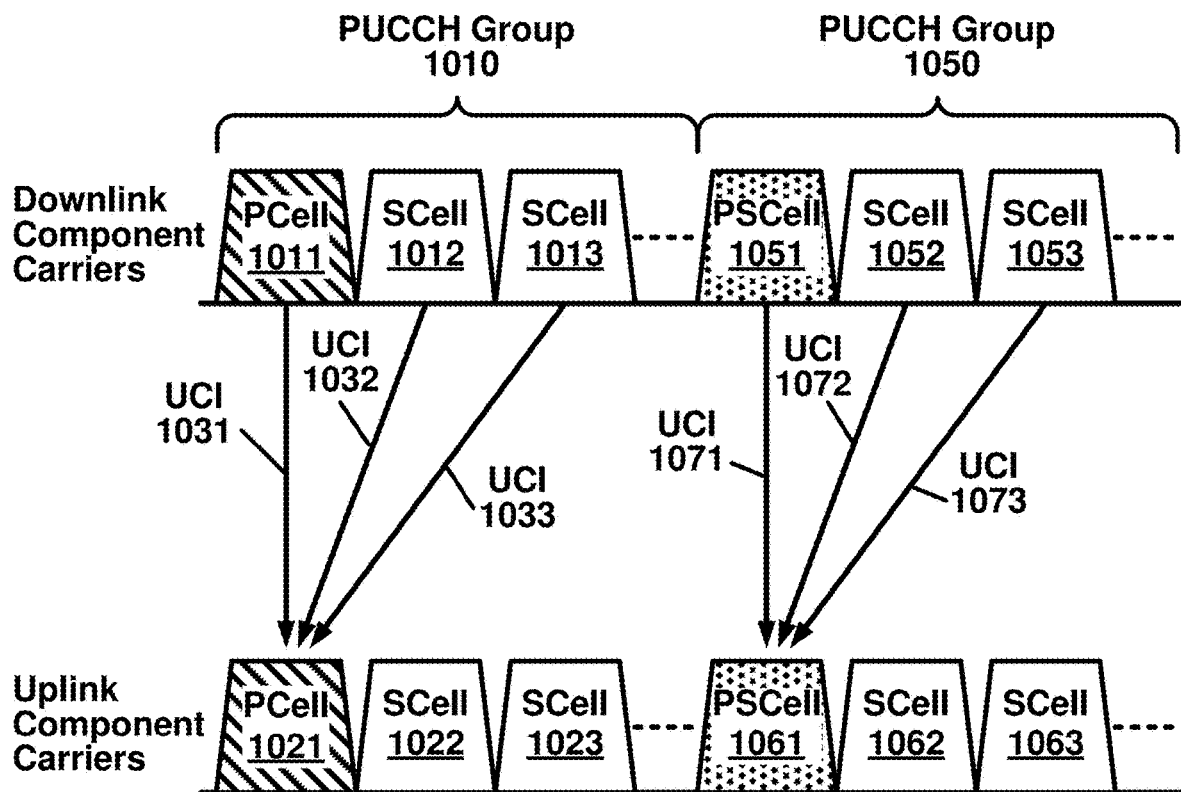
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
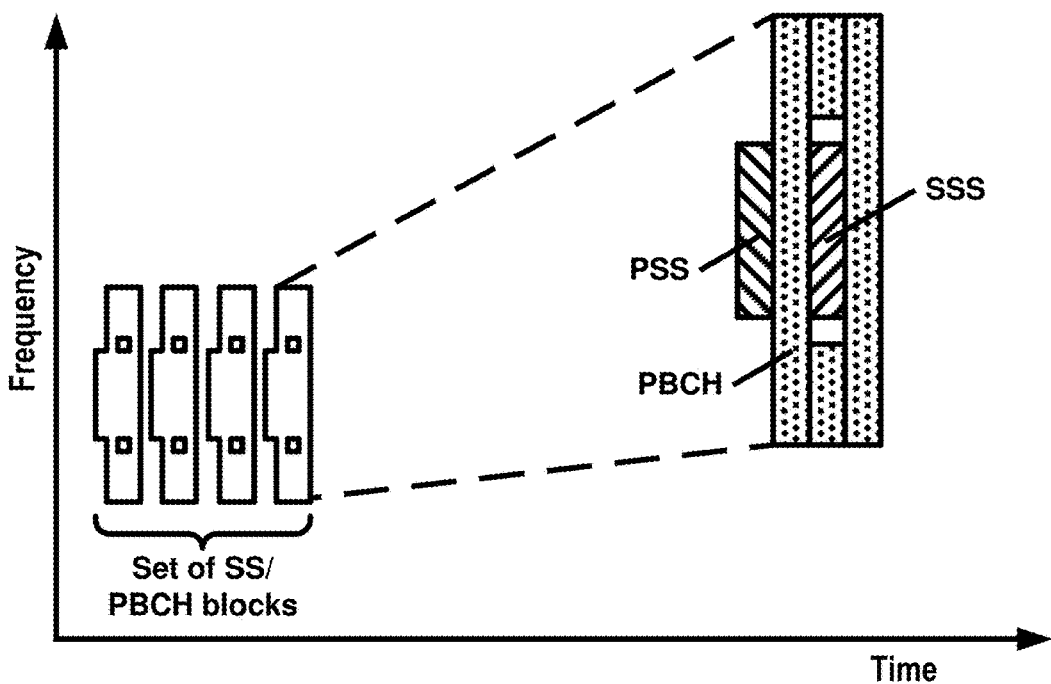
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g., a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g., maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
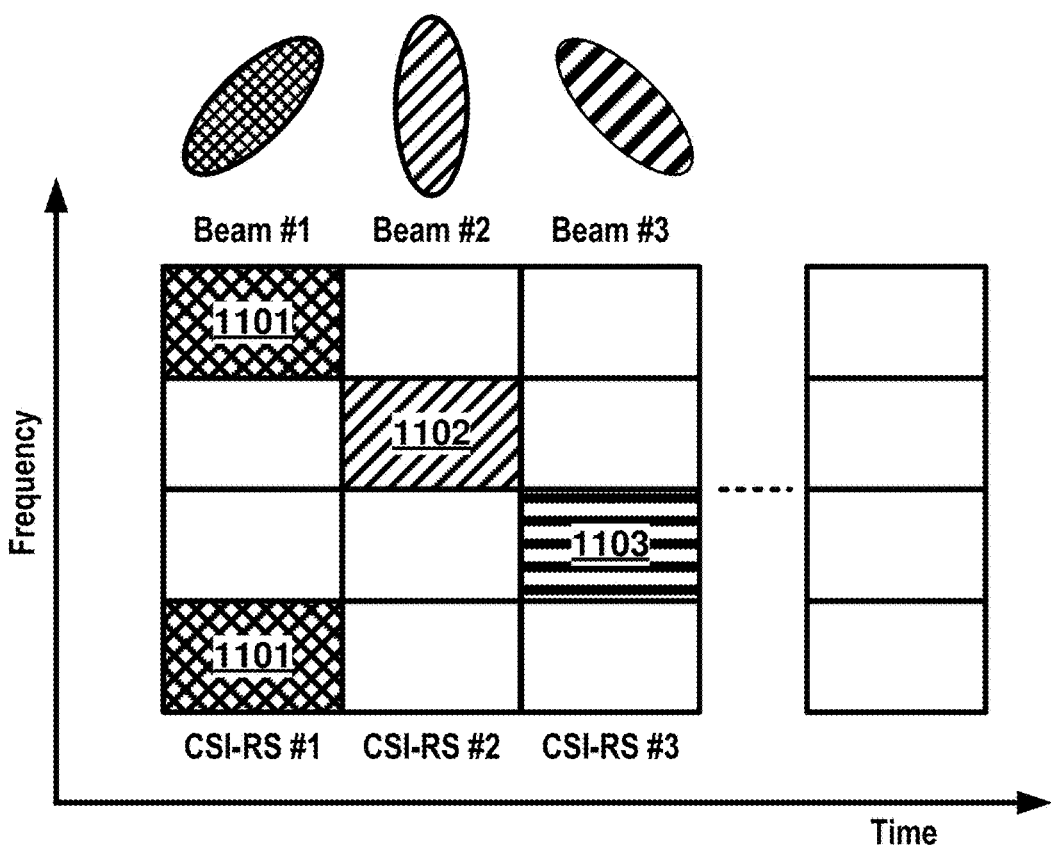
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
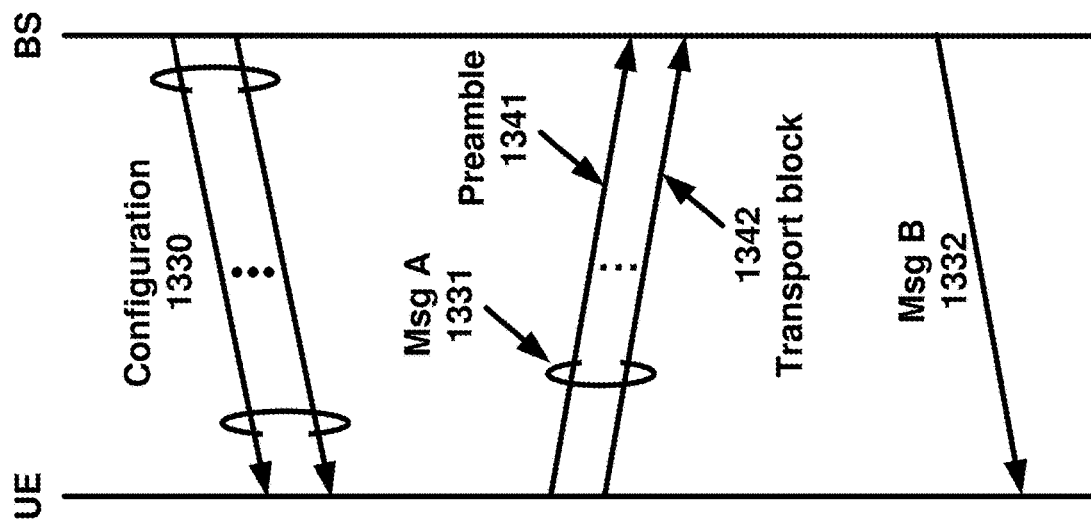
FIG. 13A, FIG. 13B, and FIG. 13C respectively illustrate a four-step contention-based random access procedure, a two-step contention-free random access procedure, and another two-step random access procedure.
Figure 13B:
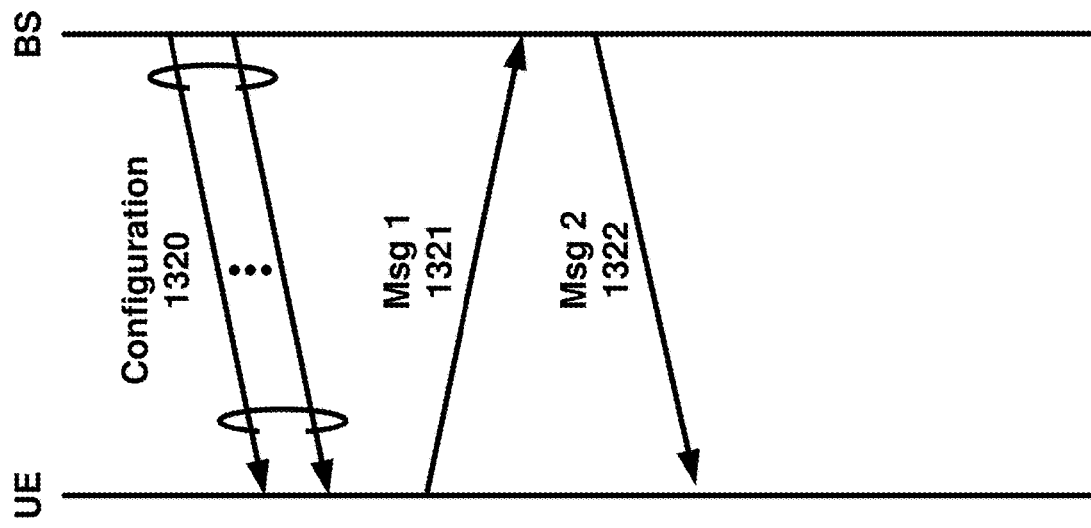
Figure 13A:
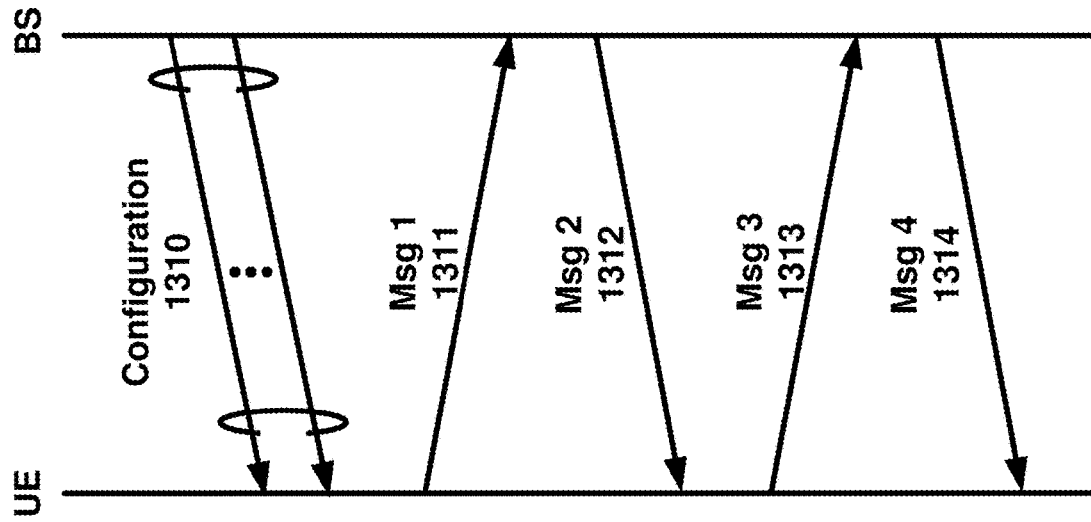

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-Response Window) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=$1+s\_id+14\times t\_id+14\times 80\times f\_id+14\times 80\times 8\times ul\_carrier\_id$, where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
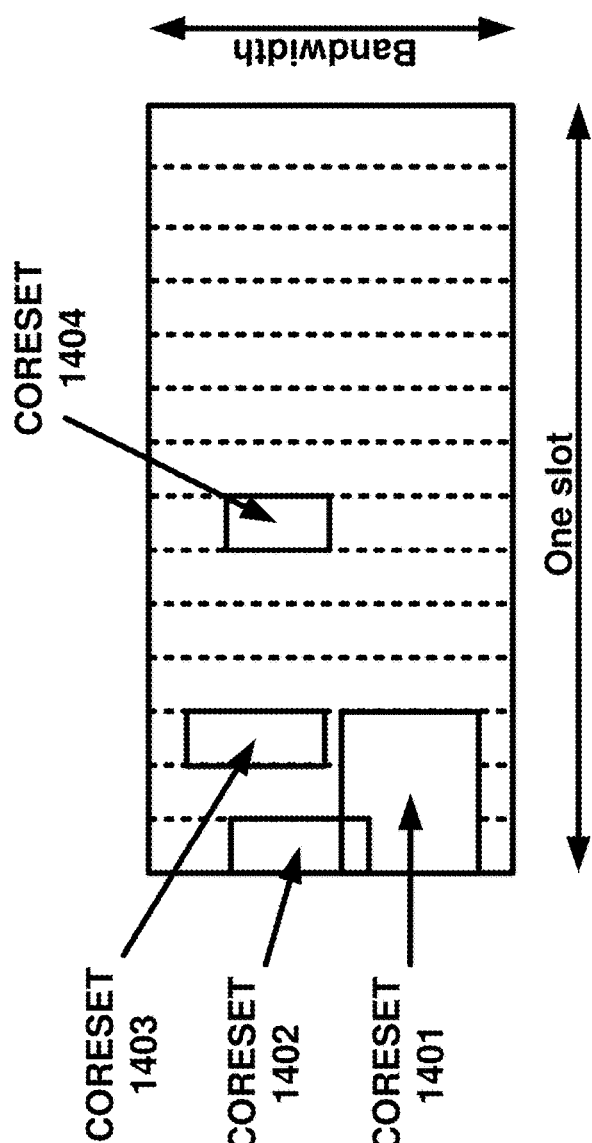
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
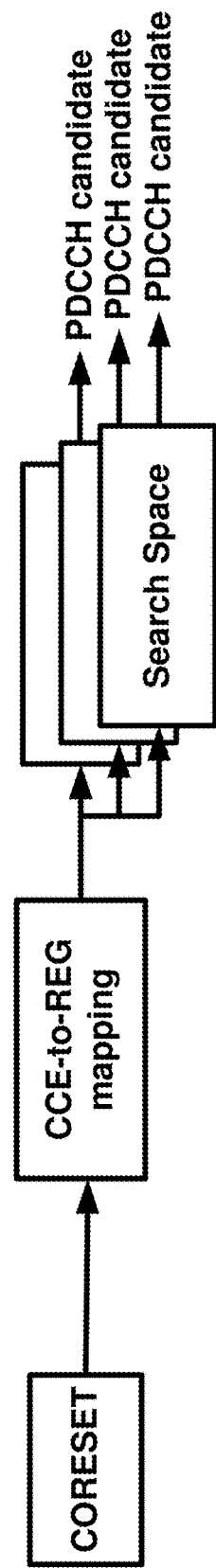
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
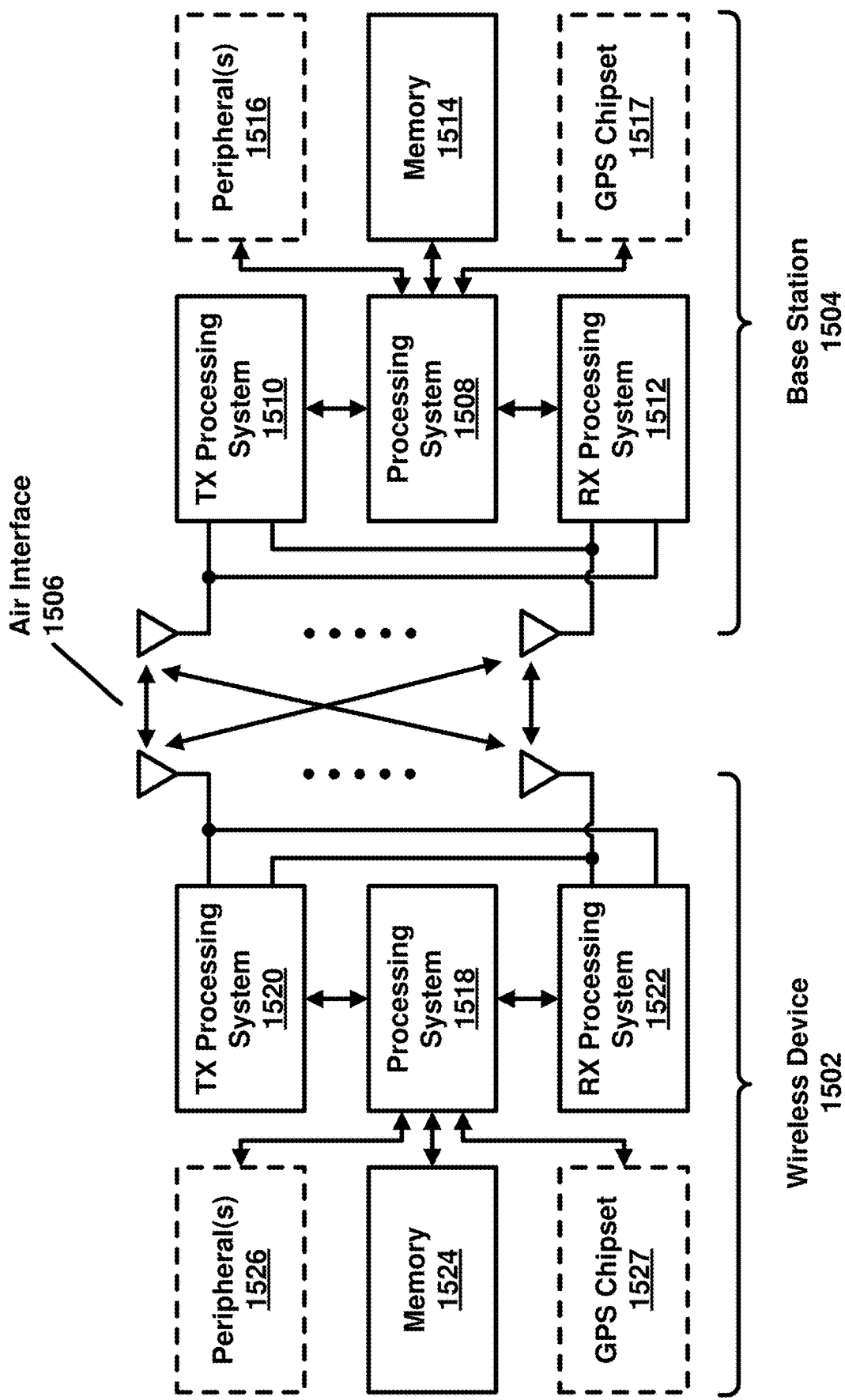
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
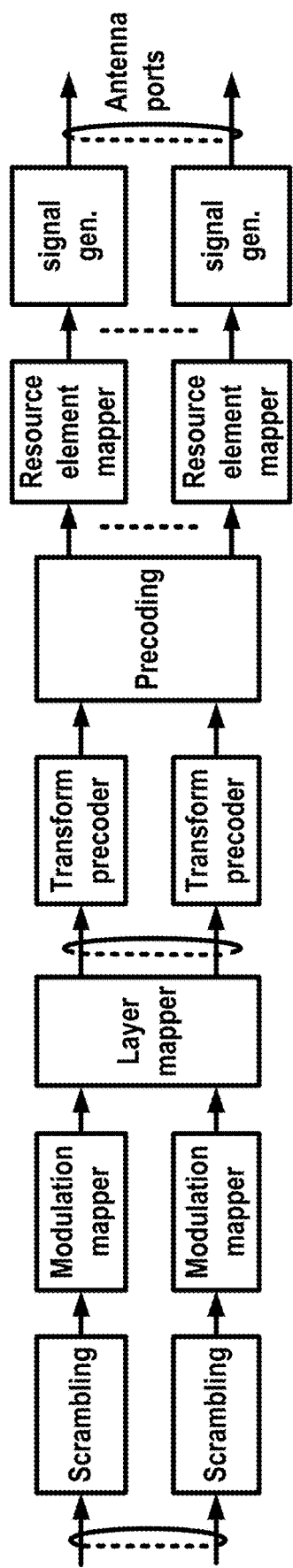
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

Figure 16B:
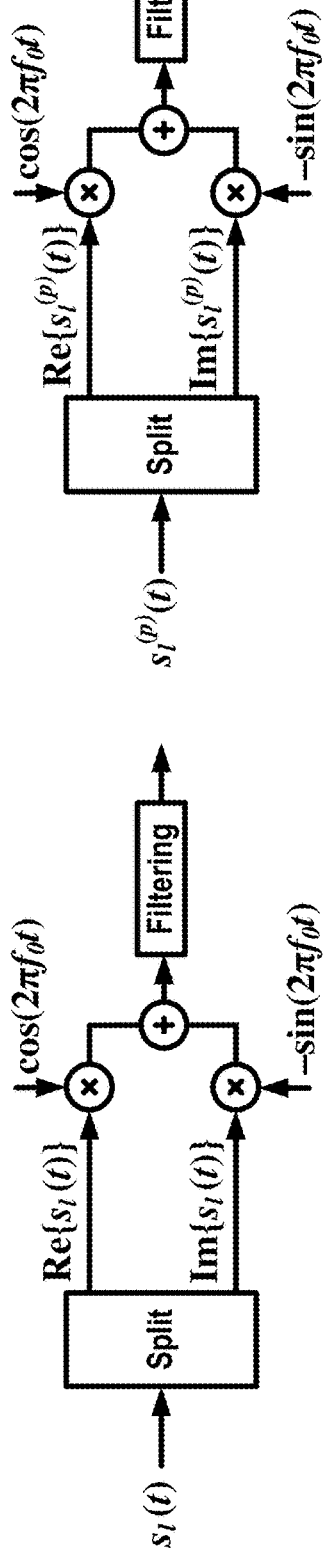

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16C:
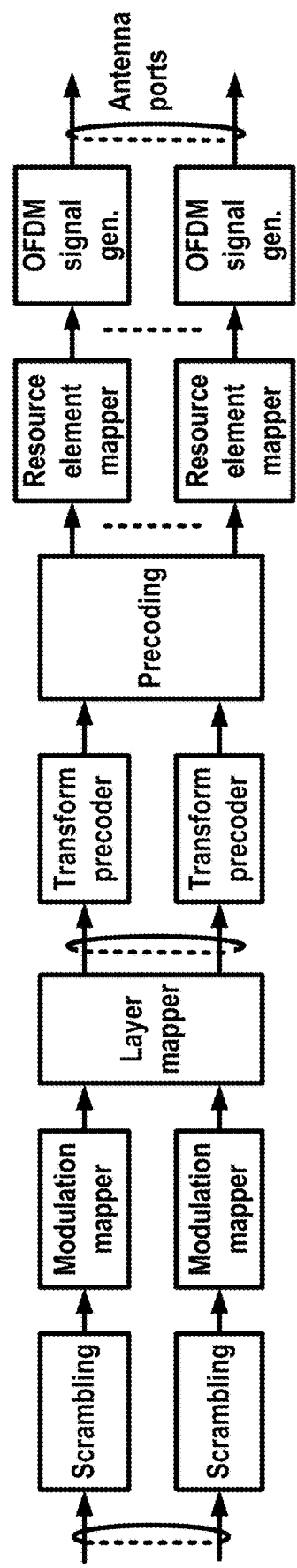

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

Figure 16D:
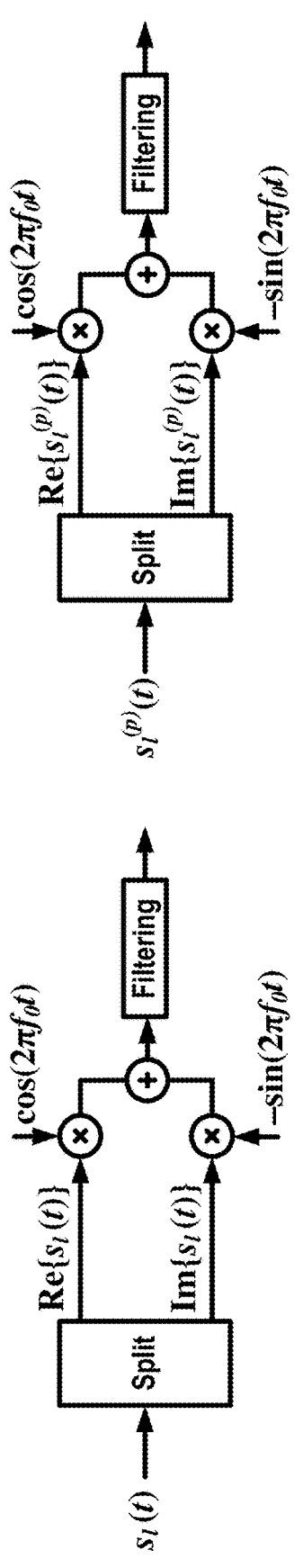

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g., RRC messages) comprising configuration parameters of a plurality of cells (e.g., primary cell, secondary cell). The wireless device may communicate with at least one base station (e.g., two or more base stations in dual connectivity) via the plurality of cells. The one or more messages (e.g., as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g., the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Layer-1/2 triggered mobility (LTM) may be referred to as lower layer triggered mobility. LTM is a procedure in which a base station (e.g., gNB, cell, network, CU, DU, source DU, candidate/target DU, source CU, candidate CU, gNB-DU, gNB-CU, and the like) may receive one or more layer 1 or 2 (L-1/2), e.g., physical layer, medium access control (MAC) layer, lower layer, and the like, measurement reports from wireless devices. Based on (or on the basis of receiving) the one or more L-1/2 measurement reports (the one or more L-1/2 measurement reports may be referred to as one or more (L-1/2) measurements), the base station may change/switch/swap/move a wireless device's serving cell(s) through/via/using a control command (e.g., medium access control (MAC) control element (CE), L-1/2 control command, DCI, PDCCH, cell switch MAC CE, LTM command MAC CE, LTM cell switch command MAC CE, and the like). The base station may prepare (e.g., indicate to the wireless device) one or more candidate/target cells, e.g., for LTM.

The one or more candidate/target cells may be referred to as one or more candidate/target cells (or one or more candidate cells for LTM, or one or more candidate/target cells for LTM, or one or more candidate/target LTM cells, or one or more LTM candidate/target cells, and the like). The one or more candidate/target cells may comprise one or more serving cells. The one or more candidate/target cells may comprise one or more (candidate/target) non-serving cells. The one or more candidate/target cells may comprise one or more (candidate/target) SCells. The one or more candidate/target cells may comprise one or more (candidate/target) activated SCells. The one or more candidate/target cells may comprise one or more (candidate/target) deactivated SCells.

The base station may provide, e.g., for LTM (or an LTM procedure/process), one or more candidate/target (LTM cell) configurations to the wireless device through/via one or more messages (e.g., one or more RRC messages). The one or more messages may comprise one or more configuration parameters (e.g., one or more RRC configuration parameters). The one or more messages and/or the one or more configuration parameters may comprise the one or more candidate/target (LTM cell) configurations.

The one or more messages may indicate the one or more candidate/target cells. The one or more candidate/target (LTM) cell configurations may be for/indicate/associated with/of the one or more candidate/target cells. Each candidate/target (LTM) cell configuration, of the one or more candidate/target (LTM cell) configurations, may be for/indicate/associated with a respective candidate/target cell of the one or more candidate/target cells. Then (e.g., after the wireless device receives the one or more messages) an LTM cell switch may be triggered (e.g., by the base station/gNB), by selecting one candidate/target (LTM cell) configuration, of the one or more candidate/target (LTM cell) configurations, as a target (LTM cell) configuration for LTM by the base station. The one or more candidate/target (LTM cell) configurations may be added by the network/base station via RRC signaling (e.g., via/using one or more second messages). The one or more candidate/target (LTM cell) configurations may be modified/updated/changed by the network/base station via RRC signaling (e.g., via/using one or more second messages). The one or more candidate/target (LTM cell) configurations may be released by the network/base station via RRC signaling (e.g., via/using one or more second messages).

In an example, the one or more candidate/target (LTM cell) configurations may be/comprise/be comprised in one or more RRCReconfigurations (messages). Each RRCReconfiguration of the one or more RRCReconfigurations may be for/associated with a respective candidate/target cell of the one or more candidate/target cells. In an example, the one or more candidate/target (LTM cell) configurations may be/comprise/be comprised in one or more CellGroupConfig information elements (IEs). Each CellGroupConfig IE of the one or more CellGroupConfig IEs may be for/associated with a respective candidate/target cell of the one or more candidate/target cells.

In LTM (e.g., LTM procedure, LTM process, and the like), the one or more candidate/target (LTM cell) configurations may be provided (e.g., transmitted by the base station to the wireless device via one or more second messages) as one or more delta configurations on top of one or more reference configurations. The one or more reference configurations may be managed separately, e.g., by the base station. The wireless device may store the one or more reference configurations as separate configuration(s), each.

In LTM, user plane may be continued whenever possible (e.g., intra-DU LTM, intra-DU mobility, intra-DU handover, and the like), without reset, with a target to avoid data loss and additional delay of data recovery. Security may not be updated in LTM. Subsequent LTM between candidate/target cell(s), of the one or more candidate/target cells, may be performed by the wireless device/base station without RRC reconfiguration. For example, the wireless device may not release candidate/target (LTM cell) configuration(s), of the one or more candidate/target (LTM cell) configurations, after LTM is triggered/completed.

LTM may support/comprise intra-gNB-distributed unit (DU) mobility (e.g., intra-DU mobility). LTM may support/comprise intra-gNB-central/centralized unit (CU) mobility (e.g., intra-CU mobility). LTM may support/comprise inter-gNB-DU mobility (e.g., inter-DU mobility). LTM may support/comprise inter-gNB-CU mobility (e.g., inter-CU mobility). LTM may support/comprise inter-frequency mobility, including/comprising mobility to inter-frequency cell that is not a current serving cell.

LTM may support/comprise PCell change in non-carrier aggregation (CA) scenario. For example, a source/serving cell may be a PCell. A candidate/target cell may not be a PCell. The wireless device may cell switch (e.g., cell switch via LTM, cell switch command MAC CE, LTM command MAC CE, and the like) to a candidate/target cell (e.g., of the one or more candidate/target cells). After the cell switch, the candidate/target cell may be the PCell. The source/serving cell may not be the PCell after the cell switch.

LTM may support/comprise PCell change without SCell change in CA scenario.

LTM may support/comprise PCell change with SCell changes(s) in CA scenario. For example, a target candidate/target cell (e.g., target PCell/target SCell(s)) may not be a current serving cell (CA-to-CA scenario with PCell change). For example, the target PCell may be a current SCell. For example, the target SCell may be a current PCell.

The source/serving cell may be a PCell, SCell, PSCell, SpCell, and/or the like. Each candidate/target cell, of the one or more candidate/target cells, may be a PCell, SCell, activated SCell, deactivated SCell, PSCell, SpCell, non-serving cell, unlicensed cell, cell operating with shared spectrum channel access, FR1 cell, FR2 cell, and/or the like.

LTM may support/comprise dual connectivity (DC) scenario, at least for the PSCell change without master node (MN) involvement case, e.g., intra-secondary node (SN).

Cell switch trigger information for LTM may be conveyed (e.g., by/from the base station to the wireless device) in a control command (e.g., MAC CE, activation command, cell switch command, cell switch MAC CE, cell switch command MAC CE, LTM command MAC CE, LTM cell switch command MAC CE, DCI, PDCCH order, and the like). The control command may comprise at least a candidate/target (LTM cell) configuration index. The candidate/target (LTM cell) configuration index may indicate/identify a candidate/target cell (and/or a candidate/target (LTM cell) configuration) from/among/of the one or more candidate/target cells (and/or one or more candidate/target (LTM cell) configurations). Cell-specific, radio bearer, and/or measurement configurations may be part of a/each candidate/target (LTM cell) configuration of the one or more candidate/target (LTM cell) configurations.

The control command may indicate TCI state(s) (and/or other beam information, e.g., reference signal, quasi colocation (QCL) assumption, spatial filter, spatial domain filter, spatial domain transmission filter, spatial domain reception filter, transmit beam, reception beam, and the like) to activate for the target/candidate cell(s).

SCell activation/deactivation (amongst SCells associated with the one or more candidate/target (cell) configurations) may be performed (e.g., by the wireless device and/or the base station) simultaneously with/using/via the control command (e.g., LTM triggering MAC CE, cell-switch MAC CE, cell switch command, cell switch command/indication, LTM command MAC CE, control command, and the like).

The wireless device may perform contention based random access (CBRA) and/or contention free random access (CFRA) at/after cell switch (e.g., after receiving the control command, e.g., cell-switch MAC CE). The wireless device may skip random access (RA) procedure (e.g., the CBRA and/or the CFRA) if the wireless device does not need to acquire TA for the target/candidate cell during/after cell switch (e.g., in response to the wireless device determining TA of the target/candidate cell before/prior to receiving the control command). RACH resources for CFRA may be provided by the base station in one or more configuration parameters (or via the one or more candidate/target (LTM cell) configurations) and/or the control command.

In an example, the control command may indicate/provide CFRA resources. The wireless device may perform CFRA in/via the candidate/target cell using the CFRA resources.

Figure 17:
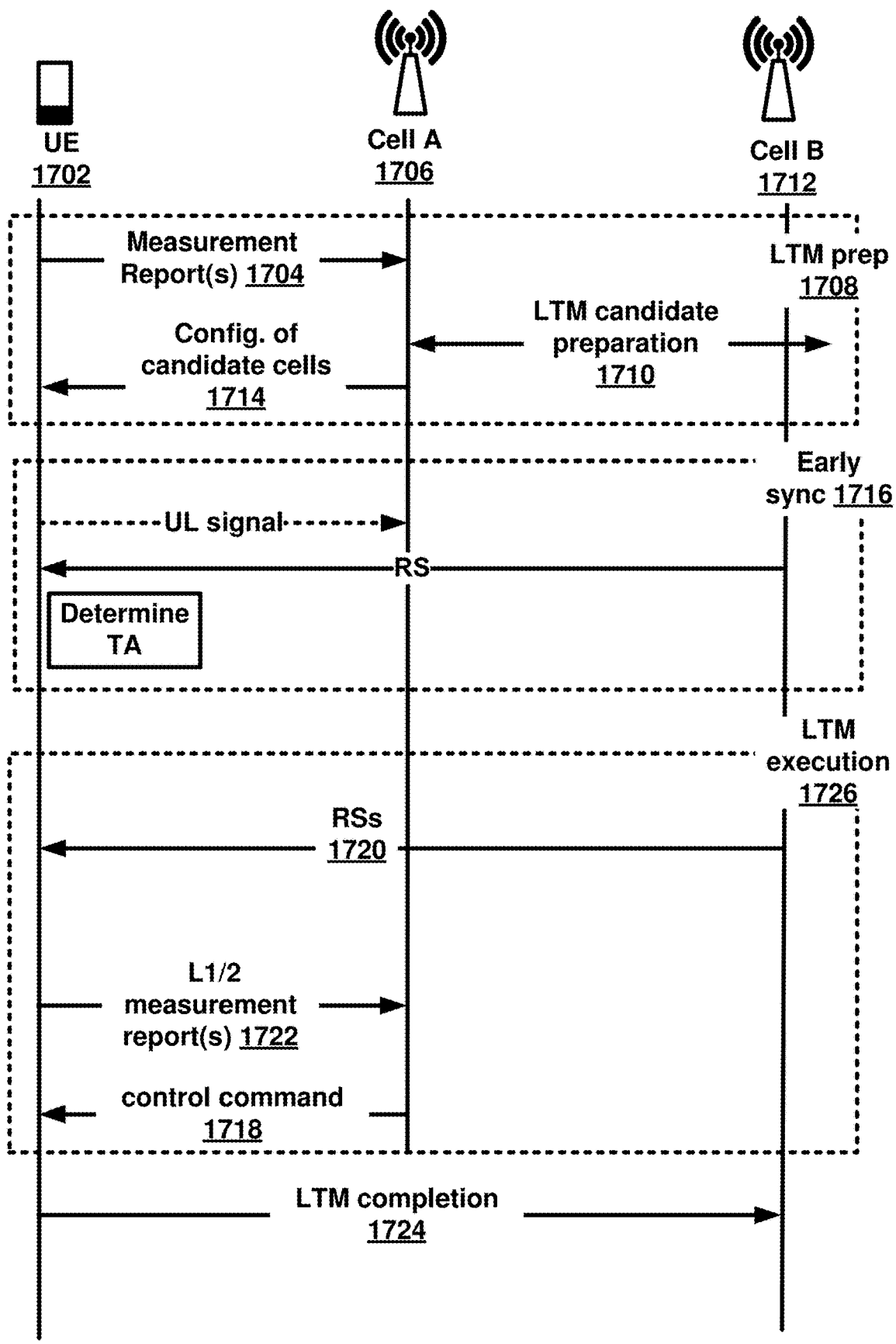
FIG. 17 shows procedure(s)/steps for LTM.

FIG. 17 shows procedure(s)/steps for LTM. Subsequent LTM may be done/performed (e.g., by the base station and/or the wireless device) by repeating early synchronization (e.g., Early sync 1716), LTM execution 1726, and/or LTM completion 1724 steps/procedures (as shown in FIG. 17) without releasing other candidates (e.g., the one or more candidate/target (LTM cell) configurations) after each LTM completion.

In the example of FIG. 17, a wireless device (e.g., UE 1702) may transmit one or more measurement reports (e.g., Measurement Report(s) 1704). The one or more measurement reports may be, for example, one or more layer 3 (L3) measurement reports. The wireless device may transmit the one or more (L3) measurement reports to/via a base station/gNB. The wireless device may transmit the one or more (L3) measurement reports via a serving/source cell (e.g., via Cell A 1706). The base station may be/comprise/of/for/serve the source/serving cell (e.g., via Cell A 1706).

The base station may determine to use/perform LTM, for example, based on the one or more (L3) measurement reports (e.g., Measurement Report(s) 1704). The base station may initiate LTM candidate preparation (e.g., LTM prep. 1708 and/or LTM candidate preparation 1710), for example, by coordinating with one or more candidate/target cells (e.g., one or more (gNB-)DUs, one or more source/serving (gNB-)DUs, one or more candidate/target (gNB) DUs, one or more (gNB-)CUs, one or more candidate/target (gNB-)CUs, and the like). The one or more candidate/target cells may comprise Cell B 1712.

The base station may transmit one or more messages (e.g., RRC messages) to the wireless device. The one or more messages may comprise one or more candidate/target (LTM) cell configurations (e.g., Config. of candidate cells 1714), e.g., for LTM/LTM procedure(s). The one or more messages may comprise one or more configuration parameters indicating/comprising the one or more candidate/target (LTM cell) configurations (e.g., Config. of candidate cells 1714). The one or more candidate/target (LTM cell) configurations may be/comprise/be comprised in one or more RRCReconfiguration (parameters/messages). The wireless device may receive, from/via the base station (e.g., via a source/serving cell), a respective candidate/target (LTM cell) configuration, of the one or more candidate/target (LTM cell) configurations (e.g., Config. of candidate cells 1714), for each candidate/target cell of the one or more candidate/target cells. The wireless device may store the one or more candidate/target (LTM cell) configurations (e.g., Config. of candidate cells 1714) of the one or more candidate/target cells. The wireless device may transmit RRCReconfigurationComplete message(s) to the base station (e.g., via the source/serving cell (Cell A 1706)), for example, based on receiving and/or storing the one or more candidate/target (LTM cell) configurations.

The wireless device may perform early synchronization (e.g., Early sync 1716). The early synchronization may comprise DL synchronization to/with/for/of candidate/target cell(s) of the one or more candidate/target cells (e.g., indicated in/by the one or more candidate/target (LTM cell) configurations). The wireless device may perform DL synchronization to/with/for/of the candidate/target cell(s) before receiving a control command (e.g., a control command 1718, cell switch MAC CE, LTM command MAC CE), for example, based on/using one or more reference signals (e.g., based on measuring the one or more reference signals (e.g., SSB, CSI-RS, CRS, RSs 1720, and the like), wherein each reference signal (RS), of the one or more RSs (e.g., RSs 1720), is associated with/for/from/via a respective candidate/target cell of the one or more candidate/target cells). The one or more RSs (e.g., RSs 1720) may comprise one or more SSBs, one or more CRSs, one or more CSI-RSs, one or more SRSs, one or more tracking RSs, one or more positioning RSs, and/or the like/a combination thereof.

The wireless device may perform timing advance (TA) acquisition (e.g., using an RA procedure by transmitting an RA preamble, or without an RA procedure, e.g., based on wireless device/UE-based TA measurements, and the like). The early synchronization (e.g., Early sync 1716) may comprise the TA acquisition (e.g., may be referred to as early TA acquisition (ETA)). The TA acquisition/ETA may be referred to as, for example, (early) uplink (UL) synchronization. The wireless device may perform TA acquisition/ETA (e.g., acquire TA(s) for/of/associated with candidate/target cell(s) of the one or more candidate/target cells). The wireless device may perform the TA acquisition/ETA, for example, before receiving the control command 1718.

The control command 1718 may be, for example, an LTM cell switch command MAC CE. The control command 1718 may be referred to as, for example, cell switch MAC CE, LTM cell switch MAC CE, LTM command MAC CE, and/or the like. The control command 1718 may trigger/initiate/indicate a cell switch (e.g., a PCell switch/change) from a first cell (e.g., Cell A 1706) as a PCell to a second cell (e.g., Cell B 1712) as the PCell.

The wireless device may acquire the TA(s) using an RA procedure based on receiving a L-1/2 command (e.g., DCI, PDCCH order) (triggering RA channel (RACH) transmission, e.g., RA preamble transmission, RACH transmission, physical RACH (PRACH) transmission, RA preamble/PRACH transmission, and the like) towards/for/of/to/via candidate/target cell(s) of the one or more candidate/target cells. The wireless device may receive the L-1/2 command (e.g., DCI, PDCCH order) from/via the source/serving cell (e.g., Cell A 1706).

The wireless device may perform L-1/2 measurements (e.g., of one or more RSs) on each/any candidate/target cell of the one or more candidate/target cells. The wireless device may transmit the L-1/2 (e.g., lower-layer, physical layer, MAC layer, and the like) measurement report(s) 1722 to the base station (e.g., via the source/serving cell). The wireless device may determine the L-1/2 measurement report(s) 1722 based on measuring one or more RSs from/associated with the one or more candidate/target cells, wherein at least one RS of the one or more RSs is from/associated with a respective candidate/target cell of the one or more candidate/target cells.

The base station/gNB may decide/determine to execute LTM cell switch to a target/candidate cell, of the one or more candidate/target cells, for example, based on (receiving) the L-1/2 measurement report(s) 1722. The base station may transmit (e.g., via the source/serving cell) the control command 1718 (e.g., cell switch MAC CE, LTM command MAC CE, cell switch command MAC CE) triggering LTM cell switch (e.g., cell switch, cell switch for LTM, PCell switch/change, and/or the like). The control command 1718 may comprise a candidate/target (LTM cell) configuration index. The candidate/target (LTM cell) configuration index may indicate/identify a candidate/target (LTM cell) configuration, of the one or more candidate/target (LTM cell) configurations, of/for/associated with the target/candidate cell. The candidate/target (LTM cell) configuration index may indicate/identify a candidate/target cell of the one or more candidate/target cells. The wireless device may switch to/use the configuration of the (LTM) candidate/target cell indicated in the control command 1718.

The wireless device may perform an RA procedure via/in the candidate/target cell (e.g., if a TA for/of the candidate/target cell is not available/valid at the wireless device).

The wireless device may indicate, for example, to/via the candidate/target cell/gNB/base station, of a successful completion of (LTM) cell switch towards the candidate/target cell. The wireless device may transmit one or more uplink (UL) messages to indicate an LTM completion 1724. The LTM completion 1724 may comprise the successful completion of (LTM) cell switch towards the candidate/target cell. The LTM completion 1724 may comprise an RRC reconfiguration complete message, an RRC setup complete message, and the like. The LTM completion 1724 may comprise an RRC message.

Although the present disclosure may refer to an LTM (or LTM procedure), this procedure may alternatively be referred to/indicate as a cell switch procedure triggered by a control command/cell switch command (e.g., MAC CE, Layer 1/2 command/message, and the like) or as Layer 1/2 triggered mobility, MAC CE triggered cell switch procedure, non-handover, non-handover mobility, non-handover reconfiguration with sync, non-reconfiguration with sync mobility, handover, reconfiguration with sync, and/or the like.

Early synchronization (e.g., Early sync 1716) may comprise early TA acquisition (ETA).

In an example, the wireless device may perform an RA procedure for ETA. The RA procedure may be referred to as, for example, ETA procedure/process or ETA RA procedure.

The RA procedure may be referred to as, for example, LTM TA acquisition. The RA procedure (e.g., for ETA, LTM TA acquisition, and the like) may be triggered/initiated, for example, by the base station. The RA procedure (e.g., for ETA, LTM TA acquisition, and the like) may be triggered/initiated, for example, by/via a L-1/2 command (e.g., downlink control information (DCI), DCI format 1_0, physical downlink control channel (PDCCH) order, and the like). There may be (only) one RA procedure (e.g., the RA procedure) ongoing at any point in time in the wireless device (e.g., MAC entity of the wireless device).

The wireless device may transmit/perform, for the RA procedure, an RA preamble/PRACH transmission. Transmitting/performing the RA preamble/PRACH transmission may be referred to as, for example, PRACH transmission. The wireless device may transmit/perform the RA preamble/PRACH transmission over/on/via/using one or more PRACH/RA resources.

Based on (e.g., after, in response to, once) transmitting/performing the RA preamble/PRACH transmission, the wireless device may monitor (for) a PDCCH for RA response(s) identified by an RA-RNTI associated with the RA preamble/PRACH transmission while a ra-Response-Window (e.g., RAR window, RAR timer, and the like) is running.

In an example, one or more messages (e.g., RRC message, MAC CE, DCI, PDCCH order, and the like) may indicate to the wireless device whether RAR is needed for PDCCH ordered RACH for a candidate/target cell in LTM. For example, the one or more candidate/target (LTM cell) configurations (e.g., a/each candidate/target (LTM cell) configuration of the one or more candidate/target (LTM cell) configurations) may indicate whether RAR is needed (e.g., RAR monitoring is required, RAR is configured, and the like) for an RA procedure (e.g., RA preamble transmission, PRACH transmission, and the like) initiated/triggered by an L-1/2 command toward/to/for/of/via a candidate/target cell of the one or more candidate/target cells. For example, a/each candidate/target (LTM cell) configuration of the one or more candidate/target (LTM cell) configurations may comprise a field/parameter indicating whether RAR is needed/required (e.g., noRAR within/in/comprised in LTM-EarlySyncConfig information element, which may be comprised in the candidate/target (LTM cell) configuration of the one or more candidate/target (LTM cell) configurations).

For example, a first candidate/target (LTM cell) configuration, of the one or more candidate/target (LTM cell) configurations, may be associated with a first candidate/target cell of the one or more candidate/target cells. A second candidate/target (LTM cell) configuration, of the one or more candidate/target (LTM cell) configurations, for example, may be associated with a second candidate/target cell of the one or more candidate/target cells.

In an example, the first candidate/target (LTM cell) configuration may indicate that RAR is needed (e.g., RAR monitoring is needed/required, RAR is expected by the wireless device, RAR monitoring is configured, RAR is configured, and the like) for (e.g., an RA procedure associated with) the first candidate/target cell, of the one or more candidate/target cells (e.g., noRAR may be set to false). In response to transmitting an RA preamble for an RA procedure that is triggered/initiated by a (layer-1) control command for LTM (e.g., for/via the first candidate/target cell), the wireless device may monitor (for) a PDCCH for Random Access Response (RAR) identified by an RA-RNTI associated with (or corresponding to) the RA preamble/PRACH transmission (e.g., while a ra-Response Window (e.g., RAR window, RAR timer, and the like) is running).

In an example, the wireless device may not receive an RAR identified by an RA-RNTI associated with (or corresponding to) the RA preamble (e.g., while a ra-Response Window (e.g., RAR window, RAR timer, and the like) is running). The wireless device may increment a counter (e.g., preamble transmission counter), for example, based on not receiving an RAR identified by an RA-RNTI associated with (or corresponding to) the RA preamble (e.g., while a ra-Response Window (e.g., RAR window, RAR timer, and the like) is running).

In an example, the ra-Response Window (e.g., RAR window, RAR timer, and the like) may expire. The wireless device may not receive an RAR containing/corresponding to the RA preamble (or RA preamble identifiers). The wireless device may increment the counter, for example, based on the ra-Response Window (e.g., RAR window, RAR timer, and the like) expiring and/or not receiving an RAR containing/corresponding to the RA preamble (or RA preamble identifiers).

In another example, the second candidate/target (LTM cell) configuration may indicate that RAR is not needed (e.g., RAR monitoring is not needed/required, RAR is not expected by the wireless device, RAR monitoring is not configured, RAR is not configured, and the like) for (e.g., an RA procedure associated with) the second candidate/target cell, of the one or more candidate/target cells (e.g., noRAR may be set to true). In response to transmitting an RA preamble for an RA procedure that is triggered/initiated by a (layer-1) control command for LTM (e.g., for/via the first candidate/target cell), the wireless device may not monitor/receive (for) a PDCCH for Random Access Response(s) identified by an RA-RNTI associated with (or corresponding to) the RA preamble (e.g., while a ra-Response Window (e.g., RAR window, RAR timer, and the like) is running).

In an example, the wireless device may perform an RA procedure for ETA/LTM. The wireless device may determine/acquire a timing advance (value) of/for associated with a candidate/target cell, of the one or more candidate/target cell, without a random access procedure (e.g., RACH-less ETA/LTM).

In an example, the wireless device may determine a TA or a TA value of a second cell based on a UE-based TA measurement procedure. In some embodiments, "TA" and "TA value" may be used interchangeably in the present disclosure.

In an example, the one or more candidate/target cells may comprise the second cell. In another example, the one or more candidate/target cells may not comprise the second cell. The second cell, for example, may not be a candidate/target cell for an LTM procedure.

Figure 18:
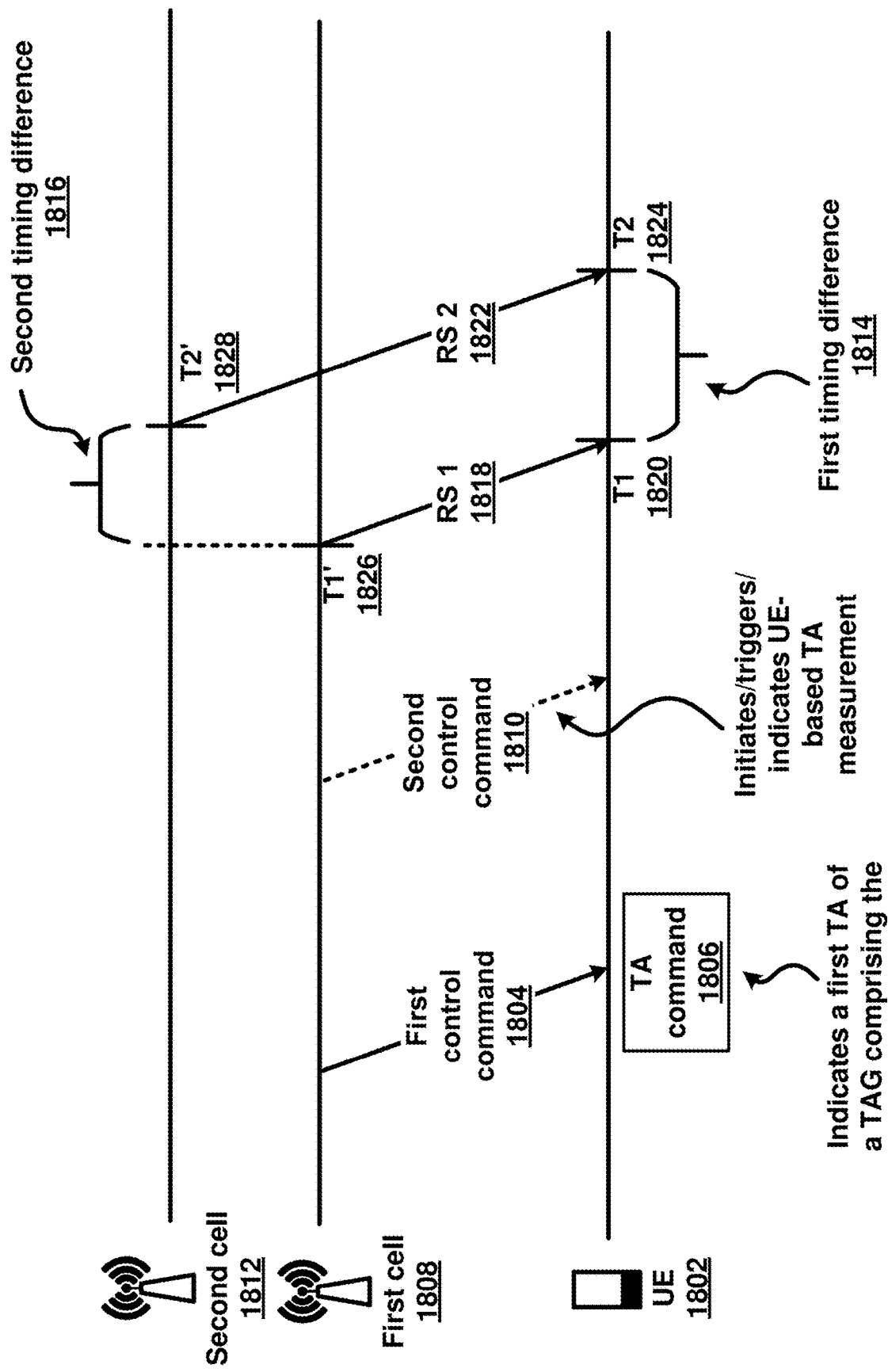
FIG. 18 shows an example timing diagram of a UE-based TA measurement procedure as per an aspect of an embodiment of the present disclosure.

FIG. 18 shows an example timing diagram of a UE-based TA measurement procedure as per an aspect of an embodiment of the present disclosure. In the example of FIG. 18, a wireless device (e.g., UE 1802) may receive a first control command 1804. The first control command 1804 may be/comprise, for example, a TA command MAC CE. The first control command 1804 may be/comprise, for example, an absolute TA command MAC CE. The first control command 1804 may be/comprise, for example, a random access response/Msg2 PDSCH/PDCCH indicating RAR/Msg2. The first control command 1804 may be/comprise, for example, a MsgB (e.g., Message B or a second message of a two-step random access procedure).

In an example, the wireless device may receive the one or more candidate/target (LTM cell) configurations (e.g., Config. of candidate cells 1714) before/prior to receiving the first control command 1804. In another example, the wireless device may receive the one or more candidate/target (LTM) cell configurations (e.g., Config. of candidate cells 1714) after receiving the first control command 1804. In an example, the wireless device may receive the one or more candidate/target (LTM cell) configurations (e.g., Config. of candidate cells 1714) together/along with receiving the first control command 1804. In an example, the one or more candidate/target (LTM cell) configurations (e.g., Config. of candidate cells 1714) may comprise the first control command 1804.

In an example, the first control command 1804 comprises a TA command 1806. The TA command 1806 may be/comprise a TA command field in the first control command 1804. The TA command 1806 may, for example, indicate an index value TA (0, 1, 2 . . . 63) used to control an amount of timing adjustment that the wireless device has to apply. A length of TA command 1806 in the first control command 1804 may be, for example, 6 bits. In another example, the TA command 1806 in the first control command 1804 may be, for example, 12 bits.

In an example, the first control command 1804 may comprise a timing advance group (TAG) identity field. The TAG identity field may indicate a TAG Identity of an addressed TAG. The TAG containing/comprising the SpCell may have a TAG Identity 0. The length of the TAG identity field may be 2 bits.

The wireless device may receive the first control command 1804 via a first cell 1808. The addressed TAG may comprise the first cell 1808. The first cell 1808 may be a serving/source cell. The first cell 1808 may be, for example, Cell A 1706. The first cell 1808 may be a SpCell (e.g., PCell or a PSCell). The first cell 1808 may be an SCell.

The wireless device may, when the first control command 1804 is received, and if an NTA has been maintained with the addressed TAG (e.g., TAG identified/indicated in the TAG identity field), apply the TA command 1806, comprised in the first control command 1804, for the addressed/indicated TAG. The wireless device may, when the first control command 1804 is received, and if an NTA has been maintained with the indicated/addressed TAG (e.g., in the TAG identity field), start or restart a time alignment timer associated with the indicated/addressed TAG.

The wireless device may receive the first control command 1804 from a first base station. The wireless device may receive the first control command via/on/from the first cell 1808. The first base station may be of/for/associated with/serving the first cell 1808.

The TA command 1806 may indicate a first TA value of a TAG. The TAG may, for example, comprise the first cell 1808. The wireless device may determine a first TA value of the TAG based on the TA command 1806. The wireless device may determine the first TA of the TAG, for example, based on receiving the first control command 1804. The wireless device may determine the first TA of/for/associated with the TAG, for example, based on receiving the TA command 1806.

In the example of FIG. 18, the wireless device may receive a second control command 1810. The wireless device may receive the second control command 1810 from the first base station. The wireless device may receive the second control command 1810, for example, via/on/from the first cell 1808. The second control command 1810 may be, for example, a UE-based TA measurement procedure activation/deactivation MAC-CE.

The second control command 1810 may indicate/trigger/initiate a UE-based TA measurement procedure. The wireless device may begin/start/initiate a UE-based TA measurement procedure, for example, based on receiving the second control command 1810. In an example, the second control command 1810 may comprise/be the control command 1718.

In an example, the wireless device may not receive the second control command 1810. The wireless device may begin/start/initiate a UE-based TA measurement procedure, for example, without receiving the second control command 1810 (indicating/triggering/initiating the UE-based TA measurement procedure).

The UE-based TA measurement procedure may be referred to as, for example, UE-based TA measurement, UE-based TA measurement process, autonomous TA measurement by the wireless device, UE-based TA acquisition, TA determination without a TA command, and/or the like. The UE-based TA measurement procedure may comprise/be a method/procedure/process performed/used/done by the wireless device to determine a second TA value of/for/associated with a second cell 1812 in an open-loop manner (e.g., not/without receiving a timing advance command associated with the second TA and/or the second cell 1812).

The UE-based TA measurement procedure may comprise/be, for example, a method/procedure/process performed/used/done by the wireless device to determine a TA value (e.g., the second TA value) of/for/associated with a TAG comprising a cell (e.g., the second cell 1812) in an open-loop manner (e.g., not/without receiving a TA command associated with the TA and/or the cell).

In an example, the second cell 1812 may not be a candidate/target (LTM) cell. In an example, the second cell 1812 may not be associated with LTM.

In an example, the one or more candidate/target cells may comprise the second cell 1812. The one or more candidate/target (LTM cell) configurations may comprise a first candidate/target (LTM cell) configuration associated with the second cell 1812. The first candidate/target (LTM cell) configurations may comprise a first field/parameter. The first field/parameter may be, for example, enable-UE-TA. The first field/parameter may be, for example, UEmeasuredTA. The first field/parameter may indicate to the wireless device whether the wireless device is allowed/enabled to determine a TA value of the second cell 1812 using/based on a UE-based TA measurement procedure.

In an example, the first field/parameter may be set to a first value (e.g., enable, true, yes, 1, 0, and the like). The first field/parameter may indicate that the wireless device is allowed/enabled to determine a TA value of the second cell 1812 using/based on a UE-based TA measurement procedure (or a UE-based TA measurement is enabled for the second cell 1812) based on the first field/parameter being set to the first value. In an example, a presence/absence of the first field/parameter (e.g., in the one or more candidate/target (LTM cell) configurations) may indicate that the wireless device is allowed/enabled to determine a TA value of the second cell 1812 using/based on a UE-based TA measurement procedure (or a UE-based TA measurement is enabled for the second cell 1812).

In an example, the first field/parameter may be set to a second value (e.g., disable, false, no, 1, 0, and the like). The first field/parameter may indicate that the wireless device is not allowed/enabled to determine a TA value of the second cell 1812 using/based on a UE-based TA measurement procedure (or a UE-based TA measurement is not enabled (or disabled) for the second cell 1812) based on the first field/parameter being set to the second value. In another example, a presence/absence of the first field/parameter (e.g., in the one or more candidate/target (LTM) cell configurations) may indicate that the wireless device is not allowed/enabled to determine a TA value of the second cell 1812 using/based on a UE-based TA measurement procedure (or a UE-based TA measurement is not enabled (or disabled) for the second cell 1812).

The wireless device may determine/initiate/trigger/start/begin a UE-based TA measurement procedure (e.g., to determine a second TA value of/for/associated with the second cell 1812), for example, based on: the first field/parameter indicating that the wireless device is allowed/enabled to determine a TA value of the second cell using/based on a UE-based TA measurement procedure (or a UE-based TA measurement is enabled for the second cell 1812), the second control command triggering/indicating/initiating a UE-based TA measurement procedure, and/or the wireless device being capable of determining the second TA of the second cell 1812 based on a UE-based TA measurement procedure.

In an example, the wireless device may transmit a capability message to the first base station (e.g., via the first cell 1808). The capability message may indicate whether the wireless device is capable of (or can support or supports) determining the second TA of the second cell 1812 using/based on a UE-based TA measurement procedure.

In the example of FIG. 18, the wireless device determines the second TA of/for/associated with the second cell 1812 using/based on a UE-based TA measurement procedure. The UE-based TA measurement procedure may comprise determining the second TA based on a first TA of a serving/source cell (e.g., the first TA of the first cell 1808, or the TA command 1806), a first timing difference (e.g., a first timing difference 1814), and/or a second timing difference (e.g., a second timing difference 1816).

In an example, the wireless device may receive, via the first cell 1808, a first reference signal (e.g., RS 1 1818) at/during/in a first time interval (e.g., T1 1820). The wireless device may receive, via the second cell 1812, a second reference signal (e.g., RS 2 1822) at/during/in a second time interval (e.g., T2 1824). A difference between the first time interval (e.g., T1 1820) and the second time interval (e.g., T2 1824) may be/comprise the first timing difference 1814. The difference between the first time interval (e.g., T1 1820) and the second time interval (e.g., T2 1824) may be/comprise a difference between a first starting or ending time of the first time interval (e.g., T1 1820) and a second starting or ending time of the second time interval (e.g., T2 1824).

In an example, the first base station (e.g., a first DU, a first transmit and receive port (TRP), a first node, and the like) may transmit, via the first cell 1808, the first reference signal (e.g., RS 1 1818) at/during/in a third time interval (e.g., T1' 1826). A second base station (e.g., a second DU, a second transmit and receive port (TRP), a second node, and the like) may transmit, via the second cell 1812, the second reference signal (e.g., RS 2 1822) at/during/in a fourth time interval (e.g., T2' 1828). A difference between the third time interval (e.g., T1' 1826) and the fourth time interval (e.g., T2' 1828) may be/comprise the second timing difference 1816. The difference between the third time interval (e.g., T1' 1826) and the fourth time interval (e.g., T2' 1828) may be/comprise a difference between a third starting or ending time of the third time interval (e.g., T1' 1826) and a fourth starting or ending time of the fourth time interval (e.g., T2' 1828).

In an example, the second timing difference 1816 may be referred to as a reference signal time/timing/transmit timing difference (RSTD). In an example, the one or more configuration parameters (Config. of candidate cells 1714) may indicate the second timing difference 1816. The second timing difference 1816 may be associated with/for/of the second cell 1812. The one or more configuration parameters may comprise one or more RSTD values. The one or more RSTD values may be for/of/associated with/correspond to the one or more candidate/target cells. Each RSTD value, of the one or more RSTD values may be for/of/associated with/correspond to a respective candidate/target cell of the one or more candidate/target cells. In an example, the one or more RSTD values may comprise the second timing difference 1816. The one or more candidate/target cells may comprise, for example, the second cell 1812.

In an example, the wireless device may determine the second TA (value) of/for/associated with the second cell 1812 using a first equation. The first equation may comprise, for example, the first TA. The first equation may comprise, for example, the first timing difference 1814. The first equation may comprise, for example, the second timing difference 1816. The first equation may be, for example, the second TA (value)=the first TA (value)+the first timing difference 1814−the second timing difference 1816. The first equation may be, for example, the second TA (value)=the first TA (value)+the first timing difference 1814+the second timing difference 1816.

In an example, the one or more candidate/target cells may comprise the second cell 1812. In an example, the one or more candidate/target cells may not comprise the second cell 1812. In an example, the second cell 1812 may not be a candidate/target cell for an LTM procedure. In an example, the second cell 1812 may be: a serving cell, a non-serving cell, a secondary cell (SCell), a primary secondary cell (PSCell), a primary cell (PCell), an unlicensed cell, a cell configured for shared spectrum channel access, a cell comprised in a master cell group, a cell comprised in a secondary cell group, and/or an SCell configured for PUCCH.

Figure 19:
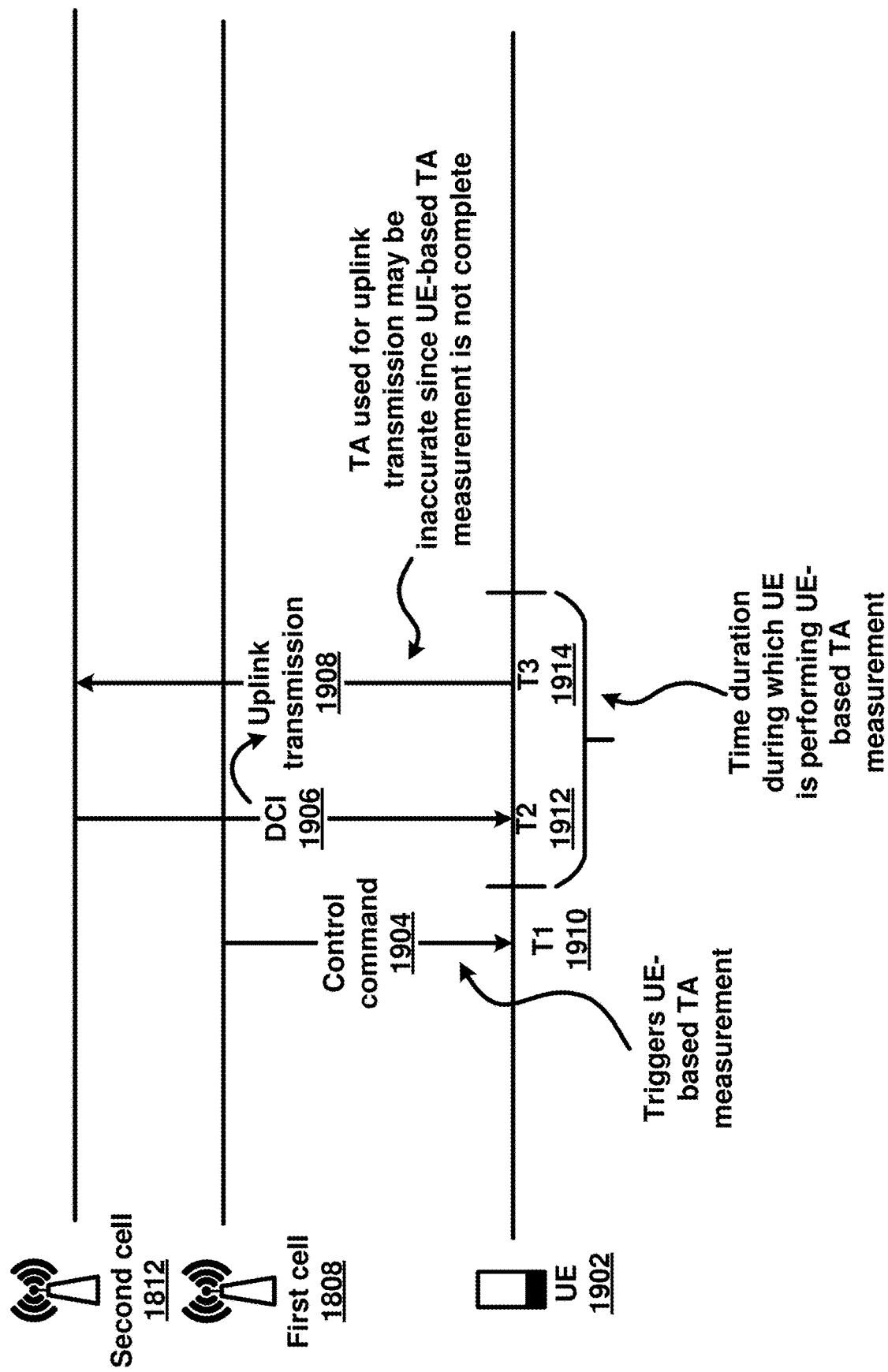
FIG. 19 illustrates an example timing diagram as per an aspect of an embodiment of the present disclosure.

FIG. 19 illustrates an example timing diagram as per an aspect of an embodiment of the present disclosure.

In existing technologies, a wireless device (e.g., UE 1902) may receive a control command 1904. In an example, the control command 1904 may be the control command 1718. The control command 1904 may trigger an LTM cell switch (e.g., of a PCell) from the first cell 1808 to the second cell 1812. In another example, the control command 1904 may be the second control command 1810. The control command 1904 may not comprise a TA command (and/or may not indicate a TA value). In response to (receiving) the control command 1904, the wireless device may start/begin monitoring or monitor a physical downlink control channel (PDCCH) via the second cell 1812. The wireless device may receive a downlink grant via the PDCCH. The wireless device may receive a downlink control information (DCI) 1906, for example, via the second cell 1812 and the PDCCH. The DCI 1906 may schedule an uplink transmission 1908 via the second cell 1812. The wireless device may receive the control command 1904 during/at/in a first time interval (e.g., T1 1910). The wireless device may receive the DCI 1906 at/during/in a second time interval (e.g., T2 1912). The DCI 1906 may schedule the uplink transmission 1908 in/for/at a third time interval (e.g., T3 1914).

In the existing technologies, the control command 1904 may trigger a UE-based TA measurement procedure. In an example, the control command 1904 may be a second DCI (e.g., PDCCH order).

The implementation of the existing technologies may result in uplink synchronization issues in the uplink transmission 1908. For example, in response to receiving the control command 1904, the wireless device may start/begin the UE-based TA measurement procedure. In the example of FIG. 19, the wireless device may not complete (or may not have completed) the UE-based TA measurement procedure before (a start of) the third time interval (e.g., T3 1914). Based on not completing the UE-based TA measurement procedure before (the start of) the third time interval (e.g., T3 1914), the wireless device may, for example, use an incorrect/inaccurate TA value for the uplink transmission 1908 at/in/during the third time interval. Based on not completing the UE-based TA measurement procedure before the third time interval (e.g., T3 1914), the wireless device may, for example, not perform the uplink transmission 1908 at/in/during the third time interval (e.g., T3 1914). Not performing the uplink transmission 1908 at/in/during the third time interval (e.g., T3 1914) and/or using an incorrect/inaccurate TA value for the uplink transmission 1908 at/in/during the third time interval (e.g., T3 1914) may lead to one or more uplink transmission failures (e.g., not receiving an acknowledgment for the uplink transmission 1908, interference of the uplink transmission 1908 with one or more uplink and/or downlink transmissions from/to a second wireless device, and the like). The one or more uplink transmission failures may result in increased power consumption at the wireless device and/or a base station (e.g., caused due to one or more retransmissions), increase in signaling overhead (e.g., due to one or more retransmissions), underutilization of network resources (e.g., due to additional resources needed for one or more retransmissions), and/or reduction in battery life of the wireless device.

In light of the existing technologies, there is a need to improve a UE-based TA measurement procedure (e.g., during ETA/LTM). In light of the existing technologies, there is a need to improve a UE-based TA measurement procedure that is triggered by a control command.

Embodiments of the present disclosure are related to an approach for determining a TA value of/for/associated with a cell (e.g., of/for a TAG comprising the cell). These and other features of the present disclosure are described further below.

In an example embodiment, a wireless device may transmit, via a first cell, a capability message to a base station. The capability message may comprise a time duration required by the wireless device to determine a TA (value) of a second cell. For example, the second cell may be a non-serving cell. For example, the first cell may be a serving cell. For example, the second cell may be an LTM candidate/target cell (or candidate/target cell for an LTM procedure). In an example, the base station may be of/for/serving the first cell. The first cell may be different from the second cell. In an example, the base station may be of/for/serving the second cell. In an example, the base station may not be of/for/serving the second cell. In an example, a second base station may be of/for/serving the second cell.

The base station may transmit, to the wireless device, a control command. The wireless device may receive, from the base station and at/in/during a first time interval, the control command. The control command may indicate/trigger/initiate a UE-based TA measurement procedure. The second base station may transmit, to the wireless device, a DCI. The wireless device may receive, from the second base station and at/in/during a second time interval, the DCI. The DCI may schedule/indicate an uplink transmission. The DCI may schedule/indicate the uplink transmission (to occur) for/in/at/during a third time interval. The wireless device may transmit, via the second cell, the uplink transmission for/in/at/during a third time interval. In an example embodiment, the second base station may schedule the third time interval to be at least after the time duration from (a start or end) the second time interval.

Example embodiments of the present disclosure may provide enhancement for a UE-based TA measurement procedure. Based on receiving the time duration (e.g., via a capability message), the first base station and/or the second base station may determine the third time interval to be, for example, at least the time duration after the second time interval. Transmitting the time duration, e.g., via the capability message, may add additional signaling overhead, but the additional signaling overhead may be worth the benefit of achieving/performing an accurate UE-based TA measurement for/before/prior to the uplink transmission.

Based on the third time interval being at least the time duration after the second time interval, the wireless device may complete the UE-based TA measurement prior to/before the uplink transmission at/in/during the third time interval. Based on completing the UE-based TA measurement prior to/before the uplink transmission, the wireless device may use an accurate TA value for the uplink transmission. Using an accurate TA value for the uplink transmission may result in reduction in interference in the network, reduction in underutilization of network resources, and/or improvement in battery life of the wireless device.

Figure 20:
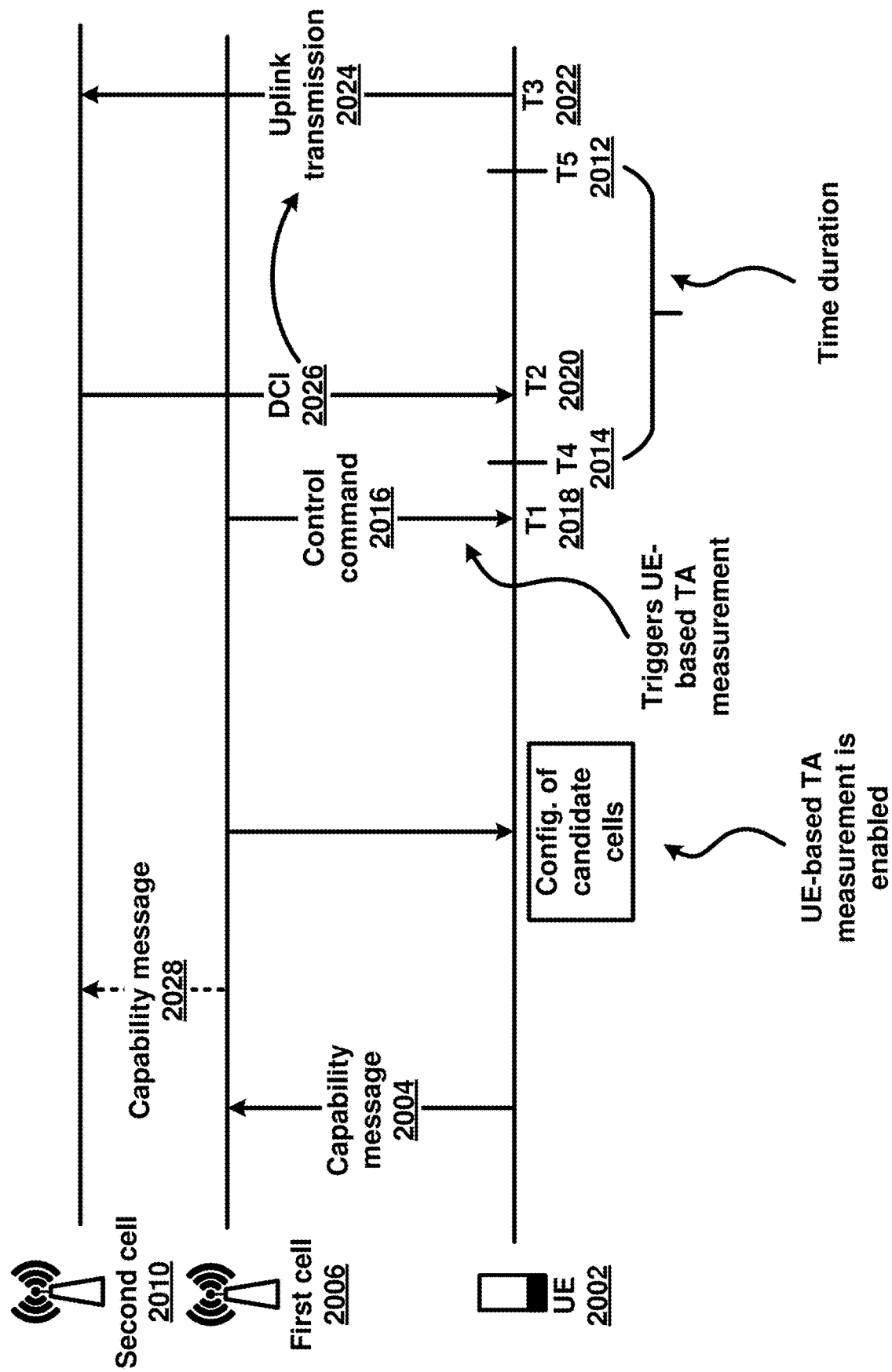
FIG. 20 illustrates an example timing diagram as per an aspect of an embodiment of the present disclosure.

FIG. 20 illustrates an example timing diagram as per an aspect of an embodiment of the present disclosure. In the example of FIG. 20, a wireless device (e.g., UE 2002) transmits a capability message 2004. The wireless device may transmit the capability message 2004 via/on/towards/for/in a first cell 2006. The first cell 2006 may be, for example, a serving cell. The first cell 2006 may be, for example, a primary cell (PCell). The first cell 2006 may be, for example, a secondary cell (SCell). The first cell 2006 may be, for example, a special cell (SpCell). The first cell 2006 may be, for example, a primary secondary cell (PSCell). The first cell 2006 may be a secondary cell configured with PUCCH (e.g., PUCCH SCell). In an example, the first cell 2006 may be a non-terrestrial network cell. For dual connectivity (DC) operation, the SpCell may refer to (or indicate) the PCell of the MCG or the PSCell of the SCG, otherwise the SpCell may refer to (or indicate) the PCell.

In an example, the first cell 2006 may be an unlicensed (or shared spectrum channel access) cell, e.g., operating in an unlicensed band or operating with shared spectrum channel access. In an example, the first cell 2006 may be a licensed cell, e.g., operating in a licensed band. In an example, the first cell 2006 may operate in a first frequency range (FR1). The FR1 may, for example, comprise frequency bands below 6 GHz. In an example, the first cell 2006 may operate in a second frequency range (FR2). The FR2 may, for example, comprise frequency bands from 24 GHz to 52.6 GHz. In an example, the first cell 2006 may operate in a third frequency range (FR3). The FR3 may, for example, comprise frequency bands from 52.6 GHz to 71 GHz. The FR3 may, for example, comprise frequency bands starting from (or above) 52.6 GHz.

In an example, the wireless device may perform uplink transmissions (e.g., PUSCH, PUCCH, PRACH, SRS) via/of/on/over/in the first cell 2006 in a first time (e.g., time duration, time interval, slot, subframe, time slot, and the like) and in a first frequency. The wireless device may perform downlink receptions (e.g., PDCCH, PDSCH) via/of the first cell 2006 in a second time and in a second frequency. In an example, the first cell 2006 may operate in a time-division duplex (TDD) mode. In the TDD mode, the first frequency and the second frequency may be the same. In the TDD mode, the first time and the second time may be different. In an example, the first cell 2006 may operate in a frequency-division duplex (FDD) mode. In the FDD mode, the first frequency and the second frequency may be different (e.g., not the same). In the FDD mode, the first time and the second time may be the same (e.g., not different).

In an example, the wireless device may be in an RRC connected (RRC_CONNECTED) mode. In an example, the wireless device may be in an RRC idle (RRC_IDLE) mode. In an example, the wireless device may be in an RRC inactive (RRC_INACTIVE) mode.

In an example, the first cell 2006 may comprise a plurality of BWPs. The plurality of BWPs may comprise one or more uplink BWPs comprising an uplink (UL) BWP of the first cell 2006. The plurality of BWPs may comprise one or more downlink BWPs comprising a downlink (DL) BWP of the first cell 2006.

In an example, a BWP of the plurality of BWPs may be in one of an active state and an inactive state (or a deactivated state). In an example, in the active state of a downlink BWP of the one or more downlink BWPs, the wireless device may monitor a downlink channel/signal (e.g., PDCCH, DCI, CSI-RS, PDSCH) on/for/via the downlink BWP. In an example, in the active state of a downlink BWP of the one or more downlink BWPs, the wireless device may receive a PDSCH on/via/for the downlink BWP. In an example, in the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In an example, in the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In an example, a first base station may be serving/for/of the first cell 2006. The wireless device may transmit the capability message 2004 to/via the first cell 2006. The wireless device may transmit the capability message 2004 to the first base station.

In an example, the capability message 2004 may comprise a first field. The first field may indicate to the base station whether the wireless device supports (e.g., can support, is capable of, capable of supporting, requests, requesting, capable of requesting, and the like) a UE-based TA measurement procedure. For example, the UE-based TA measurement procedure may comprise one or more elements in/of the example embodiment shown in FIG. 18. For example, the UE-based TA measurement procedure may be the same as the UE-based TA measurement procedure shown in FIG. 18.

In an example, the first field may be set/assign/determine to a first value (e.g., enabled, supported, requested, 0, 1, true, false, and the like). The wireless device may indicate (e.g., to the first base station and/or a second base station) that the wireless device supports (e.g., can support, is capable of, capable of supporting, requests, requesting, capable of requesting, and the like) a UE-based TA measurement procedure, for example, based on the first field being set/assigned/determined to the first value. In an example, the wireless device may indicate (e.g., to the first base station and/or a second base station) that the wireless device supports (e.g., can support, is capable of, capable of supporting, requests, requesting, capable of requesting, and the like) a UE-based TA measurement procedure, for example, based on the presence/absence of the first field in the capability message 2004.

In an example, the first field may be set/assign/determine to a second value (e.g., disabled, not supported, not requested, 0, 1, true, false, and the like). The wireless device may indicate (e.g., to the first base station and/or a second base station) that the wireless device does not support (e.g., cannot support, is not capable of, not capable of supporting, does not request, not requesting, not capable of requesting, and the like) a UE-based TA measurement procedure, for example, based on the first field being set/assigned/determined to the second value. The wireless device may indicate (e.g., to the first base station and/or a second base station) that the wireless device does not support (e.g., cannot support, is not capable of, not capable of supporting, does not request, not requesting, not capable of requesting, and the like) a UE-based TA measurement procedure, for example, based on a presence/absence of the first field in the capability message 2004.

In an example, the capability message 2004 may comprise a second field. The second field may indicate/comprise a time duration (e.g., Time duration shown in FIG. 20).

The time duration may be/comprise/indicate, for example, a time (e.g., maximum time, minimum time, average time, mean time, median time, time instance, time duration, time interval, time period, time gap, timer, time window, time slot(s), time offset, slot(s), slot offset, slot duration, subframe, and the like) required by the wireless device to determine a TA value of a second cell (e.g., a second cell 2010). The second cell 2010 may be, for example, a candidate/target cell (e.g., Cell B 1712), of the one or more candidate/target cells, for an LTM procedure. The second cell may be, for example, the second cell 1812.

The time duration may be/comprise/indicate, for example, a time (e.g., maximum time, minimum time, average time, mean time, median time, time instance, time duration, time interval, time period, time gap, time window, time slot(s), time offset, slot(s), slot offset, slot duration, subframe, and the like) required/needed/used by the wireless device to determine a TA value of the second cell (e.g., the second cell 2010) using a UE-based TA measurement procedure, e.g., once/upon/after receiving a control command triggering/indicating/initiating the UE-based TA measurement procedure. The time duration may be/comprise/indicate, for example, a time (e.g., maximum time, minimum time, average time, mean time, median time, time instance, time duration, time interval, time period, time gap, time slot(s), time window, time offset, slot(s), slot offset, slot duration, subframe, and the like) required/needed/used by the wireless device to complete a UE-based TA measurement procedure, e.g., once/upon/after receiving a control command triggering/indicating/initiating the UE-based TA measurement procedure.

In the example of FIG. 20, the time duration may be/comprise/be represented as T5 2012-T4 2014 (T5 2012 minus T4 2014, or a difference between T5 2012 and T4 2014). In the example of FIG. 20, the time duration may be the time period/duration during which the wireless device is performing/performs (e.g., determines a TA of a second cell, e.g., the second cell 2010 using) a UE-based TA measurement.

In the example of FIG. 20, the wireless device may receive one or more messages. The wireless device may receive the one or more messages from a base station. The base station may transmit the one or more messages. The base station may be, for example, a serving base station (e.g., a base station of/for/that serves a serving cell). The base station may be, for example, the first base station.

The one or more messages may be radio resource control (RRC) messages (e.g., one or more RRC setup messages, one or more RRC reconfiguration messages, one or more RRC connection reestablishment messages, one or more RRC release messages, and the like). The one or more messages may be system information messages (e.g., one or more broadcast messages, one or more system information blocks (SIBs), and the like). In an example, the wireless device may receive the one or more messages from a relay node. In an example, the wireless device may receive the one or more messages from another wireless device (e.g., transmission and/or reception point (TRP), vehicle, remote radio head, and the like). In an example, the wireless device may receive the one or more messages from a non-terrestrial network payload (e.g., satellite, drone, uncrewed/unmanned aerial vehicle, and the like).

The one or more messages may comprise one or more configuration parameters. The one or more configuration parameters may be for a set/plurality of cells. The set/plurality of cells may comprise the first cell 2006. The set/plurality of cells may comprise, for example, the second cell 2010.

The one or more configuration parameters may comprise one or more candidate/target (LTM cell) configurations/configuration parameters (e.g., Config. of candidate cells 1714). The one or more candidate/target (LTM cell) configurations/configuration parameters (e.g., Config. of candidate cells 1714) may be for/of/associated with the one or more candidate/target cells. Each candidate/target (LTM cell) configuration/configuration parameter, of the one or more candidate/target (LTM cell) configurations/configuration parameters (e.g., Config. of candidate cells 1714), may be for/of/associated with a respective candidate/target cell of the one or more candidate/target cells.

The one or more candidate/target (LTM cell) configurations/configuration parameters (e.g., Config. of candidate cells 1714) may comprise a first candidate/target (LTM) cell configuration/configuration parameter. The first candidate/target (LTM) cell configuration/configuration parameter may be for/of/associated with the second cell 2010. In an example, the second cell 2010 may be Cell B 1712. In an example, the second cell may be the second cell 1812.

The first candidate/target (LTM) cell configuration/configuration parameter may comprise a first field/parameter indicating whether a UE-based TA measurement is enabled (e.g., for the second cell 2010). The first field/parameter may be, for example, enable-UE-TA. The first field/parameter may be, for example, UEmeasuredTA. The first field/parameter may indicate to the wireless device whether the wireless device is allowed/enabled to determine a TA value of the second cell using/based on a UE-based TA measurement procedure.

In an example, the first field/parameter may be set to a first value (e.g., enable, true, yes, 1, 0, and the like). The first field/parameter may indicate that the wireless device is allowed/enabled to determine a TA value of the second cell using/based on a UE-based TA measurement procedure (or a UE-based TA measurement is enabled for the second cell 2010) based on the first field/parameter being set to the first value. In an example, a presence/absence of the first field/parameter (e.g., in the one or more candidate/target (LTM) cell configurations) may indicate that the wireless device is allowed/enabled to determine a TA value of the second cell using/based on a UE-based TA measurement procedure (or a UE-based TA measurement is enabled for the second cell 2010).

In an example, the first field/parameter may be set to a second value (e.g., disable, false, no, 1, 0, and the like). The first field/parameter may indicate that the wireless device is not allowed/enabled to determine a TA value of the second cell using/based on a UE-based TA measurement procedure (or a UE-based TA measurement is not enabled (or disabled) for the second cell 2010) based on the first field/parameter being set to the second value. In another example, a presence/absence of the first field/parameter (e.g., in the one or more candidate/target (LTM) cell configurations) may indicate that the wireless device is not allowed/enabled to determine a TA value of the second cell using/based on a UE-based TA measurement procedure (or a UE-based TA measurement is not enabled (or disabled) for the second cell 2010).

In an example, the wireless device may receive the one or more messages via the first cell 2006. The wireless device may receive the one or more configuration parameters, for example, via the first cell 2006. The wireless device may receive the one or more candidate/target (LTM cell) configurations/configuration parameters (e.g., Config. of candidate cells 1714), for example, via the first cell 2006.

In an example, the wireless device receives a control command 2016. In an example, the wireless device may receive the control command 2016 via the first cell 2006. In an example, the control command 2016 may be/comprise the control command 1718. In an example, the control command 2016 may be/comprise the first control command 1804. In an example, the control command 2016 may be/comprise the second control command 1810. In an example, the control command 2016 may be/comprise the control command 1904.

The control command 2016 may trigger/initiate/indicate/activate a UE-based TA measurement procedure. For example, the control command 2016 may be a MAC-CE. The control command 2016 may, for example, dynamically activate and/or deactivate the UE-based TA measurement procedure, e.g., for a candidate/target cell (e.g., the second cell 2010). For example, the first base station may dynamically activate and/or deactivate the UE-based TA measurement procedure, e.g., for a candidate/target cell (e.g., the second cell 2010) via the control command 2016.

In an example, the control command 2016 may comprise a target configuration ID (field). The target configuration ID (field) may indicate an index of a candidate/target (LTM cell) configuration, of the one or more candidate/target cell (LTM cell) configurations, to apply for an LTM cell switch. For example, the index of the candidate/target (LTM cell) configuration may indicate the first candidate/target (LTM cell) configuration. The control command 2016 may indicate a cell switch (e.g., a PCell switch) from the first cell 2006 to the second cell 2010 based on the index of the candidate/target (LTM cell) configuration indicating the first candidate/target (LTM cell) configuration and/or the second cell 2010.

In an example, the control command 2016 may comprise a TA command field. The TA command field may be set to a first value (e.g., FFF, 000, an invalid value, and the like). The control command 2016 may trigger/initiate/indicate/activate a UE-based TA measurement procedure, for example, based on the TA command field being set to the first value (e.g., FFF, 000, an invalid value, and the like). If a value of the TA command field is set to FFF, the TA command field may indicate that no valid timing adjustment is available for a primary TAG of an LTM target cell/the second cell 2010 (and UE may perform Random Access to the LTM target cell/the second cell 2010, or trigger/initiate/indicate/activate a UE-based TA measurement procedure, e.g., for/toward/via the second cell 2010).

In an example, the control command 2016 may not comprise a TA command field. The control command 2016 may trigger/initiate/indicate/activate a UE-based TA measurement procedure, for example, based on the control command 2016 not comprising a TA command field.

In some embodiments, "TA command" and "TA command field" may be used interchangeably in the present disclosure.

In an example, the TA command field may be set to a second value (e.g., not FFF, not 000, a valid value, 0011, 0110, and the like). The control command 2016 may not trigger/initiate/indicate/activate (or may indicate to skip) a UE-based TA measurement procedure, for example, based on the TA command field being to the second value (e.g., not FFF, not 000, a valid value, 0011, 0110, and the like).

In an example, the control command 2016 may comprise a TCI state ID (field). The TCI state ID (field) may indicate and/or activate a TCI state for the LTM target cell/the second cell 2010 (e.g., an SpCell of the target configuration indicated by the target configuration ID field). The TCI state may be identified by TCI-StateId. If a value of unifiedTCI-StateType in the SpCell of the target configuration (e.g., the first candidate/target (LTM cell) configuration) indicated by Target Configuration ID field is joint, the TCI state ID (field) may be for a joint TCI state, otherwise, the TCI state ID (field) may be for downlink TCI state.

In an example, the control command 2016 may comprise a UL TCI state ID (field). The UL TCI state ID field may indicate and/or activate an uplink TCI state for the LTM target cell/the second cell 2010 (e.g., the SpCell of the target configuration (e.g., the first candidate/target (LTM cell) configuration) indicated by the Target Configuration ID field). The most significant bits of UL TCI state ID may be considered as reserved bits and the remainder 6 bits may indicate the TCI-UL-StateId. The UL TCI state ID field may be included if the value of unifiedTCI-StateType in the SpCell corresponding to the target configuration (e.g., the first candidate/target (LTM cell) configuration) indicated by Target Configuration ID field is separate.

In an example, the control command 2016 may comprise a Serving Cell ID (field). The Serving Cell ID (field) may indicate an identity of a Serving Cell in the target configuration (e.g., the first candidate/target (LTM cell) configuration), to which the TCI state ID refers.

In an example, the control command 2016 may comprise a preamble index, a mask index, and/or an RS index for an RA procedure. For example, the wireless device may use a preamble indicated by the preamble index, a random access occasion indicated by the mask index, and/or an RS indicated by the RS index for the RA procedure. The wireless device may perform the RA procedure after/based on/in response to receiving the control command 2016. The wireless device may perform the RA procedure, for example, in response to the TA command field being set to the first value (e.g., FFF, 000, an invalid value, and the like).

The first base station may indicate to the wireless device to perform cell switch in an LTM procedure, for example, by sending the control command 2016 to the wireless device. In response to receiving the control command 2016, the wireless device may, if the wireless device receives the control command 2016 via a serving cell (e.g., the first cell 2006): indicate to upper layers (e.g., RRC layer, PDCP layer, and the like) of the wireless device that the control command 2016 is received; trigger an LTM cell switch procedure; perform MAC reset; and/or indicate to the upper layers the Target Configuration ID (e.g., ID of the first candidate/target (LTM cell) configuration) indicated in/by the control command 2016 (e.g., via the Target Configuration ID field). In response to receiving the control command 2016, the wireless device may, if the wireless device receives the control command 2016 via a serving cell (e.g., the first cell 2006) and if TCI state information (e.g., the TCI state ID (field) and/or the UL TCI state ID (field)) is included in the control command 2016: consider the RS (e.g., SSB, CSI-RS) corresponding to the indicated TCI state as the selected RS for an (initial) uplink transmission (e.g., PUSCH, PRACH, PUCCH, SRS, and the like) toward a candidate/target cell (e.g., the second cell 2010); and/or indicate to lower layers (e.g., PHY layer, physical layer, and the like) of the wireless device information regarding the TCI state information included in the control command 2016.

Figure 21:
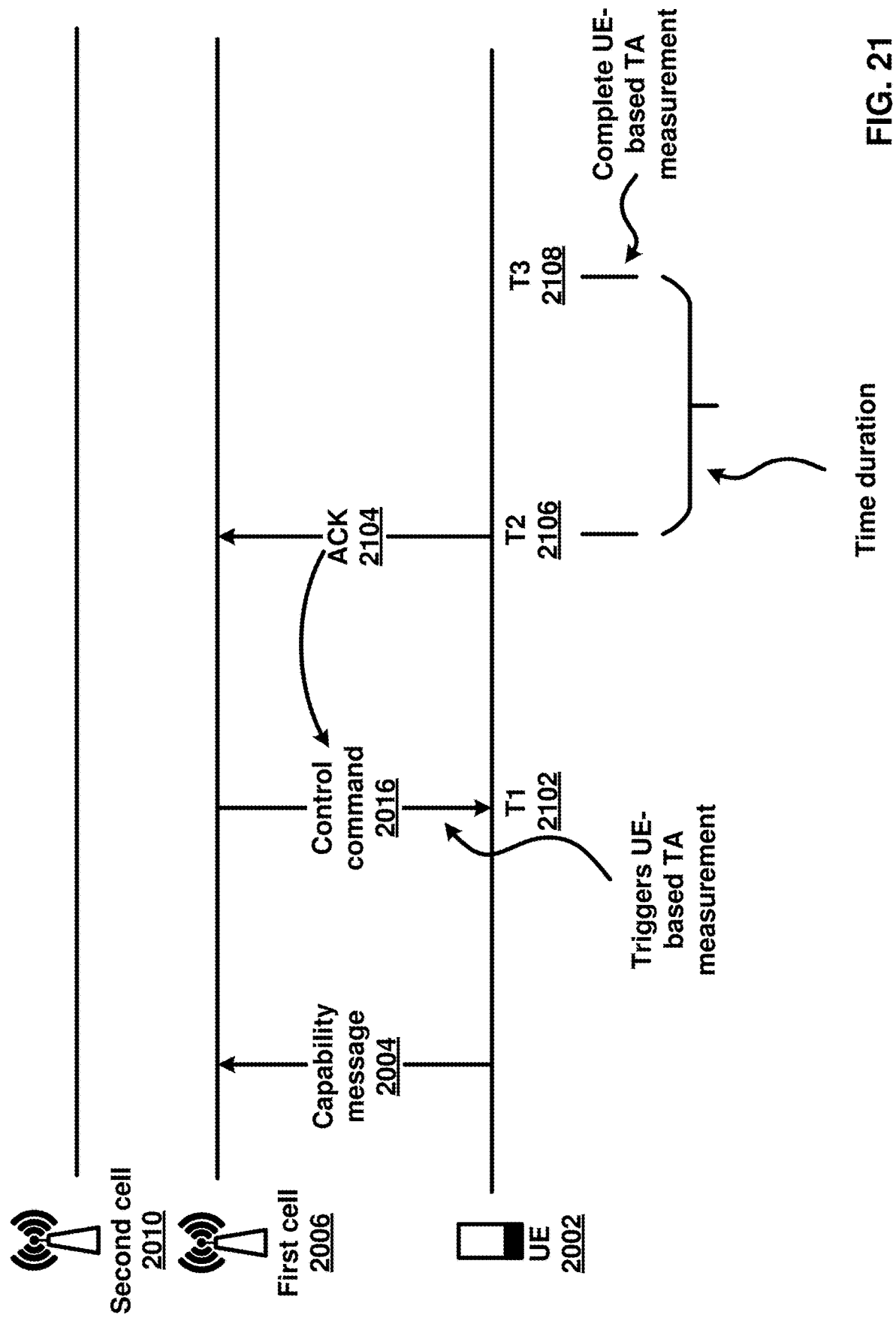
FIG. 21 shows an example timing diagram of a time duration as per an aspect of an embodiment of the present disclosure.

FIG. 21 shows an example timing diagram of a time duration as per an aspect of an embodiment of the present disclosure. In the example of FIG. 21, the wireless device receives the control command 2016 at/in/during a first time interval (e.g., T1 2102). The wireless device may transmit an acknowledgment (ACK) 2104 for/of the control command 2016. The ACK 2104 may, for example, be/comprise a positive acknowledgment for/of the control command 2016. The positive acknowledgment may indicate, for example, that the control command 2016 was received/decoded successfully/correctly/accurately. The ACK 2104 may, for example, be/comprise a negative acknowledgment for/of the control command 2016. The negative acknowledgment may indicate, for example, that the control command 2016 was not received/decoded successfully/correctly/accurately (e.g., was received/decoded unsuccessfully/incorrectly/inaccurately).

The wireless device may transmit the ACK 2104 via the first cell 2006. The wireless device may transmit the ACK to the first base station. The wireless device may transmit the ACK 2104 via the second cell 2010. The wireless device may transmit the ACK to the second base station.

The wireless device may transmit the ACK 2104 at/in a second time interval (e.g., T2 2106). The wireless device may begin/start the UE-based TA measurement procedure, for example, at/after transmitting the ACK 2104 at/during/in the second time interval (e.g., T2 2106). In the example of FIG. 21, a starting time of the time duration may be the second time interval (e.g., T2 2106). The time duration may end at a third time interval/instance (e.g., T3 2108). The wireless device may complete the UE-based TA measurement procedure, for example, at the third time interval/instance (e.g., T3 2108). In the example of FIG. 21, the time duration may be, for example, substantially equal to T3 2108-T2 2106.

Figure 22:
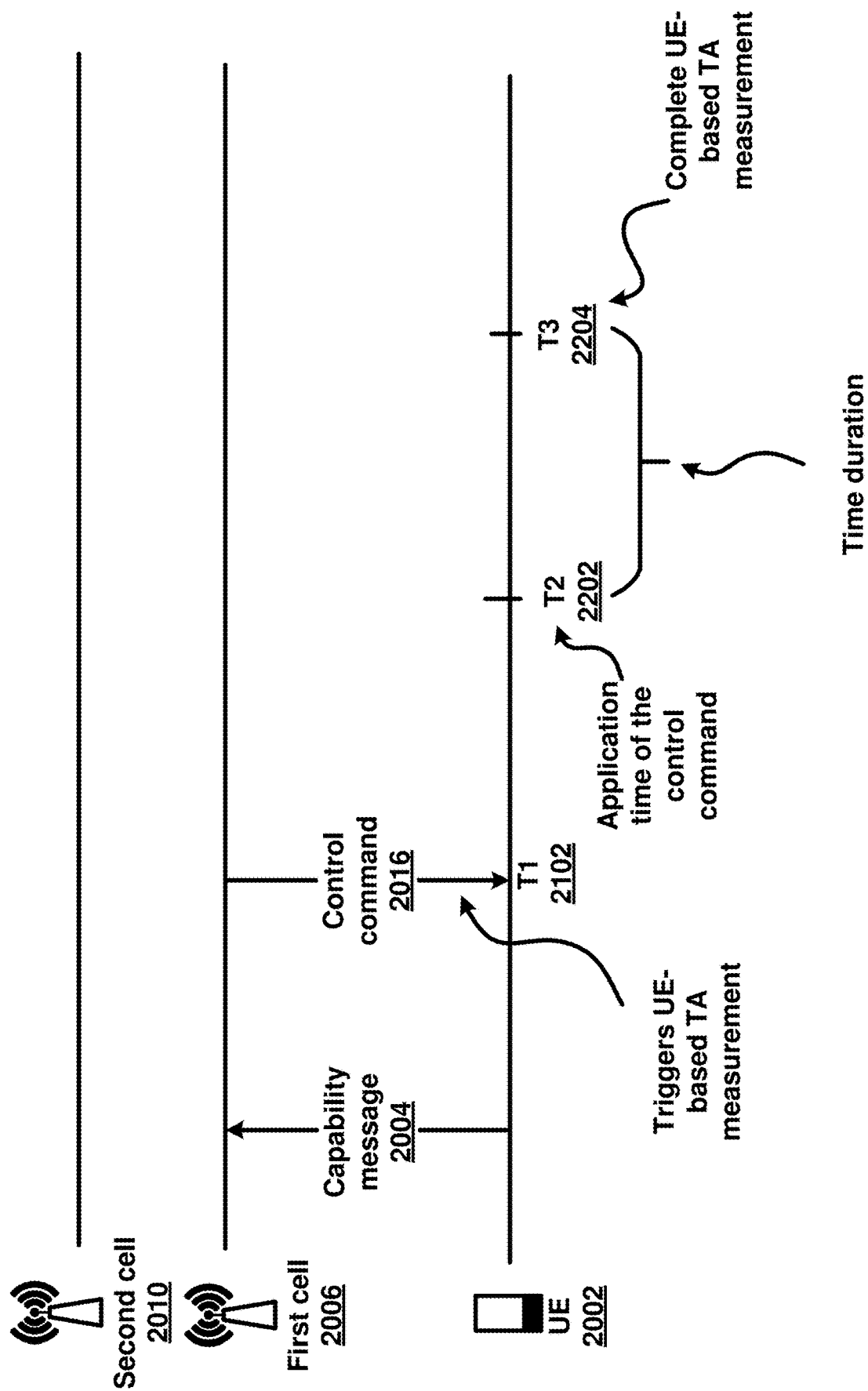
FIG. 22 shows an example timing diagram of a time duration as per an aspect of an embodiment of the present disclosure.

FIG. 22 shows an example timing diagram of a time duration as per an aspect of an embodiment of the present disclosure. In the example of FIG. 22, the wireless device receives the control command 2016 at/in/during a first time interval (e.g., T1 2102). The wireless device may apply the control command 2016 at a second time instance/interval (e.g., T2 2202). The second time instance/interval (e.g., T2 2202) may be an application time (e.g., beam application time, MAC CE application time, and the like) of the control command 2016. In the example of FIG. 22, the time duration may start/begin from the second time instance/interval (e.g., T2 2202). The wireless device may start/begin the UE-based TA measurement procedure, for example, at/from/during/in the second time instance/interval (e.g., T2 2202). In the example of FIG. 22, the time duration may end at a third time instance/interval (e.g., T3 2204). The wireless device may complete the UE-based TA measurement procedure at the third time instance/interval (e.g., T3 2204). In the example of FIG. 21, the time duration may be, for example, substantially equal to T3 2204-T2 2202.

Figure 23:
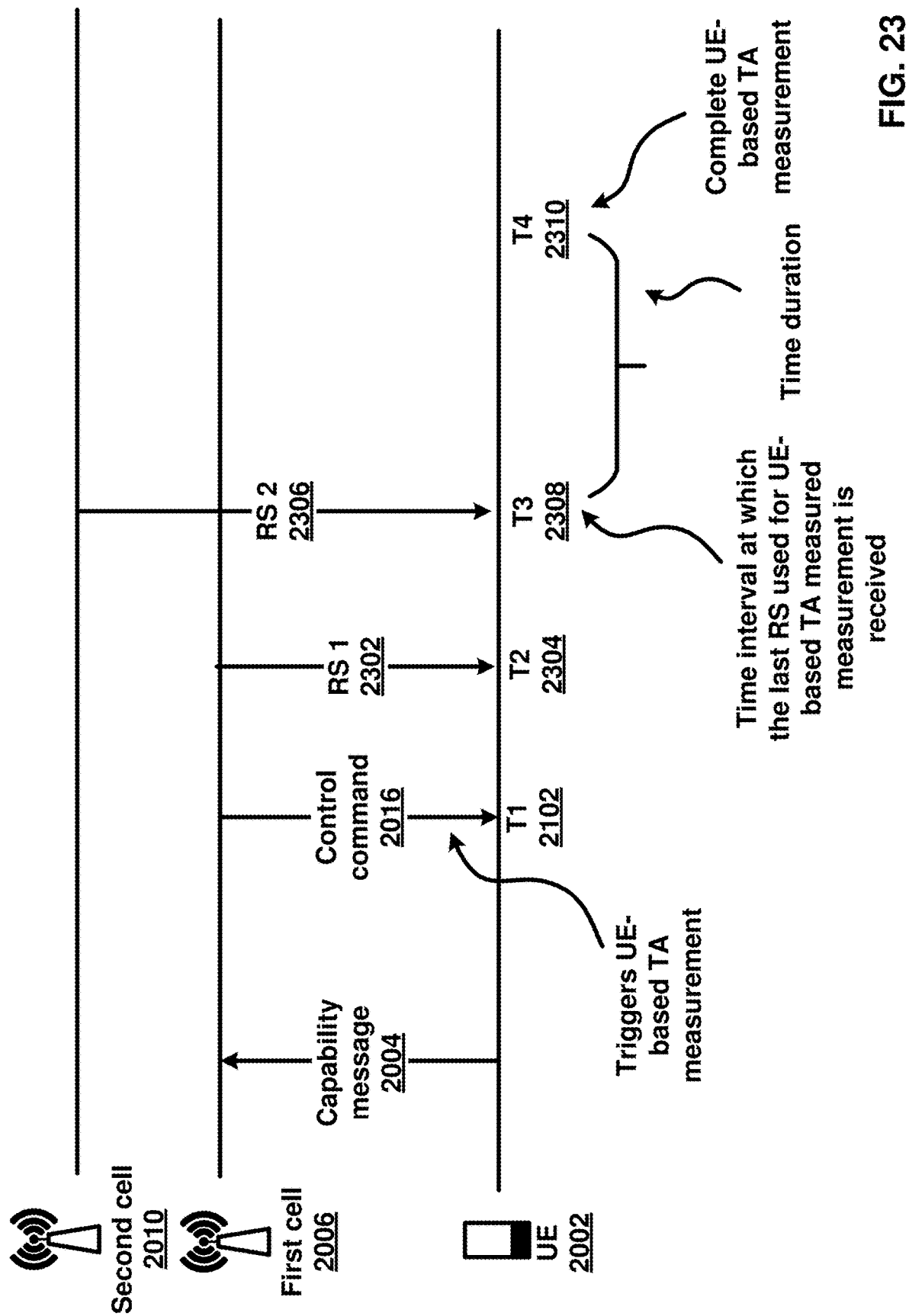
FIG. 23 shows an example timing diagram of a time duration as per an aspect of an embodiment of the present disclosure.

FIG. 23 shows an example timing diagram of a time duration as per an aspect of an embodiment of the present disclosure. In the example of FIG. 23, the wireless device receives the control command 2016 at/in/during a first time interval (e.g., T1 2102). The wireless device may receive a first RS (e.g., RS 1 2302) via/from/on/associated with the first cell 2006. The wireless device may receive the first RS (e.g., RS 1 2302) at/during/in a second time interval (e.g., T2 2304). The wireless device may use the first RS for the UE-based TA measurement procedure. The wireless device may receive a second RS (e.g., RS 2 2306) via/from/on/ associated with the second cell 2010. The wireless device may receive the second RS (e.g., RS 2 2306) at/during/in a third time interval (e.g., T3 2308). The wireless device may use the second RS (e.g., RS 2 2306) for the UE-based TA measurement procedure. In an example, the second RS (e.g., RS 2 2306) may be a last RS that the wireless device uses for the UE-based TA measurement procedure. The third time interval (e.g., T3 2308) may be the last time (instance/ interval) at/during/in which the wireless device receives an RS for the UE-based TA measurement procedure. In the example of FIG. 21, the time duration may start at the third time instance/interval (e.g., T3 2208). The time duration may end at a fourth time interval/instance (e.g., T4 2310). The time duration may be, for example, T4 2310-T3 2308. The wireless device may complete the UE-based TA measurement procedure, for example, at/around/during/before/ by the fourth time interval/instance (e.g., T4 2310).

In an example, the time duration may be based on (e.g., a multiple of a periodicity of, a factor of the periodicity of, a scaling of the periodicity of) one or more first RSs (e.g., RS 1) associated with/from/of/via the source/serving cell (e.g., the first cell 2006) and/or one or more second RSs (e.g., RS 2) associated with/from/of/via the candidate/target cell (e.g., the second cell 2010).

In the example of FIG. 20, the time duration may start/ begin at T4 2014. The time duration may end/complete/ finish at T5 2012. In the example of FIG. 20, the time duration may be T5 2012-T4 2014.

In the example of FIG. 20, the first base station may transmit a first message to a second base station. The second base station may be of/for/serving the second cell 2010. In an example, the second base station may be the same as the first base station. In another example, the second base station may be different from the first base station. In an example, the first base station may be a first gNB-DU, a first gNB-CU, a first gNB, a first satellite, and the like. In an example, the second base station may be a second gNB-DU, a second gNB-CU, a second gNB, a second satellite, and the like.

The first message may, for example, comprise a capability message 2028. In an example, the capability message 2028 may be the same as the capability message 2004. In an example, the capability message 2028 may comprise the capability message 2004. The capability message 2028 may be/comprise, for example, a UE_CONTEXT message (e.g., UE context request message, UE context retrieval message, and the like).

The second base station may transmit, to the wireless device, a DCI 2026. The second base station may transmit the DCI 2026 via the second cell 2010. The DCI 2026 may be, for example, the same as the DCI 1906. The wireless device receives the DCI 2026. The wireless device may receive the DCI 2026 via the second cell. The wireless device may receive the DCI 2026 from the second base station. The wireless device may receive the DCI 2026 at/during/in a second time interval/instance (e.g., T2 2020).

The DCI 2026 may indicate/initiate/schedule/trigger an uplink transmission 2024. The uplink transmission 2024 may be, for example, the same as the uplink transmission 1908. The uplink transmission 2024 may be, for example, the same as the LTM completion 1724. In an example, the LTM completion 1724 may comprise the uplink transmission 2024.

In an example, the uplink transmission 2024 may be/comprise a PUSCH transmission. In an example, the uplink transmission 2024 may be/comprise a PUCCH transmission. In an example, the uplink transmission 2024 may be/comprise an SRS transmission. In an example, the uplink transmission 2024 may be/comprise a PRS transmission. In an example, the uplink transmission 2024 may be/comprise a Msg5 transmission. In an example, the uplink transmission 2024 may be/comprise an RRC reconfiguration complete message. In an example, the uplink transmission 2024 may be/comprise DM-RS transmission. In an example, the uplink transmission 2024 may be/comprise an RRC message (e.g., RRC complete message, RRC reconfiguration complete message, RRC setup complete message, RRC failure message, and/or the like). In an example, the uplink transmission 2024 may be the first (e.g., first in time) uplink transmission to/via the second cell 2010 (or to/via a candidate/target cell of the one or more candidate/target cells) after receiving the control command 2016.

In an example, the DCI 2026 may be referred to as a dynamic grant.

In an example (not shown in FIG. 20), the wireless device may not receive the DCI 2026 (e.g., the second base station may not transmit the DCI 2026). The uplink transmission 2024 may be scheduled/indicated/initiated by a configured grant. For example, the one or more candidate/target (LTM cell) configurations/configuration parameters and/or the first candidate/target (LTM cell) configuration/configuration parameters may comprise the configured grant. The configured grant may schedule/indicate the uplink transmission 2024. The configured grant may, for example, indicate/ provide (e.g., time, frequency, and/or beam-related) resources for the uplink transmission 2024 to the wireless device.

The second base station may, for example, ensure that the uplink transmission 2024 is after the end of the time duration (e.g., after T5 2012). The second base station and/or the first base station may schedule/indicate/initiate/trigger the uplink transmission 2024 to be after the end of the time duration (e.g., after T5 2012), for example, based on the wireless device indicating the time duration in the capability message 2004. For example, the wireless device may not expect to be scheduled/indicated an uplink transmission (e.g., the uplink transmission 2024) at least until/after T3 2022 (or at least until/after T5 2012 or at least until after (the end of) the time duration).

In the example of FIG. 20, the time duration may start/ begin at T4 2014. The wireless device may start/begin the UE-based TA measurement procedure at T4 2014. In an example, the control command 2016 (and/or the one or more configuration parameters/the one or more candidate/target (LTM cell) configurations/the first candidate/target (LTM cell) configuration) may indicate T4 2014. For example, the control command may comprise a field indicating (e.g., explicitly) T4 2014. In another example, the first base station may indicate (e.g., implicitly) T4 2014 based on an offset from receiving the control command 2016 (e.g., at T1 2018). For example, the one or more configuration parameters may indicate the offset. For example, the offset may be preconfigured. For example, the offset may be based on the capability message 2004. For example, the wireless device may indicate the offset via the capability message 2004. In an example, T4 2014 may be/start/begin at T1 2018+the offset.

In an example, the control command 2016 (and/or the one or more configuration parameters/the one or more candidate/target (LTM cell) configurations/the first candidate/target (LTM cell) configuration) may indicate a first time duration for the UE-based TA measurement procedure. For example, the first time duration may be equal to or greater/longer/larger than the time duration (indicated in/via the capability message 2004). The wireless device may perform the UE-based TA measurement procedure during/in/while/when the first time duration. In an example, the first time duration may start at/in/during T4 2014.

In an example, if a first symbol (e.g., uplink symbol) in the uplink transmission 2024 (e.g., scheduled/indicated/defined by slot offsets K2 and/or K_offset, if configured) and a start S and length L of the uplink transmission 2024 (or transmission allocation) indicated by 'Time domain resource assignment' of the DCI 2026 and including effect(s) of TA (e.g., determined by the UE-based TA measurement procedure), is no earlier (e.g., later or at) than at symbol L2, wherein L2 is defined as a next uplink symbol with a cyclic prefix of the next uplink symbol starting T_proc,2=max ((N2+d_2,1+d2) (2048+144)·k2^-mu T_c+T_ext+T_switch+the time duration, d_2,2) after the end of a reception of a last symbol of the PDCCH carrying the DCI 2026, then the wireless device may transmit the uplink transmission 2024. When the PDCCH reception comprises two PDCCH candidates from two respective search space sets, for the purpose of determining the last symbol of the PDCCH carrying the DCI 2026 scheduling the uplink transmission 2024, the PDCCH candidate that ends later in time may be used by the wireless device. N2 may be based on μ for a UE processing capability 1 and 2 respectively, where u corresponds to the one of ($\mu_{DL}$, $\mu_{UL}$) resulting with the largest T_proc,2, where the $\mu_{DL}$ corresponds to a subcarrier spacing of a downlink with which the PDCCH carrying the DCI 2026 scheduling the uplink transmission 2024 was transmitted and $\mu_{UL}$ corresponds to a subcarrier spacing of the uplink channel with which the uplink transmission 2024 is to be transmitted. For operations other than an operation with shared spectrum channel access in FR1, T_ext=0. If the first symbol of the PUSCH allocation (e.g., for the uplink transmission 2024) consists of DM-RS only, then d_2,1=0, otherwise d_2,1=1. If the wireless device is configured with multiple active component carriers, the first uplink symbol in the PUSCH allocation (e.g., for the uplink transmission 2024) may further include an effect of timing difference between component carriers. If the DCI 2026 triggered a switch of BWP, d_2,2 may be substantially equal to a BWP switching time, otherwise d_2,2=0. If a PUSCH (e.g., the uplink transmission 2024) of a larger priority index would overlap with PUCCH of a smaller priority index and the wireless device is not provided uci-Mux WithDiffPrio for the primary PUCCH group or uci-MuxWithDiffPrioSecondaryPUCCHgroup for the secondary PUCCH group, d2 for the PUSCH (e.g., the uplink transmission 2024) of a larger priority is set as reported by the wireless device; otherwise d2=0. For a wireless device that supports capability 2 on a given cell, a processing time according to a wireless device capability 2 may be applied if the high layer parameter processingType2Enabled in PUSCH-ServingCellConfig is configured for second cell 2010 and set to 'enable'. If the uplink transmission 2024 indicated by the DCI 2026 is overlapping with one or more PUCCH channels, then a transport block (e.g., of the uplink transmission 2024) may be multiplexed, otherwise the transport block may be transmitted on the PUSCH (e.g., the uplink transmission 2024) indicated by the DCI 2026. If uplink switching gap is triggered, T_switch may be substantially equal to a switching gap duration and for the wireless device configured with higher layer parameter uplinkTxSwitchingOption set to 'dualUL' for uplink carrier aggregation u UL=min ($\mu_{UL,carrier1}$, $\mu_{UL,carrier2}$), otherwise T_switch=0.

In an example, a first uplink symbol in a PUSCH allocation for a transport block (e.g., the uplink transmission 2024), e.g., as defined by the slot offset K2 and Koffset, if configured, and the start S and length L of the PUSCH allocation indicated by 'Time domain resource assignment' of the scheduling DCI and including the effect of the timing advance, is earlier than at symbol L2, where L2 is defined as the next uplink symbol with its CP starting T_proc,2=max ((N2+d_2,1+d2) (2048+144)·k2^-mu T_c+T_ext+T_switch+the time duration, d_2,2) after the end of the reception of the last symbol of the PDCCH carrying the DCI 2026 scheduling the uplink transmission 2024, then the wireless device may ignore the DCI 2026. Ignoring the DCI 2026 may comprise, for example, not transmitting the uplink transmission 2024. Ignoring the DCI 2026 may comprise, for example, not receiving, not storing, and/or not processing the DCI 2026.

In the existing technologies, an offset between the ACK 2104 and a PRACH transmission may be based on a capability of the wireless device. This may indicate a processing time between receiving a DCI (e.g., PDCCH) order. However, this offset may be different from the time duration (e.g., as shown in FIG. 20). The uplink transmission 2024 may not be a PRACH transmission. PRACH transmission and the uplink transmission 2024 may be transmitted on different channels. For example, the uplink transmission 2024 may be transmitted via PUSCH and/or PUCCH. A PRACH transmission is transmitted via PRACH. The offset between the ACK 2104 and the PRACH transmission may indicate a time required by the wireless device to process information (e.g., process the DCI that schedules the PRACH transmission and/or process the control command 2016). On the other hand, the time duration (e.g., as shown in FIG. 20) may indicate a time required by the wireless device to complete the UE-based TA measurement procedure (and/or the early sync 1716).

In some embodiments, the time duration may comprise the time required by the wireless device to process information (e.g., process the DCI that schedules the PRACH transmission and/or process the control command 2016).

In some embodiments, the time duration may not comprise the time required by the wireless device to process information (e.g., process the DCI that schedules the PRACH transmission and/or process the control command 2016).

In an example, a first base station may be serving the first cell 2006. The wireless device may transmit the capability message 2004 via the first cell 2006. The wireless device may transmit the capability message 2004 to the first base station.

In an example, the capability message 2004 may comprise a second field. The second field may indicate/comprise a time duration (e.g., Time duration shown in FIG. 20).

The time duration may be or indicate, for example, a time (e.g., time gap) required or used by the wireless device to complete a UE-based TA measurement procedure, e.g., after receiving a control command triggering or initiating the UE-based TA measurement procedure. In an example, the early sync 1716 may comprise the UE-based TA measurement procedure.

LTM may be performed by the wireless device by repeating or performing early synchronization (e.g., Early sync 1716).

The one or more candidate/target (LTM cell) configurations may be/comprise/be comprised in one or more RRCReconfiguration (parameters/messages). The wireless device may receive, from the base station (e.g., via a source or serving cell), a respective candidate/target (LTM cell) configuration, of the one or more candidate/target (LTM cell) configurations (e.g., Config. of candidate cells 1714), for each candidate/target cell of the one or more candidate/target cells.

For example, the one or more candidate/target (LTM cell) configurations/configuration parameters and/or the first candidate/target (LTM cell) configuration/configuration parameters may comprise the configured grant. The configured grant may schedule or indicate the uplink transmission 2024. The configured grant may, for example, indicate or provide (e.g., time, frequency, and/or beam-related) resources for the uplink transmission 2024 to the wireless device. In an example, the uplink transmission 2024 may be the first (e.g., first in time, initial) uplink transmission via the second cell 2010 (or via a candidate/target cell of the one or more candidate/target cells) after receiving the control command 2016.

In an example, the wireless device receives a control command 2016 (e.g., at T1 2018). In an example, the control command 2016 may be/comprise the control command 1718. The control command 1718 may be, for example, an LTM cell switch command MAC CE. The control command 2016 may indicate a cell switch (e.g., a PCell switch) from the first cell 2006 to the second cell 2010 based on the index of the candidate/target (LTM cell) configuration indicating the first candidate/target (LTM cell) configuration and/or the second cell 2010. The second cell 2010 may be, for example, a candidate/target cell (e.g., Cell B 1712), of the one or more candidate/target cells, for an LTM procedure.

The control command 2016 may comprise a field indicating (e.g., explicitly) T4 2014. In another example, the first base station may indicate (e.g., implicitly) T4 2014 based on an offset from receiving the control command 2016 (e.g., at T1 2018). For example, the one or more configuration parameters may indicate the offset. For example, the offset may be preconfigured. For example, the offset may be based on the capability message 2004. For example, the wireless device may indicate the offset via the capability message 2004. In an example, T4 2014 may be/start/begin at T1 2018+the offset.

The second base station may, for example, ensure that the uplink transmission 2024 is after the end of the time duration (e.g., after T5 2012). The uplink transmission 2024 may be after the end of the time duration (e.g., after T5 2012). In the example of FIG. 20, the time duration may start/begin at T4 2014. The time duration may end/complete/finish at T5 2012. In an example, the uplink transmission 2024 may be the first (e.g., first in time or initial) uplink transmission to/via the second cell 2010 (or to/via a candidate/target cell of the one or more candidate/target cells) after receiving the control command 2016. The configured grant may, for example, indicate or provide (e.g., time, frequency, and/or beam-related) resources for the uplink transmission 2024 to the wireless device.

Figure 24:
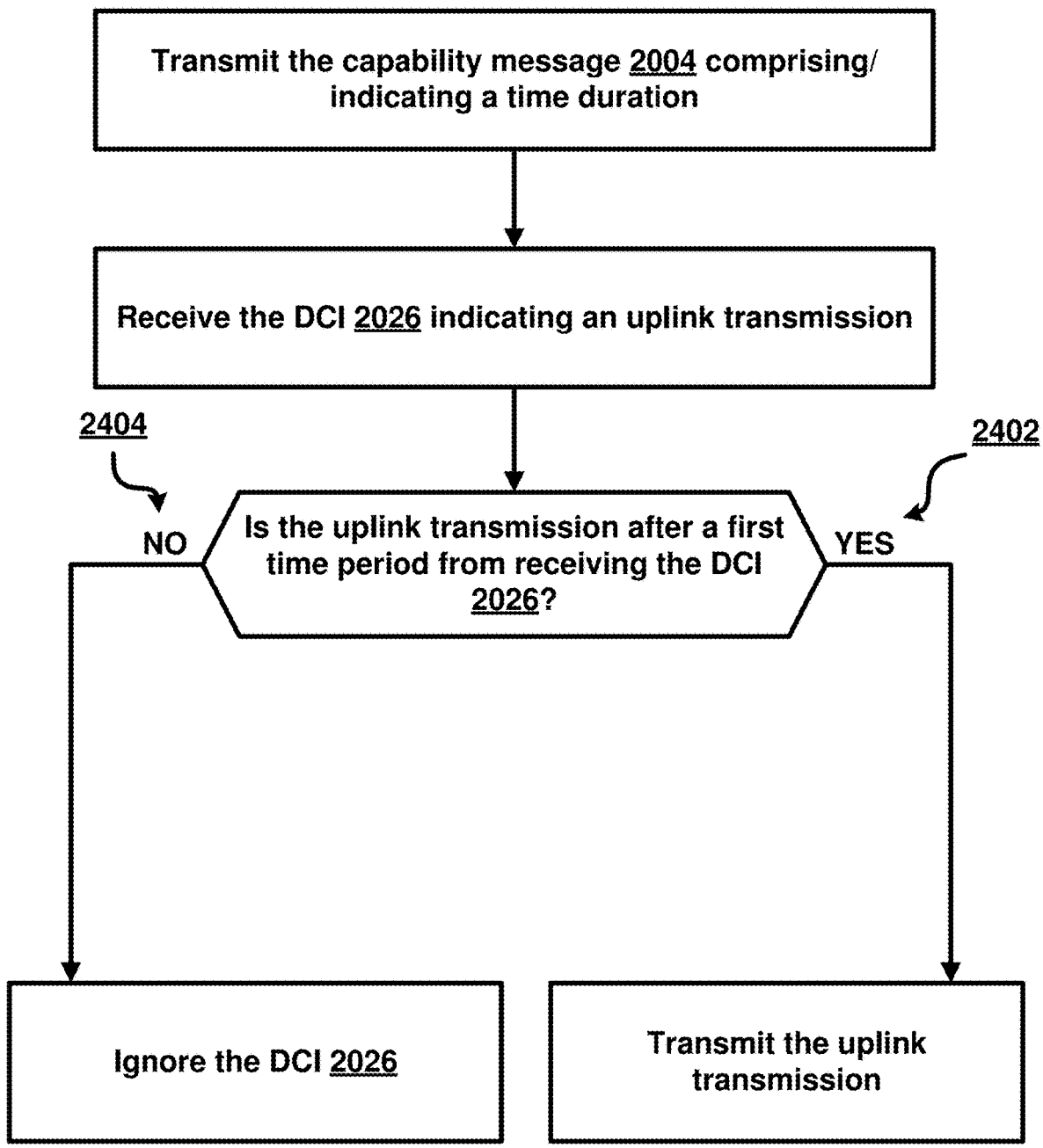
FIG. 24 shows an example flow diagram as per an aspect of an embodiment of the present disclosure.

FIG. 24 shows an example flow diagram as per an aspect of an embodiment of the present disclosure. In the example of FIG. 24, a wireless device (e.g., the UE 2002) may transmit the capability message 2004. The capability message 2004 may indicate/comprise the time duration. The wireless device may receive the DCI 2026. The DCI 2026 may indicate/schedule/trigger/initiate an uplink transmission (e.g., the uplink transmission 2024). The wireless device may determine whether to perform/transmit the uplink transmission or ignore the DCI 2026, for example, based on a time (e.g., a time interval/interval/duration/period) of transmission of the uplink transmission.

In an example, the time of transmission of the uplink transmission may be at/on/after a first time period after receiving the DCI 2026 (e.g., 2402). The wireless device may (determine to) transmit/perform the uplink transmission based on the time of transmission of the uplink transmission being at/on/after the first time period after receiving the DCI 2026.

In another example, the time of transmission of the uplink transmission may be at/before/within a first time period after receiving the DCI 2026 (e.g., 2404). The wireless device may (determine to) ignore the DCI 2026 based on the time of transmission of the uplink transmission being at/before/within the first time period after receiving the DCI 2026.

In an example, the first time period may comprise the time duration. For example, the first time period may be substantially equal to the time duration plus a first offset. In an example, the first time period may be substantially equal to T_proc,2, wherein T_proc,2=max ((N2+d_2,1+d2) (2048+144)·k2^−mu T_c+T_ext+T_switch+the time duration, d_2, 2). In an example, the first time period may be substantially equal to the time duration.

In an example, the time duration may be/comprise a time window. In an example, the time duration may be/comprise a time period. In an example, the time duration may be/comprise a time interval.

In an example, the time duration may be/comprise a measurement gap. In an example, the measurement gap may comprise the time duration. For example, the measurement gap may be substantially equal to the time duration+first offset. The first offset may indicate/comprise a time period/duration/interval associated with performing measurements other than the UE-based TA measurement procedure (e.g., FR2 measurement gap, measurement gap for beam sweeping, measurement gap for beam correspondence without beam sweeping, and the like).

In an example, the wireless device may indicate the time duration (e.g., via the capability message 2004) in units of slots, symbols, seconds, milli seconds, microseconds, OFDM symbols, subframes, measurement gap, an integer/number, and the like.

In an example, the wireless device may indicate the time duration (e.g., via the capability message 2004) as a multiple of a periodicity of an RS (e.g., SSB, CSI-RS, and the like). The wireless device may determine the periodicity of the RS, for example, based on SMTC. The RS may, for example, be associated with/via/of/on/from a candidate/target cell (e.g., the second cell 2010, the second cell 1812, Cell B 1712, and the like) of the one or more candidate/target cells.

In an example, the wireless device may indicate the time duration (e.g., via the capability message 2004) per band/band combination (BC)/BWP. For example, capability message may comprise/indicate at least two time duration values. The at least two time duration values may be associated with/for at least two bands/BCs/BWPs. For example, the at least two time duration values may comprise a first time duration value. The at least two time durations may comprise a second time duration value. The at least two bands/BCs/BWPs may comprise a first band/BC/BWP. The at least two bands/BCs/BWPs may comprise a second band/BC/BWP. The capability message 2004 may comprise/indicate the first time duration value for/per/associated with the first band/BC/BWP. The capability message 2004 may comprise/indicate the second time duration value for/per/associated with the second band/BC/BWP. The time duration may, for example, comprise the at least two time duration values/periods.

In an example, (a value of) the time duration (e.g., indicated/comprised in the capability message 2004) may be different for TDD and FDD operation. In an example, a value of the time duration may be a first value (e.g., 10, 20, 40, and the like). The first value may be associated with TDD (e.g., a TDD operation in the first cell 2006 and/or the second cell 2010). In an example, the value of the time duration may be a second value (e.g., 10, 20, 40, and the like). The second value may be associated with FDD (e.g., a FDD operation in the first cell 2006 and/or the second cell 2010).

In an example, (the value of) the time duration (e.g., indicated/comprised in the capability message 2004) may be for/per/different for/dependent on frequency range (e.g., FR1, FR2, FR3, and the like). In an example, the value of the time duration may be a first value (e.g., 10, 20, 40, and the like). The first value may be associated with FR1 (e.g., in the first cell 2006 and/or the second cell 2010). In an example, the value of the time duration may be a second value (e.g., 10, 20, 40, and the like). The second value may be associated with FR2 (e.g., in the first cell 2006 and/or the second cell 2010).

In an example, the capability message 2004 may comprise a first field. The first field may indicate to the base station whether the wireless device supports (e.g., can support, is capable of, capable of supporting, requests, requesting, capable of requesting, and the like) a UE-based TA measurement procedure. In an example, the capability message 2004 may comprise a second field. The second field may indicate/comprise the time duration.

In an example, the capability message 2004 may comprise the second field based on whether the capability message 2004 comprises the first field. For example, the capability message 2004 may comprise the first field. The capability message 2004 may comprise the second field, for example, based on the capability message comprising the first field. In another example, the capability message 2004 may not comprise the first field. The capability message 2004 may not comprise the second field, for example, based on the capability message 2004 not comprising the first field. In another example, the capability message 2004 may comprise the first field. The first field may indicate that the wireless device does not support (e.g., cannot support, not capable of, not capable of supporting, does not request, not capable of requesting, and the like) a UE-based TA measurement procedure. The capability message 2004 may not comprise the second field, for example, based on the first field indicating that the wireless device does not support (e.g., cannot support, not capable of, not capable of supporting, does not request, not capable of requesting, and the like) a UE-based TA measurement procedure.

Based on the capability message 2004 not including/comprising the second field when the capability message 2004 does not comprise the first field (or when the first field indicates that the wireless device does not support (e.g., cannot support, not capable of, not capable of supporting, does not request, not capable of requesting, and the like) a UE-based TA measurement procedure), signaling overhead may be reduced. For example, the capability message 2004 not comprising the first field may indicate that the wireless device does not support (e.g., cannot support, not capable of, not capable of supporting, does not request, not capable of requesting, and the like) a UE-based TA measurement procedure. When the wireless device does not support (e.g., cannot support, not capable of, not capable of supporting, does not request, not capable of requesting, and the like) a UE-based TA measurement procedure, indicating the time duration may be unnecessary (e.g., since the time duration is associated with a UE-based TA measurement procedure).

Although the present disclosure uses the term UE-based TA measurement procedure, a UE-based TA measurement procedure may refer to: a UE-based TA acquisition, UE-based TA determination, UE-based TA correction, UE-based TA update, autonomous/self (UE) TA measurement/determination/update/acquisition, and/or the like.

In the example of FIG. 20, the first cell 2006 may be a primary cell (PCell) of the wireless device (e.g., UE 2002). For example, the first cell 2006 may be the PCell of/for the wireless device, for example, prior to receiving the control command 2016. In an example, the control command 2016 may switch/change the PCell from the first cell 2006 to the second cell 2010 (e.g., via/as part of the LTM procedure). In an example, the second cell 2010 may be a non-serving cell of/for the wireless device prior to/before receiving the control command 2016 (e.g., prior to/before T1 2018). The second cell 2010 may be serving cell/PCell of/for the wireless device after receiving the control command 2016 (e.g., after T1 2018). The control command 2016 may indicate (or may switch/change) the PCell to/as the second cell 2010 from the first cell 2006.

In an example, a PCell may be referred to as a Special Cell (SpCell), e.g., in case of dual connectivity (e.g., MR-DC, EN-DC, NE-DC, and the like).

In an example, the wireless device may not expect to receive a DCI (e.g., DCI 2026) that schedules/indicates an uplink transmission within the time duration (e.g., before an end of the time duration). In an example, the time duration may start after receiving the control command 2016 (e.g., after T1 2018). In an example, the time duration may start at/after transmitting an ACK (e.g., the ACK 2104) to/for/associated with the control command 2016 (e.g., at/after T2 2106). In an example, the time duration may start at/after an application time of/for the control command 2016 (e.g., at/after T2 2202). In an example, the time duration may start at/after receiving an RS associated with/of/from/for/on/via the second cell 2010 (e.g., at/after T3 2308). In an example, the time duration may start at/after receiving a last/first/latest RS (e.g., RS 2 1822, RS 1 1818, RS 1 2302, RS 2 2306, and the like) that is used for the UE-based TA measurement procedure.

In an example, the wireless device may start/begin the UE-based TA measurement procedure when/at/after the time duration starts/begins. The wireless device may complete/finish/end/stop the UE-based TA measurement procedure, for example, when/at/after/before the time duration ends/finishes/stops.

In an example, the wireless device may determine a TA (value) during/using/with/based on the UE-based TA measurement procedure. The TA (value) may be for/associated with the second cell 2010. For example, the TA (value) may be for/associated with a TAG. The TAG may comprise the second cell 2010. The wireless device may perform/transmit the uplink transmission 2024 (e.g., via the second cell 2010) using/based on/with the TA (value).

For example, the TA (value) may be N_TA. The wireless device may determine T_TA=N_TA+N_TA,offset. The one or more configuration parameters may, for example, indicate the N_TA,offset. For example, the first candidate/target (LTM cell) configuration, of the one or more candidate/target (LTM cell) configurations, that is associated with the second cell 2010, may indicate the N_TA,offset for/of/associated with the second cell 2010.

In an example, the wireless device may transmit the capability message 2004 over/on/via a PUSCH. In an example, the wireless device may transmit the capability message 2004 over/on/via/a PUCCH.

In an example, the second cell 2010 may be different from the first cell 2006.

In another example, the second cell 2010 may be the same as the first cell 2006.

In an example, a first TAG may comprise the first cell 2006. A second TAG may comprise the second cell 2010. In an example, the first TAG may be the same as the second TAG. In another example, the first TAG may be different from the second TAG.

In an example, the early sync 1716 may comprise the UE-based TA measurement procedure.

In an example, the wireless device may use/apply the TA/TA value (e.g., the second TA/TA value) determined using/during/with/based on the UE-based TA measurement procedure (e.g., during the time duration) for the uplink transmission 2024. For example, the wireless device may perform/transmit the uplink transmission 2024 using/based on the TA value/TA (e.g., of/for/associated with the second cell 2010, or a TAG/second TAG comprising the second cell 2010, or a candidate/target cell).

In an example, the capability message 2004 and/or the time duration may comprise/indicate at least two time duration values. The at least two time durations may comprise a first time duration value and a second time duration value. The first time duration value may be/correspond to a lower bound/minimum period of time required/needed/used by the wireless device for the UE-based TA measurement procedure (e.g., the first time duration value may be a minimum value of the time duration). The second time duration value may be/correspond to an upper bound/maximum period of time required/needed/used by the wireless device for the UE-based TA measurement procedure (e.g., the second time duration value may be a maximum value of the time duration). The second/first base station may select/determine/choose a time duration value, of the at least two time duration value, for scheduling/indicating the uplink transmission 2024 via the DCI 2026.

For example, the second base station may use/select/determine/choose the first time duration value to schedule/indicate the uplink transmission 2024 (e.g., based on the first time duration, or after the first time duration value from receiving the DCI 2026 or RS 2 2306, and the like) via/by the DCI 2026 based on a radio link quality (e.g., SNR, RSRP, RSRQ, power, channel attenuation, and the like) between the wireless device and the second base station being higher/greater/larger/better than a threshold (e.g., radio link quality threshold). For example, the second base station may use/select/determine/choose the second time duration value to schedule/indicate the uplink transmission 2024 (e.g., based on the second time duration, or after the second time duration value from receiving the DCI 2026 or RS 2 2306, and the like) via/by the DCI 2026 based on a radio link quality (e.g., SNR, RSRP, RSRQ, power, channel attenuation, and the like) between the wireless device and the second base station being lower/less/smaller/worse than the threshold (e.g., radio link quality threshold).

In an example, the time duration may be for/per cell (or LTM configuration). For example, a value of the time duration may be a first value for/associated with a third cell, e.g., of the one or more candidate/target cells. For example, the value of the time duration may be a second value for/associated with a fourth cell, e.g., of the one or more candidate/target cells. In an example, the first value may be different from the second value (e.g., based on the third cell being different from the fourth cell). In an example, the first value may be same as the second value (e.g., based on the third cell being same as the fourth cell)

In an example, the third cell and the first cell 2006 may be served by/associated with/correspond to the first base station. For example, the first base station may be/be for/serve the first cell 2006. For example, the first base station may be/be for/serve the third cell. The wireless device may set/determine/select/choose/use the first value of/for the time duration, for example, based on the first base station serving the first cell 2006 and the third cell (e.g., based on intra-DU LTM, intra-CU LTM, same base station serving the first cell 2006 and the third cell, and the like).

In an example, the fourth cell may be served by a third base station. For example, the first base station may be/be for/serve the first cell 2006. For example, the third base station may be/be for/serve the third cell. The wireless device may set/determine/select/choose/use the second value of/for the time duration, for example, based on the first base station serving the first cell 2006 and the third base station serving the fourth cell (e.g., based on inter-DU LTM, inter-CU LTM, different base stations serving the first cell 2006 and the fourth cell, and the like).

In an example, the wireless device may track/maintain the time duration with/using a timer. In the example of FIG. 20, the time duration may start/begin at T4 2014. The wireless device may start/restart/begin the timer at T4 2014. The wireless device may set/determine a value of the timer to be the time duration (or a value of the time duration). The timer may, for example, stop/expire/not run at/during/after the time duration (e.g., end of the time duration). In the example of FIG. 20, the timer may stop/expire/not run after/at T5 2012.

In the present disclosure, a cell switch (or switching a cell, changing cell, and the like) may refer to changing/switching a cell from a first cell to a second cell (e.g., from the first cell 2006 to the second cell 2010). A cell switch may refer to, for example, changing/switching a SpCell/PCell from a first cell to a second cell (e.g., changing/switching the first cell 2006 as the SpCell/PCell to the second cell 2010 as the SpCell/PCell). A cell switch may refer to, for example, changing/switching a non-serving cell to a serving cell. For example, the control command 2016 may indicate the cell switch. For example, the control command 2016 may change/switch the second cell 2010 from (being) a non-serving cell (before receiving the control command 2016) to a serving cell (after receiving the control command 2016).

The capability message 2004 may comprise parameters (e.g., the time duration) for which there is a possibility for the wireless device to signal different values. The base station (e.g., the first base station and/or the second base station) may respect the parameters when configuring the wireless device and when scheduling the wireless device (e.g., when the DCI 2026 schedules the uplink transmission 2024). The capability message 2004 may comprise/indicate the time duration (e.g., may comprise the second field indicating the time duration). The time duration may define a (maximum/minimum/average) time (interval/duration/window/period) required by/for the wireless device to measure/determine a TA value of a cell (e.g., a candidate/target cell for LTM, the second cell 1812, the second cell 2010, and the like) using a (valid) TA (e.g., the TA command 1806) of a serving cell (e.g., the first cell 2006, the first cell 1808, and the like). The time duration may be referred to, for example, as TAmeasurementTime-LTM, UEmeasureTATime, UEmeasureTATime-LTM, UE-TA-Time, UE-TA-Time-LTM, and/or the like. The time duration (or a value of the time duration) may be, for example, per band/BC/BWP (e.g., the value may be different for different bands/BCs/BWPs). The time duration (or a value of the time duration) may be, for example, per FDD or TDD (e.g., the value may be different for FDD and TDD). The time duration (or a value of the time duration) may be, for example, per FR (e.g., the value may be different for different FRs, e.g., FR1, FR2, FR3, and the like). The time duration (or a value of the time duration) may be, for example, per LTM configuration (e.g., the value may be different for intra-cell/TAG/DU/CU/base station LTM and inter-cell/TAG/DU/CU/base station LTM).

An example method comprising: transmitting, by a wireless device, a capability message indicating a time duration required by the wireless device to determine a TA value of a cell (e.g., the second cell 2010).

The above example method, wherein the cell is a candidate/target cell for an LTM procedure.

One or more of the above example methods, further comprising receiving an LTM cell switch command medium access control control element (MAC CE).

One or more of the above example methods, wherein the LTM cell switch command MAC CE indicates a cell switch to the cell as a serving cell.

One or more of the above example methods, further comprising determining, in the time duration, a first TA value for uplink transmissions via the serving cell (e.g., the second cell 2010).

One or more of the above example methods, further comprising receiving, via the serving cell and after the LTM cell switch command MAC CE, a downlink control information (e.g., the DCI 2026) indicating an uplink transmission (e.g., the uplink transmission 2024) via the serving cell.

One or more of the above example methods, wherein the uplink transmission is after the time duration from receiving the LTM cell switch command MAC CE.

One or more of the above example methods, further comprising, transmitting, via the serving cell, the uplink transmission using the first TA value.

One or more of the above example methods, wherein the time duration starts from an application time of the LTM cell switch command MAC CE.

One or more of the above example methods, wherein the application time comprises a time interval during which an acknowledgement or a negative acknowledgment is transmitted for the LTM cell switch command MAC CE.

One or more of the above example methods, wherein the capability message is transmitted via: a physical uplink shared channel; or a physical uplink control channel.

One or more of the above example methods, wherein the determining the first TA value is based on a second TA value of a first serving cell.

One or more of the above example methods, wherein the determining the first TA value is based on a first RS associated with a first serving cell.

One or more of the above example methods, wherein the determining the first TA value is based on a second RS associated with the first candidate cell.

One or more of the above example methods, wherein the determining the first TA value is based on adding a difference between a first reception time interval of the first RS and a second reception time interval of the second RS and the second TA value.

One or more of the above example methods, wherein the determining the first TA value further comprises adding a reference signal timing difference (RSTD) to the addition of the difference between the first reception time interval and the second reception time interval and the second TA value.

One or more of the above example methods, further comprising receiving one or more messages comprising one or more configuration parameters of one or more candidate cells for a layer 1 or layer 2 triggered mobility procedure.

One or more of the above example methods, the one or more messages are one or more radio resource control (RRC) reconfiguration messages.

One or more of the above example methods, wherein the one or more candidate cells comprise the cell.

One or more of the above example methods, wherein each configuration parameter, of the one or more configuration parameters, is for a respective cell of the one or more candidate cells.

One or more of the above example methods, wherein the one or more configuration parameters indicate one or more reference signal timing difference (RSTD) values.

One or more of the above example methods, wherein each RSTD value, of the one or more RSTD values, is associated with a respective candidate cell of the one or more candidate cells.

One or more of the above example methods, wherein the cell is at least one of: a serving cell; or a non-serving cell.

One or more of the above example methods, wherein the transmitting is via a second cell (e.g., the first cell 2006).

One or more of the above example methods, wherein the second cell is different from the cell.

One or more of the above example methods, wherein the second cell is a serving cell.

One or more of the above example methods, wherein the second cell is a source cell.

One or more of the above example methods, wherein: a first DU serves the cell; and a second DU serves the second cell.

One or more of the above example methods, wherein the first DU is same as the second DU.

One or more of the above example methods, wherein the first DI is different from the second DU.

One or more of the above example methods, wherein the cell is at least one of: a primary cell; a secondary cell; a primary secondary cell.

One or more of the above example methods, wherein the second cell is at least one of: a primary cell; a secondary cell; a primary secondary cell.

One or more of the above example methods, wherein the second cell is a primary cell before receiving the LTM cell switch command MAC CE.

One or more of the above example methods, wherein the second cell is a secondary cell after receiving the LTM cell switch command MAC CE (e.g., the control command 2016).

One or more of the above example methods, wherein the cell is a secondary cell (or a non-serving cell) before receiving the LTM cell switch command MAC CE.

One or more of the above example methods, wherein the cell is a primary cell after receiving the LTM cell switch command MAC CE.

An example method comprising: transmitting, by a wireless device, a capability message indicating a time duration required by the wireless device to determine a TA value of a candidate/target cell for an LTM procedure; receiving an LTM cell switch command MAC CE indicating a cell switch to a first candidate/target cell as a serving cell; determining, in the time duration, a first TA value for uplink transmissions via the serving cell; receiving, via the serving cell and after the LTM cell switch command MAC CE, a DCI indicating an uplink transmission via the serving cell, wherein the uplink transmission is after the time duration from receiving the LTM cell switch command MAC CE; and transmitting, via the serving cell, the uplink transmission using the first TA value.

An example method comprising: receiving, by a first base station, a capability message indicating a time duration required by a wireless device to determine a TA value of a cell.

An example method comprising: receiving, by a first base station, a capability message indicating a time duration required by a wireless device to determine a TA value of a candidate/target cell for an LTM procedure; transmitting, by the first base station and to the wireless device, an LTM cell switch command MAC CE indicating a cell switch to a first candidate/target cell as a serving cell; transmitting, by a second base station and after the LTM cell switch command MAC CE, a DCI indicating an uplink transmission via the serving cell, wherein the uplink transmission is after the time duration from transmitting the LTM cell switch command MAC CE; and receiving, by the second base station and via the serving cell, the uplink transmission using the first TA value.

Figure 25:
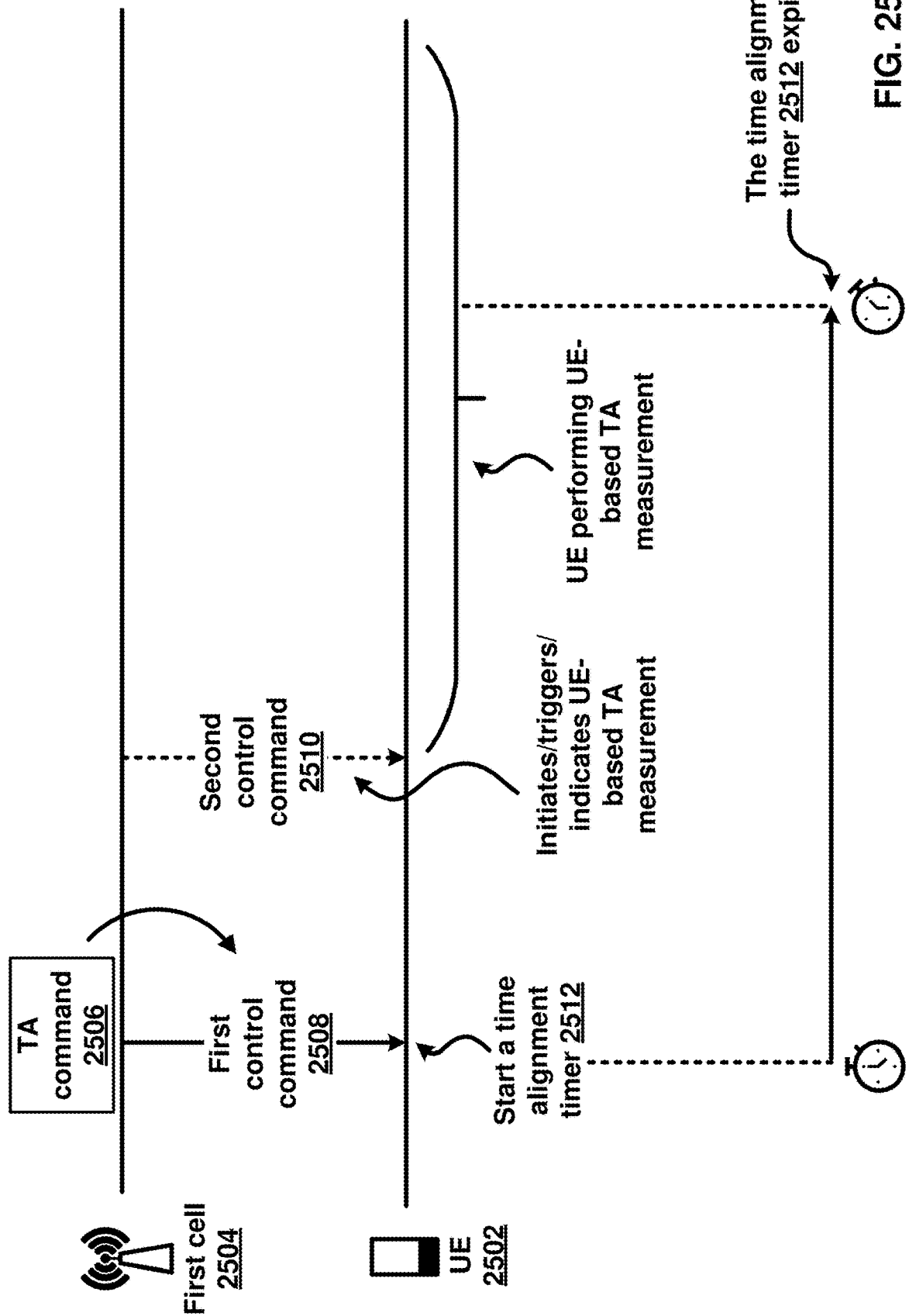
FIG. 25 illustrates an example of UE-based TA measurement as per an aspect of an embodiment of the present disclosure.

FIG. 25 illustrates an example of UE-based TA measurement as per an aspect of an embodiment of the present disclosure. In the example of FIG. 25, a wireless device (e.g., UE 2502) may receive a first control command 2508. In an example, the first control command 2508 may be the first control command 1804. The first control command 2508 may comprise a TA command 2506. The TA command 2506 may comprise, for example, the TA command 1806. The wireless device may receive the first control command 2508 via a first cell 2504. The first cell 2504 may be/comprise, for example, Cell A 1706. The first cell 2504 may be/comprise, for example, the first cell 1808. The first cell 2504 may be/comprise, for example, the first cell 2006.

A first base station may be for/of/associated with/correspond to/serve the first cell 2504. The first base station may transmit the first control command 2508. The first base station may transmit the first control command 2508 via the first cell 2504.

The TA command 2506 may comprise/indicate a TA value associated with/for/of/corresponding to the first cell 2504. For example, the TA command 2506 may comprise/indicate the TA value associated with/for/of/corresponding to a first TAG. The first TAG may comprise the first cell 2504.

In an example, the first control command 2508 may be/comprise a timing advance command MAC CE. In an example, the first control command 2508 may be/comprise an absolute TA command MAC CE. In an example, the first control command 2508 may be/comprise a random access response. In an example, the first control command 2508 may be/comprise a MSGB. In an example, the first control command 2508 may be/comprise a Msg2. In an example, the first control command 2508 may be/comprise the control command 1718. In an example, the first control command 2508 may be/comprise the second control command 1810. In an example, the first control command 2508 may be/comprise the control command 1904. In an example, the first control command 2508 may be/comprise the control command 2016. In an example, the first control command 2508 may be/comprise a timing case indicate MAC CE. In an example, the first control command 2508 may be/comprise a timing advance report MAC CE. In an example, the first control command 2508 may be/comprise a Case-7 timing advance offset MAC CE. In an example, the first control command 2508 may be/comprise a Case-6 timing request MAC CE. In an example, the first control command 2508 may be/comprise a timing delta MAC CE.

In response to receiving the first control command 2508, the wireless device may start/restart/begin a time alignment timer 2512. The time alignment timer 2512 may be for/of/associated with the first cell 2504. The time alignment timer 2512 may be for/of/associated with the first TAG. The time alignment timer 2512 may control how long the wireless device considers serving cells belonging to/comprised in the first TAG (e.g., such as the first cell 2504) to be uplink time aligned.

In an example, the one or more configuration parameters may indicate a value of the time alignment timer 2512.

In an example, the wireless device may receive a second control command 2510. In an example, the second control command 2510 may be/comprise a timing advance command MAC CE. In an example, the second control command 2510 may be/comprise an absolute TA command MAC CE. In an example, the second control command 2510 may be/comprise a random access response. In an example, the second control command 2510 may be/comprise a MSGB. In an example, the second control command 2510 may be/comprise a Msg2. In an example, the second control command 2510 may be/comprise the control command 1718. In an example, the second control command 2510 may be/comprise the second control command 1810. In an example, the second control command 2510 may be/comprise the control command 1904. In an example, the second control command 2510 may be/comprise the control command 2016. In an example, the second control command 2510 may be/comprise a timing case indicate MAC CE. In an example, the second control command 2510 may be/comprise a timing advance report MAC CE. In an example, the second control command 2510 may be/comprise a Case-7 timing advance offset MAC CE. In an example, the second control command 2510 may be/comprise a Case-6 timing request MAC CE. In an example, the second control command 2510 may be/comprise a timing delta MAC CE. In an example, the second control command 2510 may be/comprise an LTM cell switch command MAC CE. In an example, the second control command 2510 may be/comprise a MAC CE that activates/deactivates a UE-based TA measurement procedure (e.g., UE-based TA measurement procedure activation/deactivation MAC CE, UE-TA activation/deactivation MAC CE, and/or the like).

The second control command 2510 may trigger/activate/indicate/initiate a UE-based TA measurement procedure. The wireless device may start/begin/resume a UE-based TA measurement procedure based on/in response to receiving the second control command 2510. The UE may perform the UE-based TA measurement procedure for a duration of time (e.g., the time duration of/in the example embodiments of FIG. 20, FIG. 21, FIG. 22, FIG. 23, and/or FIG. 24) after receiving the second control command 2510.

In existing technologies, the wireless device may perform the UE-based TA measurement procedure for the duration of time after receiving the second control command 2510 in response to receiving the second control command 2510 triggering/initiating the UE-based TA measurement procedure. In an example, the time alignment timer 2512 may expire within/during the duration of time. For example, the time alignment timer 2512 may expire when the wireless device is performing the UE-based TA measurement procedure (e.g., when the wireless device is determining a TA of a second cell using/based on the UE-based TA measurement procedure). In a UE-based TA measurement procedure (e.g., as shown in FIG. 18), the wireless device may use a TA command (e.g., a TA value) of a serving cell to determine a second TA of a second cell. In the example of FIG. 25, the wireless device may use the TA command 2506 during/in the UE-based TA measurement procedure.

In the implementation of the existing technologies, the wireless device may use an invalid TA command/value (e.g., a TA command associated with/of a TAG whose time alignment timer has expired) in/for/during the UE-based TA measurement procedure. Using an invalid TA command/value in/for/during the UE-based TA measurement procedure may result in the wireless device determining an inaccurate/wrong/incorrect TA value for the second cell. Based on determining an inaccurate/wrong/incorrect TA value for the second cell, the wireless device may use the inaccurate/wrong/incorrect TA value for one or more uplink transmissions via the second cell. Using the inaccurate/wrong/incorrect TA value may result in an interference of the one or more uplink transmission with one or more second uplink transmissions associated with/of/from one or more second wireless devices.

Embodiments of the present disclosure are related to an approach for UE-based TA measurement. These and other features of the present disclosure are described further below.

In an example embodiment, a wireless device may start/begin/initiate/trigger a UE-based TA measurement procedure, for example, based on receiving a control command triggering the UE-based TA measurement procedure. In an example, the wireless device may start/begin/initiate/trigger the UE-based TA measurement procedure without receiving the control command triggering the UE-based TA measurement procedure. In an example, a wireless device may start/restart/begin a time alignment timer in response to receiving a TA command. In an example, the time alignment timer may expire/run out/be paused while/when/during the UE-based TA measurement procedure (e.g., before the wireless device completed the UE-based TA measurement procedure). In response to the time alignment timer expiring/running out/being paused while/when/during the UE-based TA measurement procedure (e.g., before the wireless device completed the UE-based TA measurement procedure), the wireless device may suspend/stop/pause/cancel/discard/flush the UE-based TA measurement procedure.

Example embodiments of the present disclosure may provide enhancement for a UE-based TA measurement procedure. For example, in response to suspending/stopping/pausing/canceling the UE-based TA measurement procedure based on the time alignment timer expiring/running out/being paused while/when/during the UE-based TA measurement procedure (e.g., before the wireless device completed the UE-based TA measurement procedure), the wireless device may not use an invalid/expired TA/TA value/TA command for determining a TA (value) of a second cell (e.g., a candidate/target cell for LTM). As a result, the wireless device may not use an inaccurate TA (value) for one or more uplink transmissions via the second cell. As a result, interference of the one or more uplink transmission with one or more second uplink transmissions associated with/of/from one or more second wireless devices may be reduced.

Figure 26:
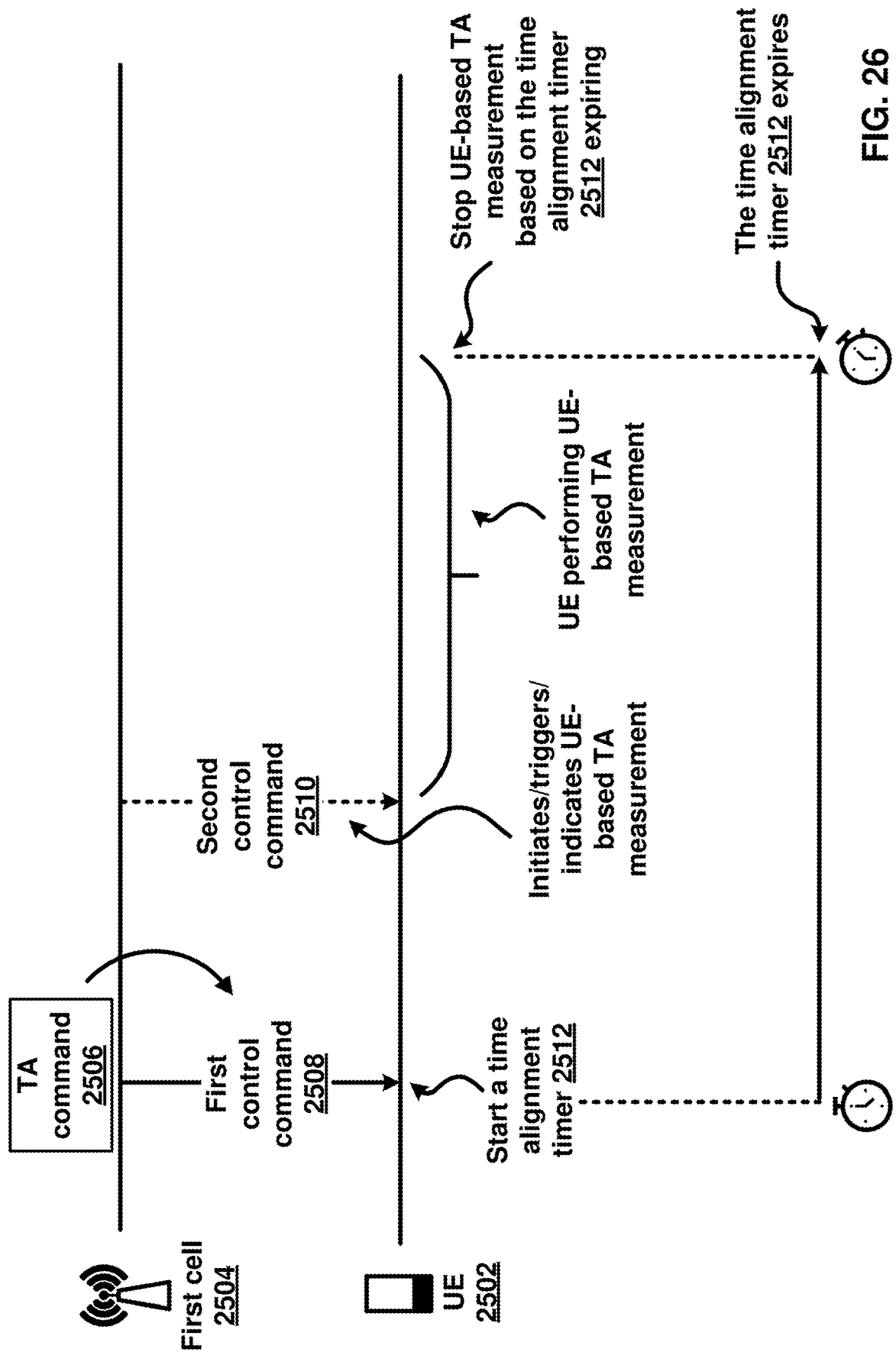
FIG. 26 illustrates an example timing diagram of a UE-based TA measurement procedure as per an aspect of an embodiment of the present disclosure.

FIG. 26 illustrates an example timing diagram of a UE-based TA measurement procedure as per an aspect of an embodiment of the present disclosure. In the example of FIG. 26, a wireless device (e.g., UE 2502) receives the first control command 2508. The first control command 2508 may comprise the first TA command 2506. The wireless device may receive the first control command 2508 via the first cell 2504. In response to receiving the first control command 2508 comprising the TA command 2506, the wireless device may start/restart/begin the time alignment timer 2512.

The TA command 2506 may indicate a first TA value associated with the first cell 2504. For example, the TA command 2506 may indicate the first TA value for/of/associated with a first TAG. The first cell 2504 may belong to the first TAG. For example, the first TAG may comprise the first cell 2504. The first TAG may comprise, for example, one or more cells other than the first cell 2504.

In an example, the wireless device may receive the second control command 2510. In an example (as shown in FIG. 26), the wireless device may receive the second control command 2510 when the time alignment timer 2512 is running. In another example (not shown in FIG. 26), the wireless device may receive the second control command 2510 when the timer alignment timer 2512 is not running (e.g., expired, paused, stopped, has run out, and the like). In an example, the wireless device may ignore the second control command 2510 based on the timer alignment timer 2512 not running. Ignoring a control command (e.g., the second control command 2510) may comprise, for example, not receiving the control command, not processing the control command, not performing action(s)/procedure(s) indicated in/by the control command, and/or the like.

The second control command 2510 may indicate/initiate/trigger a UE-based TA measurement procedure. In an example, the wireless device may start/begin/restart the UE-based TA measurement procedure based on/in response to receiving the second control command 2510.

In an example, the time alignment timer 2512 may expire. For example, the wireless device may not have completed the UE-based TA measurement procedure before/at the time of/prior to the time alignment timer 2512 expiring (e.g., as shown in FIG. 26). In an example, the time alignment timer 2512 may expire when/during the wireless device is performing/performing the UE-based TA measurement procedure.

In an example embodiment as shown in FIG. 26, the wireless device may stop the UE-based TA measurement procedure in response to the time alignment timer 2512 expiring. The wireless device may stop the UE-based TA measurement procedure in response to the time alignment timer 2512 expiring, for example, based on/if the UE-based TA measurement procedure being incomplete/still running/ongoing.

When the time alignment timer 2512 expires, a validity of the TA command 2506 may also expire. Using an invalid TA command (e.g., the TA command 2506 after the time alignment timer 2512 expires) in the UE-based TA measurement procedure may result in the wireless device determining an inaccurate TA (value) of/for/associated with a second cell.

In an example, the wireless device may receive a second TA command. The second TA command may be for/of/associated with the first cell 2504. The wireless device may receive the second TA command via the first cell 2504. The second TA command may be for/of/associated with the first TAG.

The wireless device may start/restart/resume/being the UE-based TA measurement procedure (e.g., a suspended/stopped/paused UE-based TA measurement procedure), for example, based on receiving the second TA command. The wireless device may start/restart the time alignment timer 2512, for example, based on receiving the second TA command. The wireless device may start/restart/resume/being the UE-based TA measurement procedure, for example, based on starting/restarting the time alignment timer 2512. The wireless device may start/restart/resume/being the UE-based TA measurement procedure, for example, based on the time alignment timer 2512 running.

In an example, the wireless device may start/restart/resume/being one or more UE-based TA measurement procedures associated with the second TA command (e.g., the one or more UE-based TA measurement procedures that use the second TA command for determining one or more TA(s) of one or more second cells), for example, based on receiving the second TA command.

The wireless device may determine/estimate/measure a TA (value) of a second cell (e.g., the second cell 2010, the second cell 1812, Cell B 1712, and the like) based on/using the UE-based TA measurement procedure. The wireless device may transmit/perform an uplink transmission (e.g., the uplink transmission 2024) using/based on/with the TA (value), e.g., via the second cell.

In the present disclosure, a time alignment timer (e.g., the time alignment timer 2512) expiring may refer to/indicate/mean/comprise the time alignment timer reaching a value (e.g., a predetermined value, 0, maximum value of the time alignment timer, and the like). In an example, a time alignment timer (e.g., the time alignment timer 2512) expiring may refer to/indicate/mean, for example, the time alignment timer stopping. In an example, a time alignment timer (e.g., the time alignment timer 2512) expiring may refer to/indicate/mean, for example, the time alignment timer not running. In an example, a time alignment timer (e.g., the time alignment timer 2512) expiring may refer to/indicate/mean, for example, the time alignment timer being paused.

In the present disclosure, stopping a UE-based TA measurement procedure may refer to pausing/temporarily halting/stopping/suspending the UE-based TA measurement procedure. In an example, stopping a UE-based TA measurement procedure may refer to/comprise/mean cancelling/discarding/disbanding/flushing/removing a TA (value) determined based on/using/via the UE-based TA measurement procedure. In an example, stopping a UE-based TA measurement procedure may refer to/comprise/mean resuming/restarting/beginning the UE-based TA measurement procedure in response to receiving a TA command.

In the present disclosure, a TAG may be/comprise/mean/refer a cell group (e.g., medium access control layer cell group, physical layer cell group, master cell group, secondary cell group, and the like)

In an example, the wireless device may, when a time alignment timer expires, suspend/cancel/stop any ongoing UE-based TA measurement procedure(s) based on a TAG of/associated with the time alignment timer. In an example, the wireless device may, when a Timing Advance Command MAC CE is received, and if an NTA has been maintained with the indicated TAG or when a Timing Advance Command is received in a Random Access Response message for a Serving Cell belonging to a TAG or in a MSGB for an SpCell, resume/restart/start/begin a/any suspended UE-based TA measurement procedure(s) based on/associated with the indicated TAG/Serving Cell/SpCell.

Clause 1. A method comprising: transmitting, by a wireless device, a capability message comprising a field indicating a time gap of the wireless device to complete a procedure of layer 1 or layer 2 triggered mobility (LTM) receiving radio resource control (RRC) configuration parameters comprising one or more configurations of one or more candidate cells for LTM, wherein each of the one or more configurations comprise a configured grant indicating a time resource for an uplink transmission via a candidate cell of the one or more candidate cells; receiving, in a time interval, an LTM cell switch command medium access control control element (MAC CE) indicating cell switch to the candidate cell; and transmitting, via the candidate cell and the time resource, the uplink transmission via physical uplink shared channel (PUSCH), wherein the time resource is after the time gap plus an offset from the first time interval.

Clause 2. A method comprising: transmitting, by a wireless device, a capability message comprising a field indicating a time gap of the wireless device to complete a procedure of layer 1 or layer 2 triggered mobility (LTM); receiving, in a time interval, a medium access control control element (MAC CE) indicating cell switch to a candidate cell of LTM; and transmitting, via the candidate cell and a time resource, an uplink transmission, wherein the time resource is after the time gap plus an offset from the first time interval.

Clause 3. The method of clause 2, further comprising receiving a radio resource control (RRC) message comprising one or more configurations of one or more candidate cells for LTM. In an example, the candidate cell can be one of the one or more candidate cells mentioned in this clause.

Clause 4. The method of clause 3, wherein each configuration, of the one or more configurations, is of a respective candidate cell of the one or more candidate cells.

Clause 5. The method of clause 3, wherein each configuration, of the one or more configurations, comprise a configured grant.

Clause 6. The method of clause 5, wherein the configured grant indicates a time resource for uplink transmission.

Clause 7. The method of clause 6, wherein the uplink transmission is via a candidate cell of the one or more candidate cells.

Clause 8. The method of clause 2, wherein the uplink transmission is via physical uplink shared channel (PUSCH).

Clause 9. The method of clause 2, wherein the offset is a preconfigured offset.

Clause 10. The method of clause 3, wherein the RRC message indicates the offset.

Clause 11. The method of clause 2, wherein the MAC CE is an LTM cell switch command MAC CE.

Clause 12. The method of clause 2, wherein the MAC CE initiates the procedure.

Clause 13. The method of clause 2, wherein the MAC CE indicates the procedure.

Clause 14. The method of clause 3, wherein the MAC CE indicates a configuration of the one or more configurations.

Clause 15. The method of clause 14, wherein the configuration is of the candidate cell.

Clause 16. The method of clause 15, wherein the MAC CE indicates cell switch to the candidate cell based on indicating the configuration.

Clause 17. The method of clause 2, wherein the uplink transmission comprises an RRC reconfiguration complete message.

Clause 18. The method of clause 2, further comprising receiving a downlink control information (DCI).

Clause 19. The method of clause 18, wherein the DCI comprises a dynamic grant.

Clause 20. The method of clause 18, wherein the DCI indicates a dynamic grant.

Clause 21. The method of clause 18, wherein the DCI indicates the uplink transmission.

Clause 22. The method of clause 18, wherein the DCI indicates the time resource.

Clause 23. The method of clause 2, wherein the procedure comprises an early uplink synchronization procedure.

Clause 24. The method of clause 2, wherein the procedure comprises a user equipment based timing advance measurement procedure.

Clause 25. The method of clause 2, wherein the procedure comprises determining a timing advance of the candidate cell.

Clause 26. The method of clause 25, wherein transmitting the uplink transmission is further based on the timing advance of the candidate cell.

Clause 27. The method of clause 18, further comprising ignoring the DCI based on the DCI indicating a second time resource, for the uplink transmission, that is before the time gap plus an offset from the first time interval.

Clause 28. An apparatus comprising one or more processors and memory storing instructions that, when executed by the one or more processors, cause the apparatus at least to perform the method according to any one of claims 1-27. For example, the apparatus can be a wireless device.

Clause 29. A non-transitory computer-readable medium comprising instructions that, when executed by one or more processors of a wireless device, cause the wireless device to perform the method according to any one of claims 1-27.

Although clauses 1 to 29 describe examples from the perspective of a wireless device, certain embodiments are directed to a base station performing the reciprocal steps corresponding to those of the wireless device, as described and illustrated above.

What is claimed is:

1. A wireless device, comprising:
   one or more processors; and
   memory storing instructions that, when executed by the one or more processors, cause the wireless device at least to perform:
   transmitting a capability message comprising a field indicating a time gap of the wireless device to complete a procedure of layer 1 or layer 2 triggered mobility (LTM);
   receiving radio resource control (RRC) configuration parameters comprising one or more configurations of one or more candidate cells for LTM, wherein each of the one or more configurations comprise a configured grant indicating a time resource for uplink transmissions via a candidate cell of the one or more candidate cells;
   receiving, in a time interval, a medium access control control element (MAC CE) indicating cell switch to the candidate cell; and
   transmitting, via the candidate cell and the time resource, an uplink transmission, wherein the time resource is after the time gap plus an offset from the time interval.

2. The wireless device of claim 1, wherein at least one of:
   the wireless device indicates the offset via the capability message; and
   the offset is preconfigured to the wireless device.

3. The wireless device of claim 1, wherein the uplink transmission is via physical uplink shared channel (PUSCH).

4. The wireless device of claim 1, wherein the offset is a preconfigured offset.

5. The wireless device of claim 2, wherein the RRC message indicates the offset.

6. The wireless device of claim 1, wherein the MAC CE is an LTM cell switch command MAC CE.

7. The wireless device of claim 1, wherein the MAC CE initiates the procedure.

8. The wireless device of claim 1, wherein the MAC CE indicates the procedure.

9. The wireless device of claim 2, wherein the MAC CE indicates a configuration of the one or more configurations.

10. The wireless device of claim 9, wherein the configuration is of the candidate cell.

11. The wireless device of claim 10, wherein the MAC CE indicates cell switch to the candidate cell based on indicating the configuration.

12. The wireless device of claim 11, wherein the uplink transmission comprises an RRC reconfiguration complete message.

13. The wireless device of claim 1, further comprising receiving a downlink control information (DCI).

14. The wireless device of claim 13, wherein the DCI comprises a dynamic grant.

15. The wireless device of claim 13, wherein the DCI indicates a dynamic grant.

16. The wireless device of claim 13, wherein the DCI indicates the uplink transmission.

17. The wireless device of claim 13, wherein the DCI indicates the time resource.

18. A method comprising:
   transmitting, by a wireless device, a capability message comprising a field indicating a time gap of the wireless device to complete a procedure of layer 1 or layer 2 triggered mobility (LTM);
   receiving radio resource control (RRC) configuration parameters comprising one or more configurations of one or more candidate cells for LTM, wherein each of the one or more configurations comprise a configured grant indicating a time resource for uplink transmissions via a candidate cell of the one or more candidate cells;
   receiving, in a time interval, a medium access control control element (MAC CE) indicating cell switch to the candidate cell; and
   transmitting, via the candidate cell and the time resource, an uplink transmission, wherein the time resource is after the time gap plus an offset from the time interval.

19. The method of claim 18, wherein at least one of:
   the wireless device indicates the offset via the capability message; and
   the offset is preconfigured to the wireless device.

20. A non-transitory computer-readable medium comprising instructions that, when executed by one or more processors of a wireless device, cause the wireless device to perform:
   transmitting a capability message comprising a field indicating a time gap of the wireless device to complete a procedure of layer 1 or layer 2 triggered mobility (LTM);

receiving radio resource control (RRC) configuration parameters comprising one or more configurations of one or more candidate cells for LTM, wherein each of the one or more configurations comprise a configured grant indicating a time resource for uplink transmissions via a candidate cell of the one or more candidate cells;

receiving, in a time interval, a medium access control control element (MAC CE) indicating cell switch to the candidate cell; and transmitting, via the candidate cell and the time resource, an uplink transmission, wherein the time resource is after the time gap plus an offset from the time interval.

\* \* \* \* \*